(12) United States Patent
Wang et al.

(10) Patent No.: US 12,262,097 B2
(45) Date of Patent: Mar. 25, 2025

(54) UNIFIED END-TO-END QUALITY AND LATENCY MEASUREMENT, OPTIMIZATION AND MANAGEMENT IN MULTIMEDIA COMMUNICATIONS

(71) Applicant: IMAX CORPORATION, Mississauga (CA)

(72) Inventors: Zhou Wang, Waterloo (CA); Abdul Rehman, Kitchener (CA); Christopher Kulbakas, Mississauga (CA); Kai Zeng, Kitchener (CA); Ahmed Badr, Waterloo (CA); Hojatollah Yeganeh, Waterloo (CA); Jiheng Wang, Waterloo (CA); Ian Wormsbecker, Baden (CA); Peter Olijnyk, Kitchener (CA)

(73) Assignee: IMAX CORPORATION, Mississauga (CA)

( * ) Notice: Subject to any disclaimer, the term of this patent is extended or adjusted under 35 U.S.C. 154(b) by 121 days.

(21) Appl. No.: 17/743,991

(22) Filed: May 13, 2022

(65) Prior Publication Data
US 2022/0385717 A1 Dec. 1, 2022

Related U.S. Application Data

(63) Continuation of application No. 16/737,558, filed on Jan. 8, 2020, now Pat. No. 11,363,345.
(Continued)

(51) Int. Cl.
*H04L 65/80* (2022.01)
*H04L 65/61* (2022.01)
(Continued)

(52) U.S. Cl.
CPC ....... *H04N 21/64738* (2013.01); *H04L 65/61* (2022.05); *H04L 65/612* (2022.05);
(Continued)

(58) Field of Classification Search
CPC .......................... H04L 65/80; H04N 21/2401
See application file for complete search history.

(56) References Cited

U.S. PATENT DOCUMENTS 10,298,653 B1 * 5/2019 Cheng ..................... H04L 65/80
2012/0311126 A1 12/2012 Jadallah et al.
(Continued)

FOREIGN PATENT DOCUMENTS

WO 2017152274 A1 9/2017

OTHER PUBLICATIONS

Cisco Visual Networking Index: Forecast and Methodology, 2015-2020 dated 2016.
(Continued)

*Primary Examiner* — Michael H Hong
(74) *Attorney, Agent, or Firm* — BROOKS KUSHMAN P.C.

(57) ABSTRACT

Correlated quality-of-experience (QoE) and latency measures are generated at a plurality of monitoring points along a multimedia delivery chain including multiple video operations. At each of the plurality of monitoring points, an absolute QoE measure defined on a human perceptual quality scale for media content is computed, and one or more of content extraction or feature extraction on the media content are performed. To a common middleware from each of the plurality of monitoring points, the respective QoE measure and results of the one or more of content extraction or feature extraction are transmitted. Computing and updating an absolute QoE measure for each of the plurality of monitoring points is performed. Computing and updating latencies between multiple monitoring points at the middleware using the results from each of the plurality of monitoring points is also performed.

24 Claims, 39 Drawing Sheets

Related U.S. Application Data

(60) Provisional application No. 62/824,125, filed on Mar. 26, 2019.

(51) Int. Cl.

| | |
|---|---|
| *H04L 65/612* | (2022.01) |
| *H04L 65/70* | (2022.01) |
| *H04L 65/75* | (2022.01) |
| *H04L 65/756* | (2022.01) |
| *H04N 21/438* | (2011.01) |
| *H04N 21/647* | (2011.01) |

(52) U.S. Cl.
CPC .............. *H04L 65/70* (2022.05); *H04L 65/75* (2022.05); *H04L 65/756* (2022.05); *H04L 65/765* (2022.05); *H04L 65/80* (2013.01); *H04N 21/4383* (2013.01)

(56) References Cited

U.S. PATENT DOCUMENTS

| | | | |
|---|---|---|---|
| 2013/0051271 A1 | 2/2013 | Cao et al. | |
| 2015/0135245 A1 | 5/2015 | Dunne et al. | |
| 2016/0212432 A1 | 7/2016 | Wang et al. | |
| 2016/0247383 A1* | 8/2016 | Kassab | .................... H04W 4/90 |

OTHER PUBLICATIONS

Curtis et al., American Society of Cinematographers Technology Committee Progress Report 2016, SMPTE Motion Imaging Journal, vol. 125, No. 7, pp. 43-58, Sep. 2016.

Wang, New Quality-of-Experience Measurement Technologies: Streamlining How Videos are Delivered to Consumers, IEEE Signal Processing Society Blog, Jul. 2017.

Seufert et al., A Survey on Quality of Experience of HTTP Adaptive Streaming, pp. 469-492, IEEE Communications Surveys & Tutorials, vol. 17, No. 1, First Quarter 2015.

Oyman et al., Quality of Experience for HTTP Adaptive Streaming Services, pp. 20-27, IEEE Communications Magazine, Apr. 2012.

International Telecommunication Union Quality of Experience Recommendation, ITU-T P.10/G.100, Amendment 1: New Appendix I—Definition of Quality of Experience (QoE), Jan. 2007.

Wang et al., Mean Squared Error: Love It or Leave It? A New Look at Signal Fidelity Measures, IEEE Signal Processing Magazine, vol. 26, No. 1, pp. 98-117, Jan. 2009.

Wang et al., Image Quality Assessment: From Error Visibility to Structural Similarity, IEEE Transactions on Image Processing, vol. 13, No. 4, Apr. 2004.

Wang et al., Video Quality Assessment Based on Structural Distortion Measurement, Signal Processing: Image Communication, vol. 19, No. 2, pp. 121-132, Feb. 2004.

Wang et al., Multi-Scale Structural Similarity for Image Quality Assessment, Proceedings of the 37th IEEE Asilomar Conference on Signals, Systems and Computers, Pacific Grove, CA, Nov. 9-12, 2003.

Pinson et al., A New Standardized Method for Objectively Measuring Video Quality, IEEE Transactions on Broadcasting, vol. 50, No. 3, pp. 312-322, Sep. 2004.

Seshadrinathan et al., Motion Tuned Spatio-Temporal Quality Assessment of Natural Videos, IEEE Transactions on Image Processing, vol. 19, No. 2, pp. 335-350, Feb. 2010.

Li et al., Toward A Practical Perceptual Video Quality Metric, Netflix Tech Blog, 2017.

Duanmu et al., A Quality-of-Experience Index for Streaming Video, IEEE Journal of Selected Topics in Signal Processing, vol. 11, No. 1, pp. 154-166, Feb. 2017.

Rehman et al., Display Device-Adapted Video Quality-of-Experience Assessment, IS&T/SPIE Electronic Imaging: Human Vision & Electronic Imaging, Feb. 2015.

Rehman, SSIMPLUS: The Most Accurate Video Quality Measure, Science of Seeing, Jul. 18, 2017.

Zeng et al., From H.264 to HEVC: Coding Gain Predicted by Objective Video Quality Assessment Models, International Workshop on Video Processing and Quality Metrics for Consumer Electronics, Scottsdale, Arizona, Jan.-Feb. 2013.

Sheikh et al., A Statistical Evaluation of Recent Full Reference Image Quality Assessment Algorithms, IEEE Transactions on Image Processing, 15(11):3440-3451, Nov. 2006.

Sheikh et al., Image Information and Visual Quality, IEEE Transactions Image Processing, vol. 15, No. 2, pp. 430-444, Feb. 2006.

Zhang et al., FSIM: A Feature Similarity Index for Image Quality Assessment, IEEE Transactions on Image Processing, vol. 20, Issue 8, 2378-2386, 2011.

Final Report From the Video Quality Experts Group on the Validation of Objective Models of Video Quality Assessment, Mar. 2000.

Joskowicz et al., Combining Full Reference and No Reference Models for Broadcast Digital TV Quality Monitoring in Real Time, IEEE Transactions on Broadcasting, IEEE Service Center, Piscataway, NJ, US, vol. 62, No. 4, Dec. 1, 2016 , pp. 770-784.

Performance Monitoring Points for IPTV, ITU-T Draft; Study Period 2013-2016, International Telecommunication Union, Geneva, Switzerland, Nov. 13, 2015 , pp. 1-14.

Athar et al., Quality Assessment of Images Undergoing Multiple Distortion Stages, 2017 IEEE International Conference on Image Processing (ICIP), IEEE, Sep. 17, 2017, pp. 3175-3179.

Speech and Multimedia Transmission Quality (STQ); Multimedia Quality Measurement: End-to-End Quality Measurement Framework, ETSI Draft; 00113V005, European Telecommunications Standards Institute (ETSI), 650, Route Des Lucioles; F-06921 Sophia-Antipolis; France, No. V0.0.5, Jun. 24, 2011, pp. 1-26.

\* cited by examiner

FIG. 12C

UNIFIED END-TO-END QUALITY AND LATENCY MEASUREMENT, OPTIMIZATION AND MANAGEMENT IN MULTIMEDIA COMMUNICATIONS

CROSS-REFERENCE TO RELATED APPLICATION

This application is a continuation of U.S. application Ser. No. 16/737,558, filed on Jan. 8, 2020, which claims the benefit of U.S. provisional application Ser. No. 62/824,125, filed on Mar. 26, 2019, the disclosures of which are hereby incorporated in their entireties by reference herein.

TECHNICAL FIELD

Aspects of the disclosure generally relate to quality-of-experience and quality-of-delivery measurement, optimization assessment and management of multimedia content during multimedia communications, and more particularly to using a objective quality-of-experience and quality-of-delivery assessment approaches to predict, measure, and control, optimize, and manage the perceptual quality-of-experience of end users who are viewing multimedia content being transmitted to their perceptual receiving devices through multimedia communication networks that may contain multiple stages of content acquisition, production, storage, compression, transmission, processing, and/or display, and that each stage may create errors, delays, and artifacts that may degrade the perceptual quality-of-experience of end users.

BACKGROUND

Multimedia communication services, including the transmission of video, audio, image, text content and data in other media forms, have been growing exponentially in the past decade, coinciding with the accelerated proliferation of multimedia content and smart mobile devices (Cisco Inc., "Cisco Visual Networking Index: Forecast and Methodology 2015-2020", 2016). The gigantic scale of multimedia data transmission has been supported by a vast investment of resources. However, while common consumers are enjoying the multimedia content delivered to their TVs, tablets, smart phones, and other devices, they often complain about the quality of the multimedia content they are receiving and experiencing. Meanwhile, multimedia content producers and providers are concerned about whether their creative intent is properly preserved during the multimedia delivery process (C. Curtis, et al., "American Society of Cinematographers Technology Committee Progress Report 2016," SMPTE Motion Imaging Journal, vol. 125, no. 7, pp. 43-58, September 2016), (Z. Wang, "New quality-of-experience measurement technologies: streamlining how videos are delivered to consumers," IEEE Signal Processing Society Blogs, July 2017). Therefore, it is imperative for multimedia communication service providers to seek effective and efficient approaches to manage consumers' perceptual experience when experiencing the multimedia content being delivered to their receiving devices.

Quality assurance (QA) has long been recognized as an essential component to warrant the service of modern multimedia communication systems. Traditionally, QA has been network-centric, focusing on the quality-of-service (QoS) (M. Seufert, S. Egger, M. Slanina, T. Zinner, T. Hobfeld, and P. Tran-Gia, "A survey on quality of experience of HTTP adaptive streaming," *IEEE Communications Surveys & Tutorials*, vol. 17, no. 1, September 2014) provided to the users, where the key metrics are defined by the network service level parameters such as bitrate, package drop rate, and network delay, together with integrity checks that guarantee the multimedia content to be properly played at user devices. While QoS metrics are useful for basic QA purposes, they do not directly track what the users are actually experiencing. For example, the same video stream displayed on two different types of user devices (e.g., TVs vs. smart-phones) with different combinations of window sizes and pixel resolutions may lead to very different viewer experiences. Any freezing event on the users' devices could result in a strong negative impact on user experiences. Different perceptual artifacts produced by different video compression methods could produce annoying visual impairment. None of these are accounted for by QoS measures. Consequently, Quality-of-Experience (QoE) (O. Oyman, S. Singh, "Quality of experience for HTTP adaptive streaming services," *IEEE Communications Magazine*, vol. 50, April 2012), which measures "the overall acceptability of an application or service as perceived subjectively by the end-user" (ITU QoE Recommendation ITU-T P.10/G.100, Amd.1, *New Appendix I Definition of Quality of Experience (QoE)*, 2007), has been set to replace the role of QoS.

Simple statistics during video playbacks, such as the duration and frequency of the freezing events, may be employed to create a crude estimate of user QoE, but do not meet the practical needs in terms of accuracy, comprehensiveness, and versatility. Moreover, the perceptual artifacts that affect picture quality are not properly measured, and the large perceptual differences due to viewing conditions, such as viewer device, viewing resolutions, and frame rate are not taken into account. As a result, it becomes difficult to use such approaches to precisely localize quality problems, to recover from failures, to optimize system performance, and to manage the QoE of individual users.

SUMMARY

The present disclosure relates to a method for unified end-to-end QoE measurement system that produces consistent QoE and latency measurement across the multimedia content distribution network or delivery chain.

In one aspect, the present disclosure aggregates media QoE scores and media attributes computed at multiple monitoring points in a media distribution network or delivery chain to a common middleware, and regularizes the QoE scores across multiple monitoring points considering content delay to produce consistent scores between the monitoring points.

The media distribution network may be traditional cable, terrestrial or satellite networks, or new IPTV or Internet Over-The-Top (OTT) networks. The media delivery chain refers to the full path of media delivery from the source ingest, head-end, media data center, to the communication channels, content distribution networks, edge servers, until home networks, and individual end user devices (such as TVs, tablets and smart phones).

The QoE scores may be computed from various types of multimedia quality or QoE assessment metrics. For video quality, these may include full-reference quality assessment methods such as MSE/PSNR (Z. Wang and A. Bovik, "Mean squared error: love it or leave it?—a new look at signal fidelity measures," IEEE Signal Processing Magazine, vol. 26, pp. 98-117, January 2009), SSIM (Z. Wang, A. C. Bovik, H. R. Sheikh, and E. P. Simoncelli, "Image quality assessment: From error visibility to structural similarity," IEEE Transactions on Image Processing, vol. 13, no. 4, pp. 600-612, April 2004), (Z. Wang, L. Lu, and A. C. Bovik, "Video quality assessment based on structural distortion measurement," Signal Processing: Image Communication, vol. 19, pp. 121-132, February 2004), MS-SSIM (Z. Wang, E. P. Simoncelli, and A. C. Bovik, "Multi-scale structural similarity for image quality assessment", IEEE Asilomar Conference on Signals, Systems and Computers, November 2003), VQM (M. H. Pinson, "A new standardized method for objectively measuring video quality", IEEE Transactions on Broadcasting, vol. 50, no. 3, pp. 312-322, September 2004), MOVIE (K. Seshadrinathan and A. C. Bovik, "Motion tuned spatio-temporal quality assessment of natural videos", IEEE Transactions on Image Processing, vol. 19, no. 2, pp. 335-350, February 2010), and VMAF (Z. Li, A. Aaron, I. Katsavounidis, A. Moorthy and M. Manohara, "Toward A Practical Perceptual Video Quality Metric," Netflix TechBlog, 2017), no-reference quality assessment methods such as BRISQUE, NIQE, and LPSI, streaming media quality assessment methods such as SQI (Z. Duanmu, K. Zeng, K. Ma, A. Rehman, and Z. Wang "A quality-of-experience index for streaming video," IEEE Journal of Selected Topics in Signal Processing, vol. 11, no. 1, pp. 154-166, February 2017), and joint audio-video quality assessment method such as AVQ. Ideally, the QoE metric is desired to produces consistent QoE scores across viewing device (TV, tablet, phone, laptop, desktop, display size, display brightness, etc.), viewing condition (including illumination and viewing distance, etc.), spatial resolution (e.g., SD, HD, full-HD, UHD, 4K, etc.), frame rate (15, 24, 30, 60, 120 frames per second, etc.), dynamic range (8 bits, 10 bits, and 12 bits per pixel per color, etc.), and content type (news, sports, animation, etc.). A particular video QoE metric that well suits to all these variations is SSIMPLUS (A. Rehman, K. Zeng and Z. Wang, "Display device-adapted video quality-of-experience assessment," IS&T/SPIE Electronic Imaging: Human Vision & Electronic Imaging, February 2015), (SSIMPLUS: The most accurate video quality measure, https://www.ssimwave.com/from-the-experts/ssimplus-the-most-accurate-video-quality-measure/).

The media attributes may include media content parameters such as audio and video bitrate, encoding format (e.g., MPEG-2, AVC, HEVC), data format (video YCC format, GoP structures, etc.) video spatial resolution, video frame rate, video dynamic range, video content type, and the attributes may also be statistical features computed from the media content such as the spatial information (SI) and temporal information (TI) of video frames.

The common middleware may be a database that stores instantaneous scores from all monitoring points, and may also be a database working in collaboration with a high-throughput low-latency real-time data handling platform such as Apache Kafka. The common middleware may be on a dedicated server, or may be on a public or private cloud.

The content delay refers to the time difference between the same content received by the common middleware from earlier and later monitoring points along the video delivery chain.

The score regularization process is an important step in producing unified scores across the media distribution network or delivery chain. The purpose is to modify the scores received from multiple monitoring points, such that they are consistent with each other. For example, the scores from a monitoring point earlier in the media delivery chain should presumably have a higher QoE score than those from a point at a later point in the delivery chain, provided that the content delay is accurately estimated and compensated.

In another aspect, the QoE scores aggregated at the common middleware are regularized across multiple monitoring points to produce consistently non-increasing scores along the media delivery chain.

One embodiment of the current disclosure is to use degraded-reference quality assessment methods to regularize the QoE scores of the current monitoring point using the QoE scores of earlier monitoring points along the media delivery chain. One embodiment of the current disclosure for degraded-reference quality assessment is to use the scores of earlier monitoring points to scale down the QoE scores of the current monitoring point.

One embodiment of the current disclosure is to use reduced-reference quality assessment method to improve the accuracy of the QoE scores obtained from the multiple monitoring points. Potential methods for reduced-reference quality assessment include statistical and perceptual feature-based methods, and RR-SSIM methods. One embodiment of the current disclosure for reduced-reference quality assessment that estimates the QoE score of the current monitoring point using the media attributes, QoE scores, or bit rates from the previous monitoring points as reduced-reference, and comparing with the media attributes, QoE scores, or bit rates of the current monitoring points.

In another aspect, the present disclosure aggregates time stamps, media attributes, and/or QoE scores computed at multiple monitoring points in the media distribution network or delivery chain to a common middleware; and estimates the latency between the monitoring points using time stamps, multimedia attributes, and/or QoE scores. In one embodiment, the content delay is estimated by correlating the media attribute or QoE score variations over time from multiple monitoring points. The latency between the monitoring points is then estimated by computing the differences between the time stamps of corresponding delayed content at the monitoring points. It is worth noting that content delay (as explained earlier) is different from the actual latency, which refers to the physical time difference between the media stream reaches earlier and later monitoring points in the media delivery chain.

BRIEF DESCRIPTION OF THE DRAWINGS

FIGS. 12A, 12B, and 12C illustrate an example of QoE assessment presentation, including both statistics and QoE curves, in a multiport live monitor application;

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the embodiments. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A unified end-to-end method or system may be used to solve QoE monitoring, optimization, and management problems for the multimedia delivery chain as a whole. The principle is to "begin with the end in mind," because the QoE of end users determines the ultimate overall performance of a media delivery system. The design and resource allocation in the multimedia distribution system, regardless of whether it is for an individual component at the head-end, media data center, network, access server, user device, or the whole system, should be evaluated, compared, and optimized for their impact on end users' QoE. Highly accurate, efficient, and versatile QoE metrics may be allocated to monitor QoE at the transition points throughout the multimedia delivery network, aggregate the QoE measurements from these points in a common middleware, and regularize the measurements to create a unified assessment of the entire system as well as its individual components. The additional benefits of the present invention include quality degradation identification, failure discovery, localization and recovery, degraded-reference and reduced-reference QoE assessment, latency measurement, and optimal encoding, streaming and network resource allocation, as some possibilities.

Figure 1:
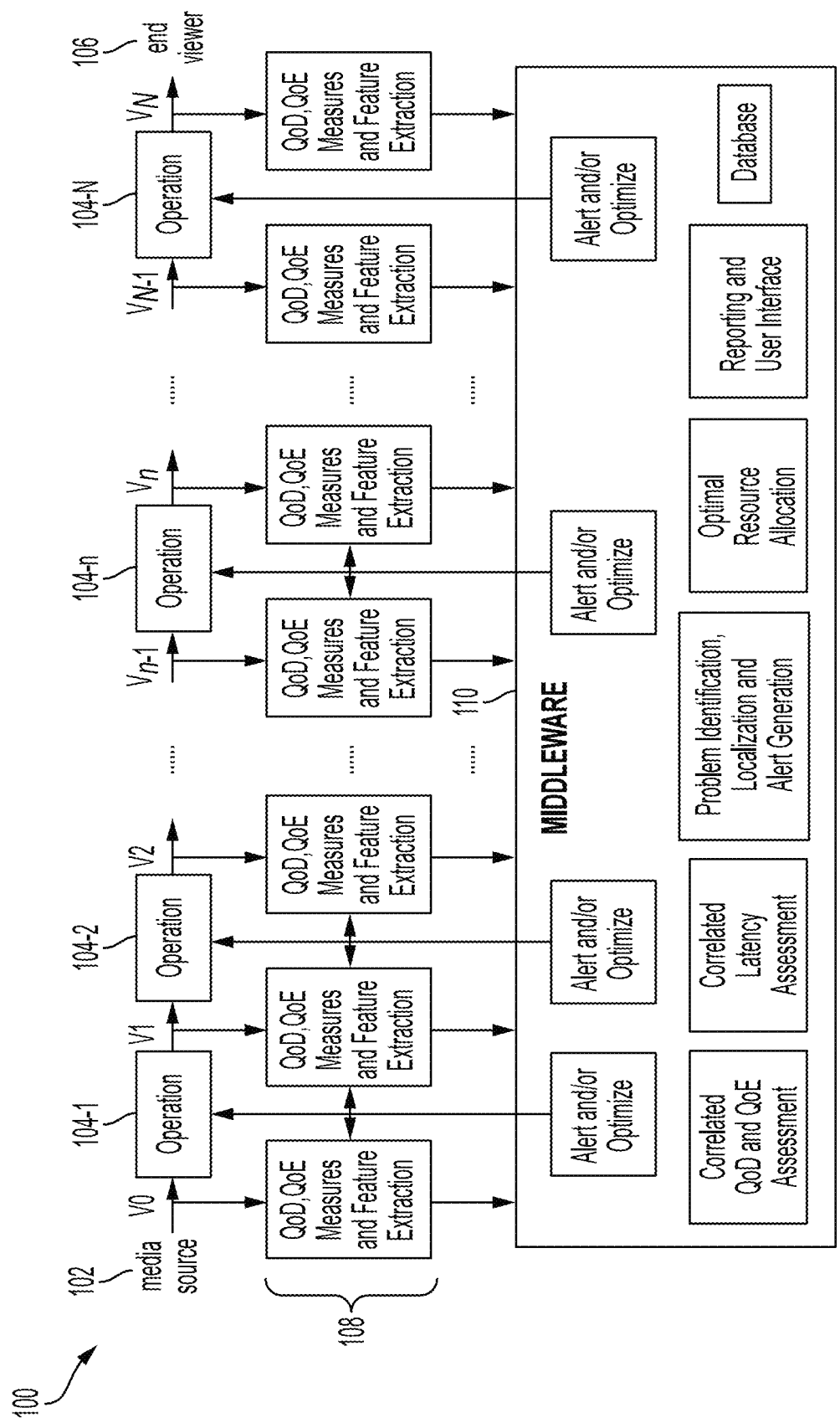
FIG. 1 illustrates an example unified end-to-end quality and latency monitoring, optimization and management system.

FIG. 1 illustrates an overall framework for solving quality and latency measurement, optimization and management problems for the multimedia delivery chain 100. As shown, a media source 102 provides a media stream that V passes through multiple stages of operations 104 before the media stream reaches the end viewer 106. Each of the operations 104 may cause some quality degradation and delay; thus, the user experience of the end viewer 106 may be affected by all of the operations 104. Let $V_{n-1}$ and $V_n$ be the input and output media stream of the n-th operation.

Monitoring points 108 may be used to monitor aspects of the media stream at the various locations V. For instance, Quality-of-delivery (QoD) and quality-of-experience (QoE) measures may be applied to each of the mid-stage media streams V. The QoD measures are concerned about the performance of the delivery process, such as bit error rate, package loss rate, network delay, video freeze, audio silence, errored seconds, black frames, loss of audio-video synchronization, etc. The QoE measures are concerned with the perceptual quality of the media content by examining the media fully decoded at the measurement/monitoring point and evaluating how humans would rate the quality when experiencing the media stream with their perceptual systems.

A good objective QoE measure should accurately predict human perception of the media content and should be fast. The QoE measure should also have other critical properties, such as cross-content type, cross-resolution, cross-viewing device, cross-frame rate, and cross dynamic range consistent scoring. An example of such a QoE measure is the SSIM-PLUS index.

Absolute QoE of a video, as used herein, relates to the mapping of an objective QoE measure to the scale of human perceptual QoE, i.e., the average score given by human subjects when expressing their visual QoE when watching the playback of a video content. For example, a score may be defined on a scale of 0-100, which is evenly divided to five quality ranges of bad (0-19), poor (20-39), fair (40-59), good (60-79), and excellent (80-100), respectively. Absolute QoE is in contrast to relative QoE and quality degradation measures, where the quality change before and after a video operation is measured.

In addition to QoD and QoE measures, the monitoring points 108 may extract other features from the media streams V. Examples of the features may include statistical quantities such as the mean and standard deviation of the signal intensity and spatial and temporal information content measures from the media stream on a per moment basis.

The QoD, QoE measures and the extracted features from multiple monitoring points 108 (which could be a subset of all possible monitoring points 108) are transmitted to and aggregated at a common middleware 110, which could locate at a public or private cloud, or at dedicated a data storage and processing server. At the middleware 110, the QoD and QoE scores collected from multiple monitoring points 108 are synchronized, compared, and refined to create correlated and consistent scores. Correlated scoring means that all the QoD or QoE scores throughout the delivery chain 100 should use the same scale for scoring, and all scores collected should be aligned and refined when necessary to be mapped to the same scale, such that all QoD or QoE scores are comparable throughout the video delivery chain 100 and distribution network. The features extracted, together with the QoD and QoE measures collected from multiple monitoring points 108, are used to perform latency assessment for each point along the media delivery chain 100. All the QoD, QoE and latency scores are stored in a database, based on which, reports are generated and may be visualized using a user interface. The reporting may be performed per time span (e.g., per second, per minutes, per hour, per day, per week, per month, per year, etc.) and may also be per geo-location, per media asset, per program, per asset type, etc.

By comparing the correlated QoD, QoE, and latency scores, problems in the media delivery process are identified and localized. When the problems are significant, alerts are generated. By combining the QoD, QoE measures, the extracted features, and the alerts generated, optimization methods may be applied that generate suggestions on each of the operation points 108 in the delivery chain 100 for actions that may be performed to improve the delivery process. The alerts and optimization suggestions may be transmitted to each of the operations 104, and the operations 104 may be adjusted correspondingly. The alerts and optimization suggestions may be different for different operations 104. For example, for encoders and transcoders, suggestions may be made on the bit rates that should be used for each content and for each of the transcoded derivative video profiles. When multiple media sources (e.g., primary, backup, and disaster recovery) or multiple encoders (e.g., H.264 vs. HEVC) are available for a media channel, suggestions may be made on which options are available and on which source or encoder to select that will generate the best viewer experience. Depending on the stage and location of the alerts being generated, the alerts may be classified into layers, for example, the video assets (a video asset refers to a distinct video content, for example, a movie or other video clip in video-on-demand application, or a TV channel, a TV program, or an ad video clip in live streaming environment) layer, the derivative video profile layer, per viewer stream layer, etc. When significant errors or failures occur at multiple points in the media delivery chain 100, an alert may be generated to reflect the cause of the failure, leading to a minimal number of alerts being generated. For example, at the transcoder, when the media quality of all transcoded derivatives together with the input stream are not available, or all have very low QoD or QoE, then a major alert on the input steam is generated, as opposed to many alerts generated for each of the derivative videos. In the content delivery network, alerts may be generated to identify delivery problems or to improve resource allocation, e.g., to avoid certain notes in the network, or to find better paths/routes in the content delivery network for the next step of video delivery.

At any monitoring point 108 along the multimedia delivery chain 100, when the QoE score is lower than a threshold value, or when the latency measure is longer than a threshold value, an alert may be generated to identify a QoE degradation or long-latency problem. When multiple alerts are generated at multiple points along a multimedia delivery chain 100, the critical QoE or latency problem may be localized at the monitoring point 108 where the first alert is generated. When a multimedia delivery system consists of multiple multimedia delivery chains 100, each for a media channel, program or service, their correlated QoE, latency measures, and alerts generated at a plurality of monitoring points 108 may be cumulated. The cumulated data may be grouped and/or divided for the whole enterprise, for each market region, for each media data center, for each service levels, for each type of encoders, for each type of programs, and for each time segment. The overall performance for a given time segment of each group and division may be measured and reported by computing the average or weighted average QoE, average or weighed average latency, and the alerting rate for the time segment. An example of alert template setup is given in FIG. 11. Examples of generated alert points are given as red and yellow dots in FIGS. 15, 19, 20, 21 and 22. Examples of classifying the channels/programs/services into critical, warning and stable categories are also shown in FIGS. 15, 19, 20, 21 and 22. Examples of dividing by different media centers are given in FIGS. 16 and 17. An example of comparing a set of encoders is given in FIG. 18. An example of reporting the performance for different regions is given in FIG. 23. An example of reporting the performance for different media service centers is given in FIGS. 24 and 25.

Figure 2:
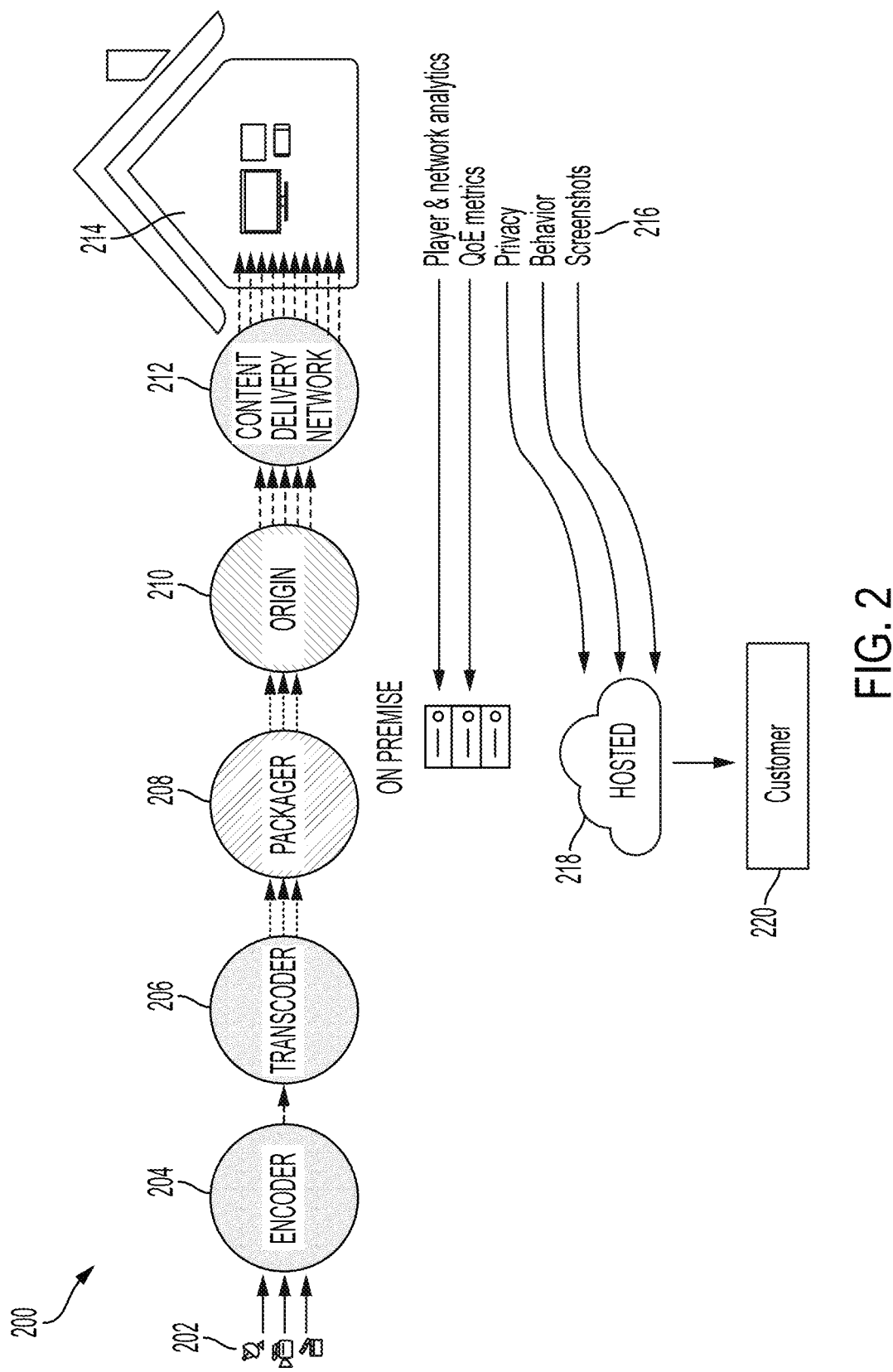
FIG. 2 illustrates an example end-to-end system for unified QoE monitoring, optimization, and management of video content.

FIG. 2 illustrates a practical example of an end-to-end system 200 for unified QoE monitoring, optimization, and management of video content. In the illustrated example of the video delivery chain 100, the encoder 204, the transcoder 206, the packager 208, the origin 210, the content delivery network 212, and the home viewing devices 214 such as TV, tablet and cell phones are examples of the operations in the video delivery chain 100 that may create video quality degradations and latencies. The source video feed may be in the format of many video formats, for example, SDI, transport stream, multicast IP, or mezzanine files from content producers/providers. For home TV, there are often set-top boxes that replay the received video streams to TV, e.g. through HDMI cables. The monitoring points 108 may be before the set-top box, at the set-top box decoder/player, and post set-top box through the HDMI cables.

An instance of video content may include, as some examples, live video feeds from current events, prerecorded shows or movies, and advertisements or other clips to be inserted into other video feeds. The video content may include just video in some examples, but in many cases the video further includes additional content such as audio, subtitles, and metadata information descriptive of the content and/or format of the video. As shown, the system 200 includes one or more sources 202 of instances of video content. In general, when a video distributor receives source video, the distributor passes the video content through a sophisticated video delivery chain such as shown, including a series of content sources 202, encoders 204, transcoders 206, packagers 208, origins 210, content delivery networks 212, and consumer devices 214 to ultimately present the video content.

More specifically, one or more encoders 204 may receive the video content from the sources 202. The encoders 204 may be located at a head-end of the system 200. The encoders 204 may include electronic circuits and/or software configured to compress the video content into a format that conforms with one or more standard video compression specifications. Examples of video encoding formats include MPEG-2 Part 2, MPEG-4 Part 2, H.264 (MPEG-4 Part 10), HEVC, Theora, RealVideo RV40, VP9, and AV1. In many cases, the compressed video lacks some information present in the original video, which is referred to as lossy compression. A consequence of this is that decompressed video may have a lower quality than the original, uncompressed video.

One or more transcoders 206 may receive the encoded video content from the encoders 204. The transcoders 206 may include electronic circuits and/or software configured to re-encode the video content from a source format, resolution, and/or bit depth into an instance of video content with a different format, resolution, and/or bit depth. In many examples, the transcoders 206 may be used to create, for each received instance of video content, a set of time-aligned video streams, each with a different bitrate and frame size. This set of video streams may be referred to as a ladder or compression ladder. It may be useful to have different versions of the same video streams in the ladder, as downstream users may have different bandwidth, screen size, or other constraints. In some cases, the transcoders 206 may be integrated into the encoders 204, but in other examples the encoders 204 and transcoders 206 are separate components.

One or more packagers 208 may have access to the ladders for each of the instances of video content. The packagers 208 may include hardware and/or software configured to create segmented video files to be delivered to clients that then stitch the segments together to form a contiguous video stream. The segmented video may include video fragments, as well as a manifest that indicates how to combine the fragments. The packager 208 may sometimes be integrated into the encoder 204 and/or transcoder 206 that first creates the digital encoding of the instance of video content, but often it is a separate component. In one example, the transcoders 206 and packagers 208 may be located in a media data center between the head-end and the content delivery network 212.

The packagers 208 may provide the packaged video content to one or more origins 210 to the content delivery network 212. The origins 210 refer to a location of the content delivery network 212 to which video content enters the content delivery network 212. In some cases, the packagers 208 serve as origins 210 to the content delivery network 212, which in other cases, the packagers 208 push the video fragments and manifests into the origins 210. The content delivery network 212 may include a geographically-distributed network of servers and data centers configured to provide the video content from the origins 210 to destination consumer devices 214. The consumer devices 214 may include, as some examples, set-top boxes connected to televisions or other video screens, tablet computing devices, and/or mobile phones. Notably, these varied devices 214 may have different viewing condition (including illumination and viewing distance, etc.), spatial resolution (e.g., SD, HD, full-HD, UHD, 4K, etc.), frame rate (15, 24, 30, 60, 120 frames per second, etc.), dynamic range (8 bits, 10 bits, and 12 bits per pixel per color, etc.). The consumer device 214 may execute a video player to play back the video content received to the devices 214 from the content delivery network 212.

As far as quality assurance is concerned, the user experience measured at the very end of the chain is what matters. However, only measuring QoE at the very end may be insufficient to help localize problems that could occur at any point along the video distribution chain of the system 200. Therefore, to ensure the video is faithfully and smoothly delivered to the consumer device 214, a quality assurance approach may include inspector components deployed at the consumer device 214 and also at each of the transition points along the video distribution chain.

The devices of the system (e.g., the encoders 204, the transcoders 206, the packagers 208, the origins 210, the content delivery network 212, and the consumer devices 214) may each be configured to provide information with respect to the QoE of the video content being experienced. In an example, the user experience may be measured using an objective full-reference perceptual video quality-of-experience (QoE) algorithm. The algorithm may perform an accurate, device-adaptive, cross-resolution, cross-content QoE score predictive of what an average human viewer would say about the quality of the video being viewed. In an example, the score may be defined on a scale of 0-200, which is evenly divided to five quality ranges of bad (0-19), poor (20-39), fair (40-59), good (60-79), and excellent (80-200), respectively.

An example QoE algorithm may be the SSIMPLUS metric based on the application of structured similarly (SSIM) determination techniques to the analysis of video content. SSIM is a perceptual metric that quantifies image quality degradation caused by processing such as data compression or by losses in data transmission. SSIM is a full reference metric that utilizes two images, a reference image and a processed image, and determines a perceptual difference between the images. Further aspects of SSIM are discussed in the paper: Z. Wang, A. C. Bovik, H. R. Sheikh and E. P. Simoncelli, "Image quality assessment: From error visibility to structural similarity," *IEEE Transactions on Image Processing*, vol. 13, no. 4, pp. 600-612, April 99004, which is incorporated by reference herein.

However, as compared to SSIM, the QoE score utilized herein further accounts for additional factors in the determination of the quality score, such as resolution of the target device and screen size of the target device. For instance, a video feed may receive a higher score on a smaller device, as the quality impairments to that feed may be less perceptible to the end user. By accounting for these additional aspects in the determination of the quality score, the QoE score utilized herein may allow for production of scores that are scaled to indicate comparable end-user perceived quality across devices.

The system 200 therefore provides for unified end-to-end QoE monitoring, optimization, and management with reference to the end user's QoE. All the QoE monitoring points may produce instantaneous scoring that reflects the end user's QoE up to the monitoring point in the video delivery chain. The QoE scores described herein are accurate, consistent, and directly comparable, such that the monitoring solutions of the entire video distribution network speaks the same language. Such a unified end-to-end solution lays the groundwork for subsequent operations. First, operation engineers will gain instantaneous awareness about how video QoE degrades along the chain, such that problems can be immediately identified, localized, and resolved. Second, design engineers may closely observe the QoE of the input and output of individual components, and perform better design and optimization, and be confident about the impact of their new design and optimization on the final user QoE. Third, managing executives will have a clear picture about how video quality evolves throughout the video delivery system and over long-time scales. Meanwhile, when long-time large-scale data has been collected, big data analytics can be performed, so as to make intelligent strategic decisions to manage user QoE.

Thus, perceptual end-user QoE may be measured at every transition point of the video delivery chain. Using QoE scoring, the QoE measurement may be made consistent throughout the delivery chain, both with comparable scoring for the same video along the delivery chain and also comparable scoring across different video content. Scores from all points throughout the video delivery chain may be aggregated, synchronized, and further adjusted to improve their consistency. Full-reference (FR), no-reference (NR) and degraded-reference (DR) scoring strategies may also be used at various different stages of the delivery chain.

Moreover, QoE measurement at the client-side (end-user device) may be used to combine presentation quality (measured at server side) and statistics collected by the video player (buffering, rebuffering, significant quality jumps due to profile switching, etc.). Problems may be identified and localized using the end-to-end QoE measurement for failure recovery and significant quality drops. The activation of backup streams and failure recovery streams may, accordingly, be controlled using these results.

Additionally, the objective QoE measures may be used to optimize components in the video delivery. These may include, but are not limited to: (i) optimizing the performance of the encoders 204/transcoders 206; (ii) finding best encoding profiles (ladder) for the encoders 204/transcoders 206; (iii) finding the best bitrates for each video service (e.g., TV channel), each program, and each period of time (hour, day, month, etc.); and (iv) optimizing the streaming process for each individual consumer. For adaptive video streaming, this may include choosing the best video profile at each time segment to maximize the overall QoE on a per-client per-view basis.

Regarding intelligence, data may be offered for analysis including: (i) QoE statistics on the performance of the network as a whole; (ii) QoE statistics per-stream, per-service (channel), per-region, per-title (asset), per-encoder, per-resolution, per-user, per-user device type, per-program (for TV), per-hour/day/week/month/year; (iii) relationships between QoE statistics and user engagement statistics; and (iv) resource allocation strategies based on QoE statistics.

The video player executed by the consumer devices 214 may also be configured to provide information with respect to the playback of video content back to the content delivery network 212. In an example, the consumer devices 214 may provide back information indicative of player and network analytics. This information may include, for instance, indications of dropped frames or packets, player connection speeds, buffer size, etc.

In an example, the video player of the consumer devices 214 may provide network metrics, as well as the information with respect to the QoE of the video content, from the consumer device 214 to the packager 208. As one possibility, this data flow may be performed back through the content delivery network 212, through the origins 210, back to the packagers 208, although other approaches are possible.

Responsive to receipt of the information from the consumer device 214, the packager 208 may be configured to make real-time adjustments to the version of video content being provided to the consumer device 214. By real-time, such adjustment may advantageously be made in the sub-second timeframe, or preferably even faster. In an example, the packager 208 may determine, based on the information received from the consumer device 214, that a different version of the video content may be more applicable to be sent to the consumer device 214. More specifically, based on the QoE score received from the consumer device 214, the packager 208 may determine that the consumer device 214 may still be able to provide an adequate QoE score using a lower-bandwidth version of the video content. Accordingly, the packager 208 may change the video streaming to use a different transcoded version of the video content from the ladder that is of lower bandwidth, but that still will provide adequate QoE to the consumer. In doing so, the system 200 may be able to provide the same or substantially the same quality of video to the consumer, while at the same time making the best use of available bandwidth and other resources along the system 200. Notably, the ability to regulate bandwidth while accounting for quality is unavailable in systems that lack QoE score information that is received from the consumer device 214.

The video player may also be configured to provide other information as well, such as an identifier of the consumer device 214 or the consumer at the consumer device 214 that may be used to correlate information about use of the consumer device 214 while protecting the privacy of the consumer. The video player may also provide behavioral information, such as information about when playback of the video content was initiated or completed, or when in the context the video was paused, fast-forwarded, rewound, or turned off. The video player may also provide screenshots or other information with respect to the video content provided to the consumer via the consumer device 214. Such data may be useful in determining why the QoE scoring identified a particular score at the consumer device 214.

In an example, the privacy identifiers, behavior data, and screenshots may be provided to a hosted cloud 218 for later analysis. In an example, one or more customers 220 or other data analysis services may utilize the hosted data to identify issues with the video content, such as time indexes in the content where users tend to drop off.

Figure 3:
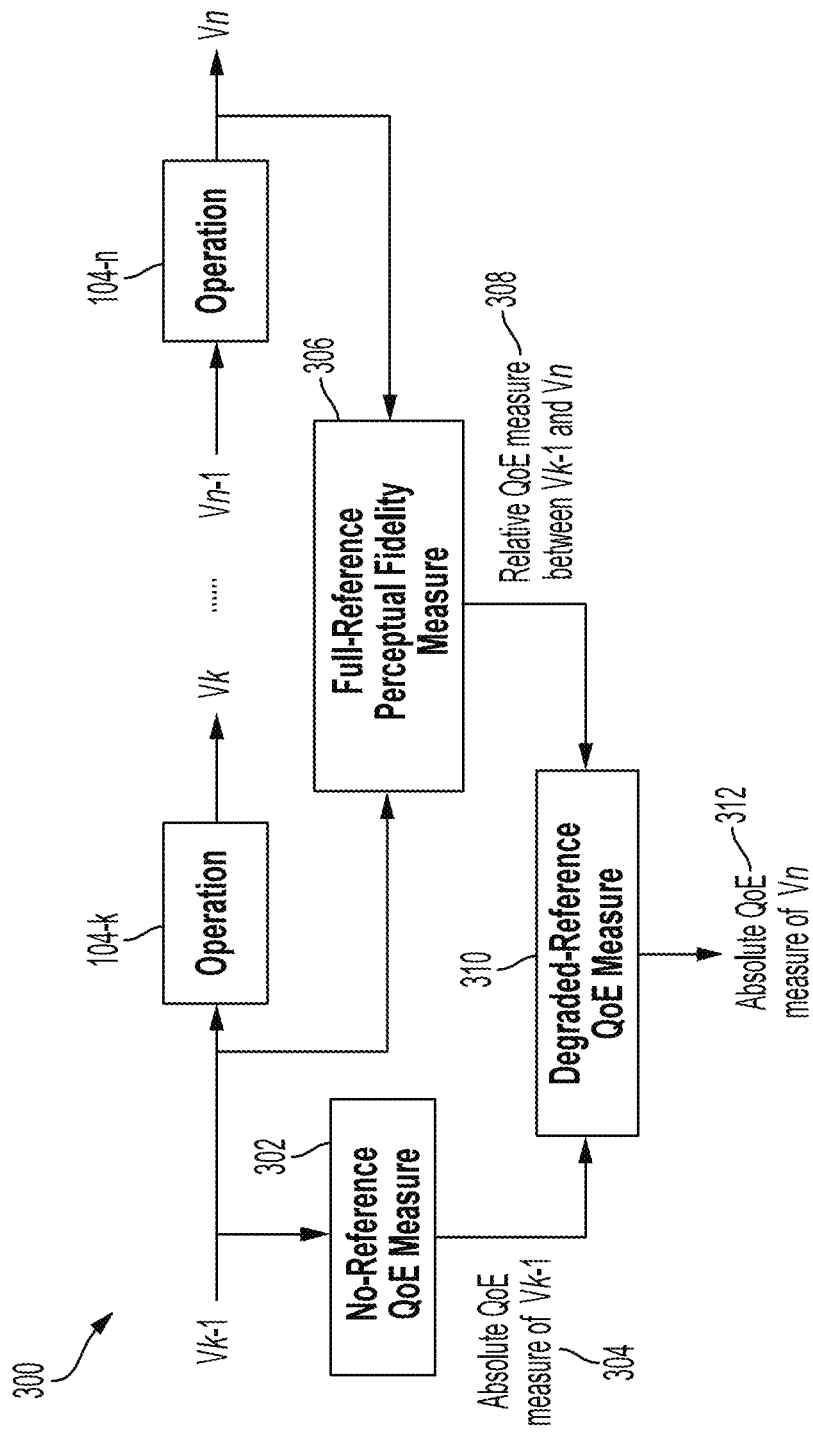
FIG. 3 illustrates an example degraded-reference QoE assessment.

FIG. 3 illustrates a reduced-reference framework 300 for QoE measurement. A degraded-reference (DR) QoE measure targets at computing the absolute QoE at the output of a video operation 104-$k$ based on not only the output video being evaluated, but also the input video $V_{k-1}$ to the operation 104-$k$ as a reference, whereas the reference video is not of pristine or distortion-free quality, but its quality has been degraded in previous operations. As shown, the degraded-reference (DR) approach may be used to generate correlated QoE scores at two points along the multimedia delivery chain 100, where there may be one or multiple operations 104 between the media source 102 and the testing point.

An example of such an operation 104-$k$ is a video transcoder. A no-reference (NR) QoE measure 302 may be applied first to obtain an NR QoE measure for the input source. This is regarded as the absolute QoE of the input source 304. A full-reference (FR) QoE measure 306 may take both the source input $V_{k-1}$ and the test output $V_n$ to create an FR perceptual fidelity measure 308 for the relative QoE between input and output. A DR QoE measure 310 is then performed that take the absolute QoE measure of the source input and the relative QoE measure between the input and output, and create an estimate of the absolute QoE score 312 for the output.

Figure 4:
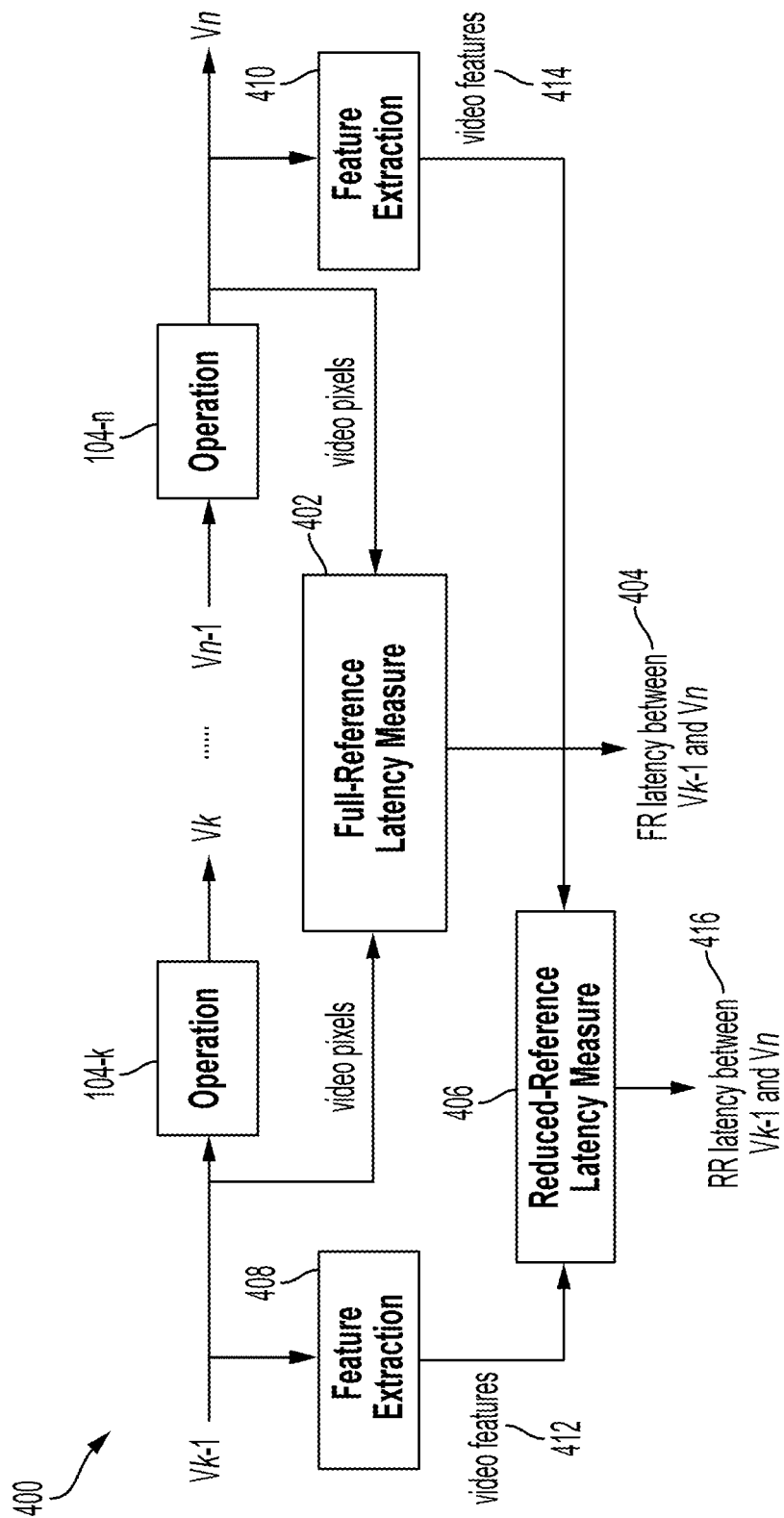
FIG. 4 illustrates an example full-reference and reduced-reference latency assessment.

FIG. 4 illustrates full-reference (FR) and reduced-reference (RR) frameworks 400 for latency measurement. A RR measure assesses a test video using another video as reference, where the reference video may have pristine or better quality then the test video and may be at an earlier stage of the video delivery chain before the test video. However, the reference video is not fully available in terms of full pixel content, but only certain features, namely RR features, are available when assessing the test video. Such RR features may be statistical features of the reference video content, such as the mean, standard deviation, higher-order moments, quality measure, or statistical model parameters extracted from the reference video. An RR approach can be used for both QoE and latency measurement by comparing the features from the reference and test videos. These FR and RR methods may be used to compute the latency between any two points along the multimedia delivery chain 100, as illustrated, where there may be one or multiple operations between the media source and the testing points.

The first method, the FR latency measure 402, decodes the video into pixels at both the source input $V_{k-1}$ and test output $V_n$, and aligns the two videos along the temporal direction to the frame level. Once the videos are temporally aligned, the temporal offset can then be combined with the video frame rate (in terms of frames per second), to create an estimate of the latency 404.

The second method, the RR latency measure 406, does not apply temporal alignment to fully decoded video pixels. Instead, feature extractions 408, 410 are applied to both the source input $V_{k-1}$ and test output $V_n$ videos, respectively, to create video features 412, 414, respectively. The video features 412, 414 may include statistical quantities such as the mean and standard deviation of the signal intensity and spatial and temporal information content on a per moment (e.g., per frame or per second) basis. The features 412, 414 are regarded as reduced-reference (RR) features of the videos and are transmitted to a common location (e.g., to the server or in a public or private cloud). The RR latency measure 406 is then applied by aligning the received features 412, 414, and the alignment offset is used to estimate the latency 416 between the source input $V_{k-1}$ and test output $V_n$.

Figure 5:
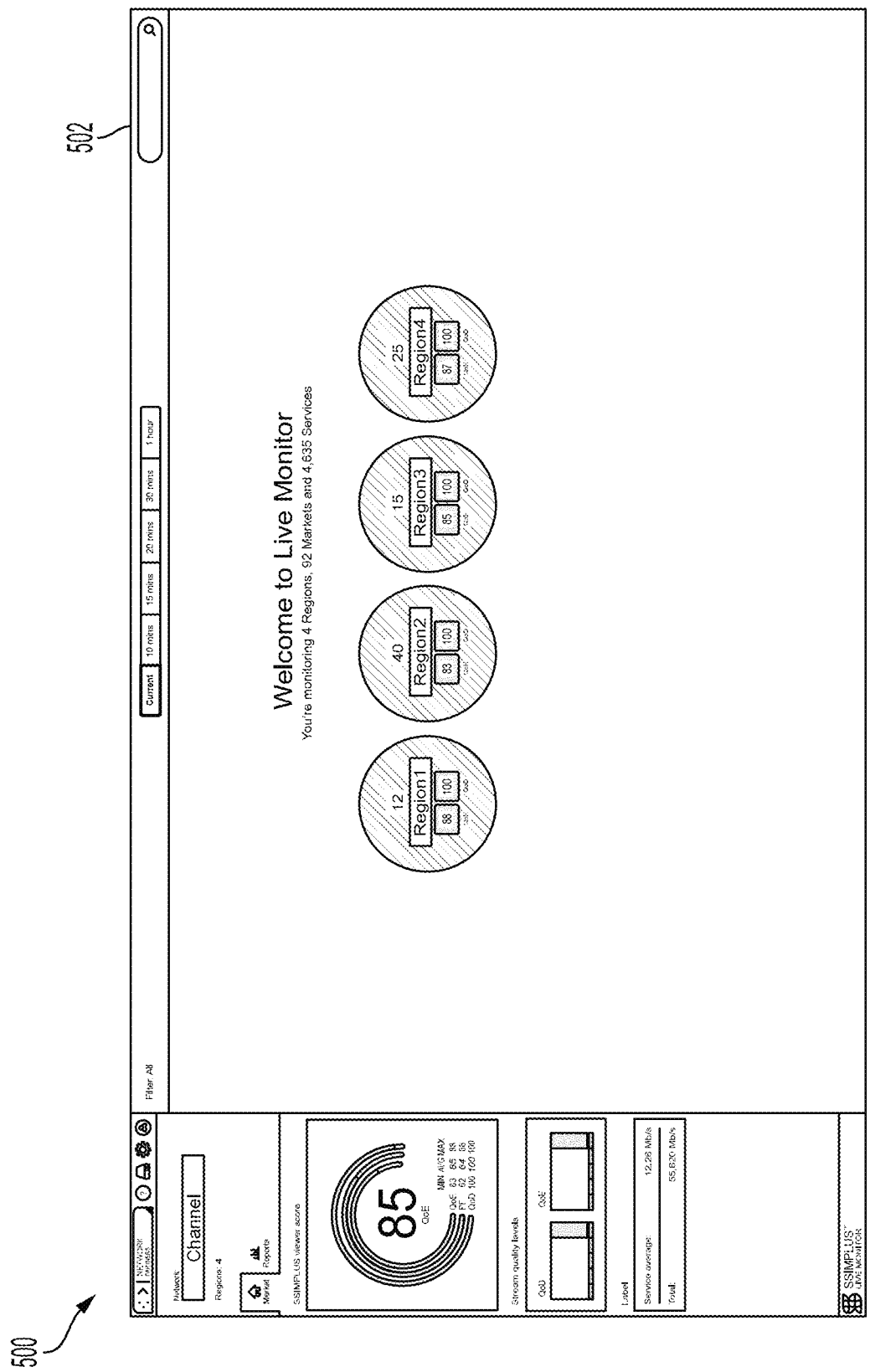
FIG. 5 illustrates a welcome screen of a live monitor.

The described system 200 may provide for further applications as well. FIGS. 5-10 illustrate examples of a live monitor 502 application. FIG. 5 illustrates a welcome screen 500 of the live monitor 502. As noted in the welcome screen 500, four regions, 92 markets, and 4,635 services.

Figure 6:
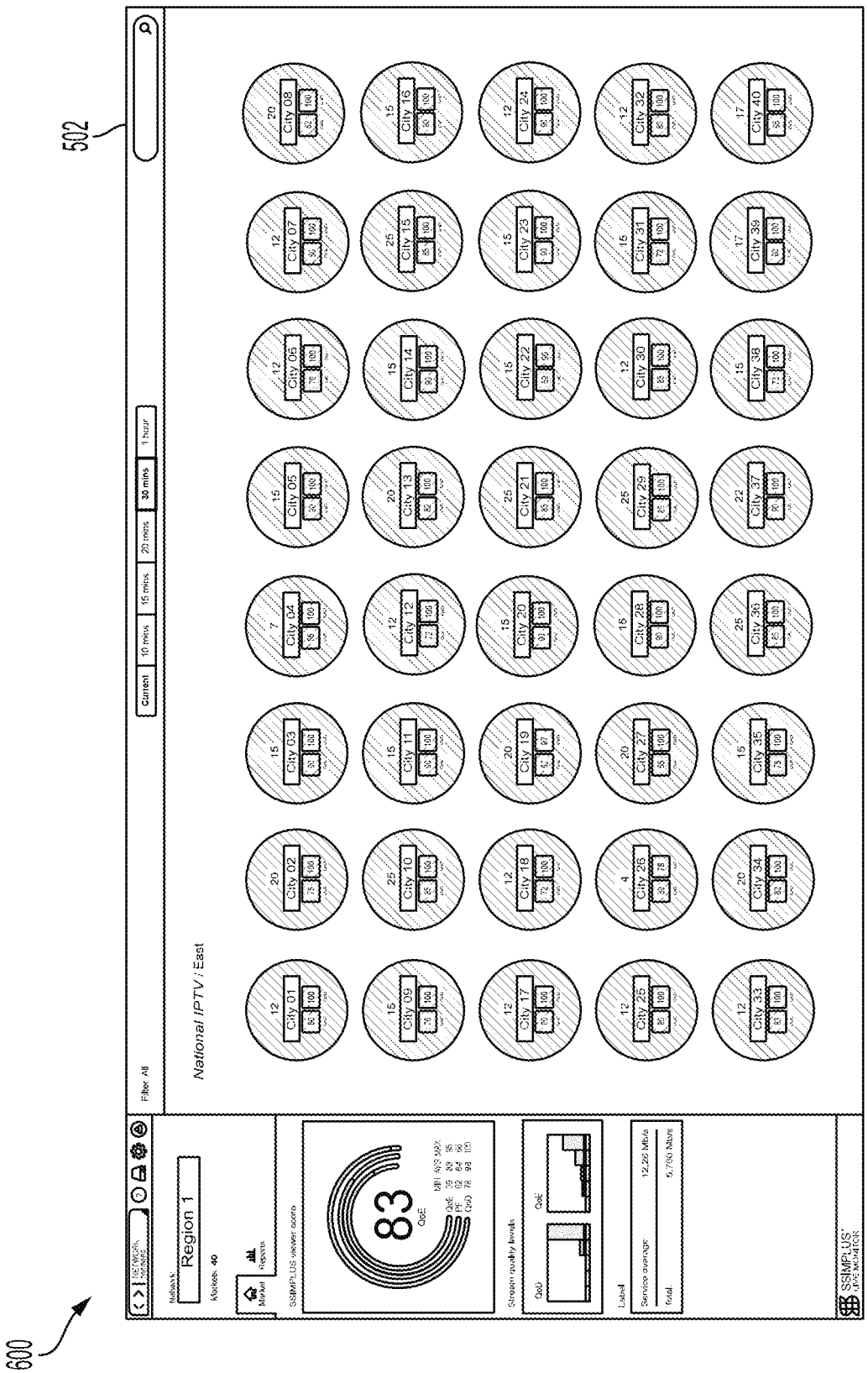
FIG. 6 illustrates a breakdown of markets for a selected region as shown by the live monitor.

FIG. 6 illustrates a breakdown of markets 600 for a selected region as shown by the live monitor 502. As shown, the breakdown is based on a selection of the East region from the welcome screen 500.

Figure 7:
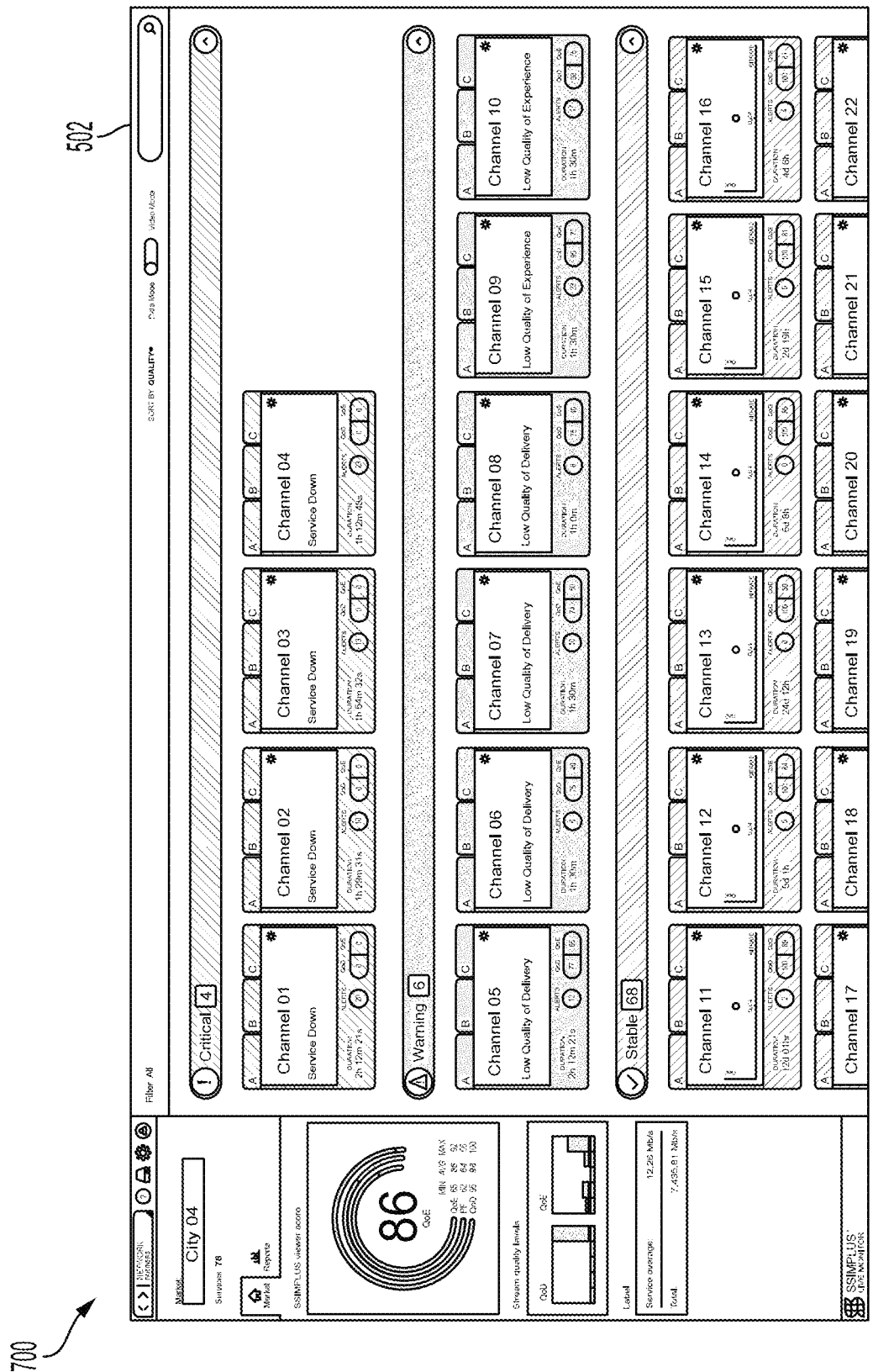
FIG. 7 illustrates a breakdown of services for a selected market as shown by the live monitor.

FIG. 7 illustrates a breakdown of services 700 for a selected market as shown by the live monitor 502. For instance, the breakdown is based on a selection of the Charleston market. As shown, the selection of information is for a data mode, as opposed to a video mode as shown in FIG. 10.

Figure 8:
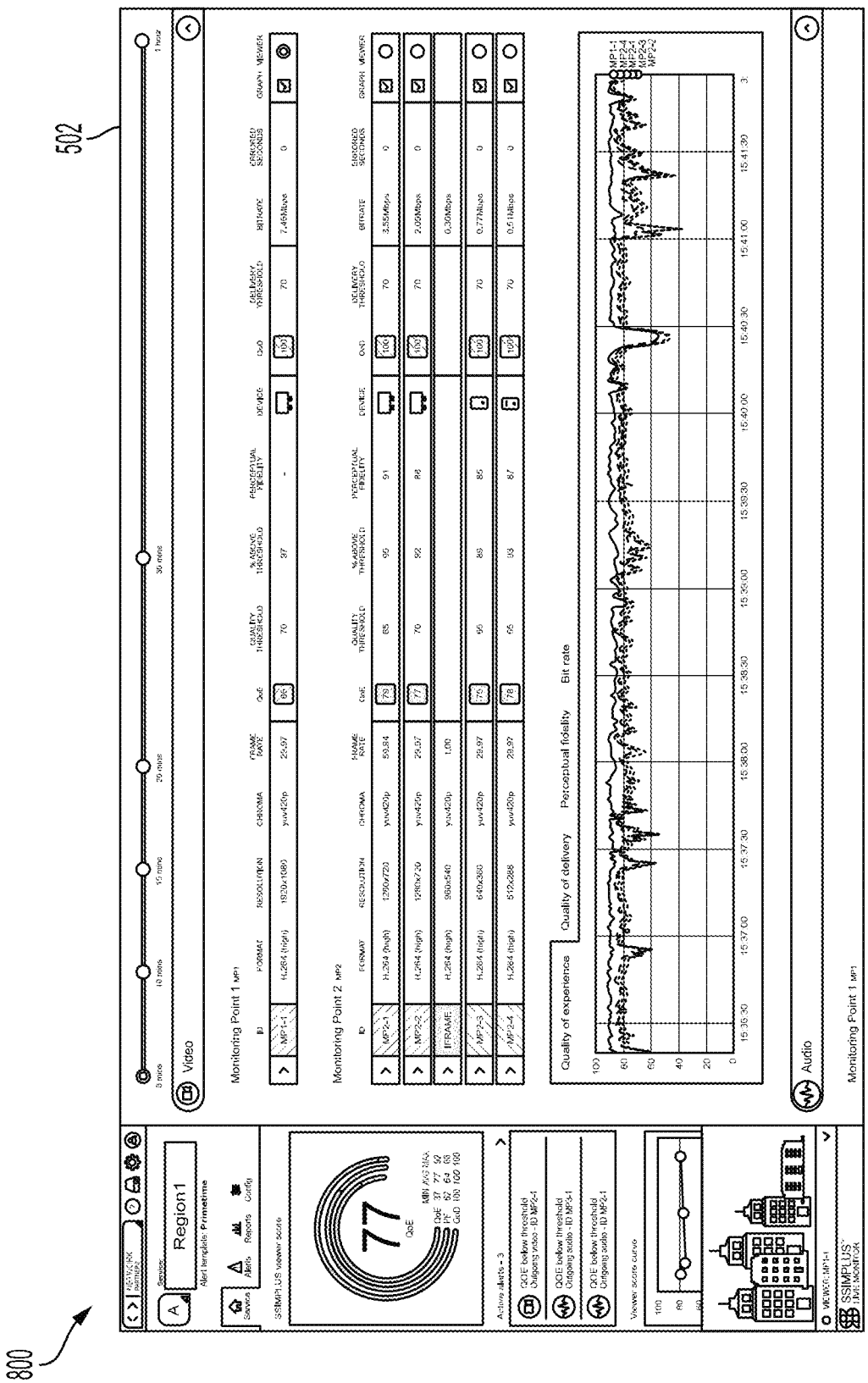
FIG. 8 illustrates an example breakdown for a service selected from a market as shown by the live monitor.

FIG. 8 illustrates an example breakdown for a service 800 selected from a market as shown by the live monitor 502. As shown, the breakdown is for the CW East HD. Moreover, information can be seen in the breakdown retrieved from various monitoring points 108.

Figure 9:
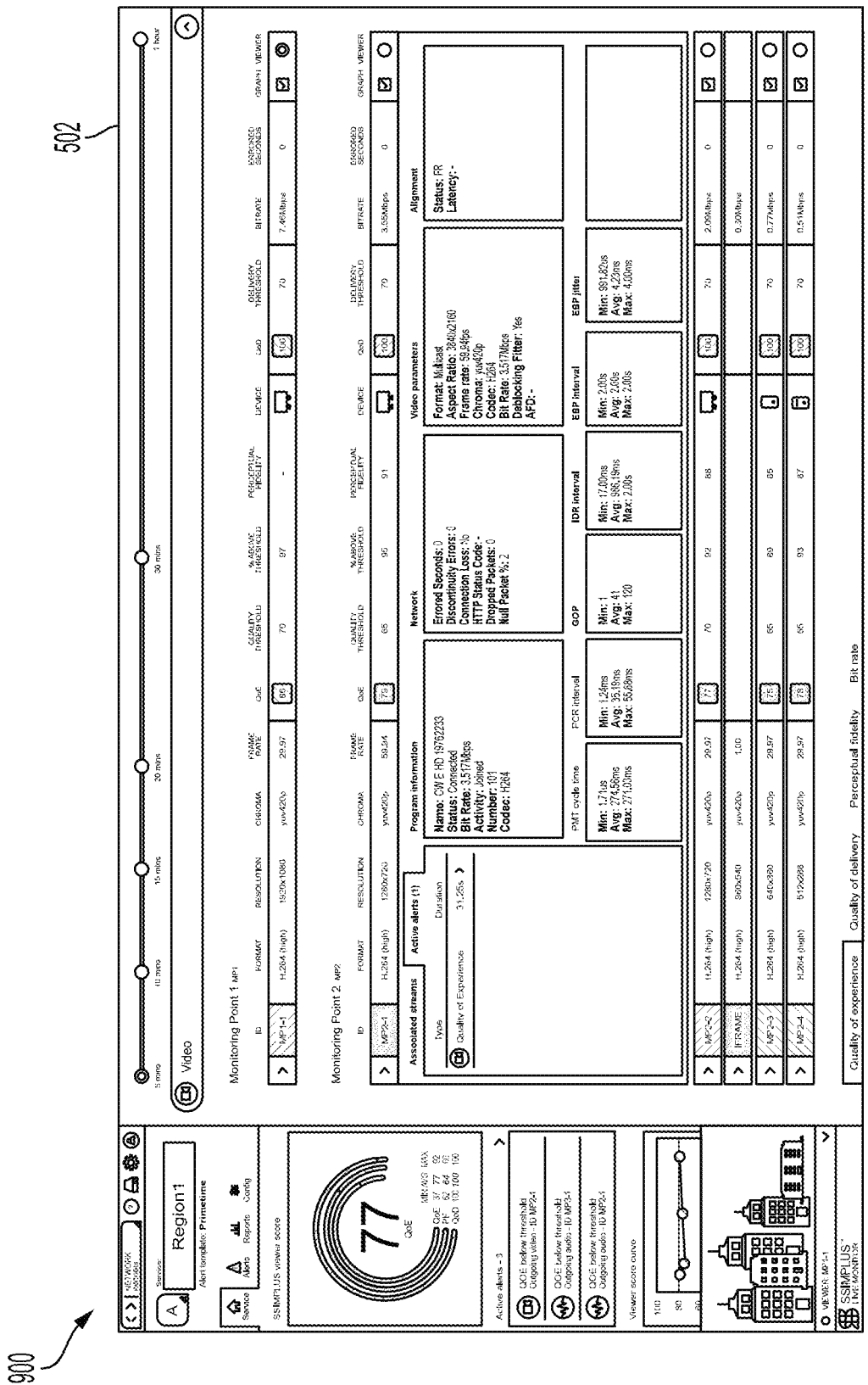
FIG. 9 illustrates an example expansion of information for a monitoring point for a selected service as shown by the live monitor.

FIG. 9 illustrates an example expansion of information 900 for a monitoring point 108 for a selected service as shown by the live monitor 502. As shown, further details of the monitoring of the service are provided for the monitoring point "2". This information includes, for example QoE scores, network information, video parameters, and any alerts.

Figure 10:
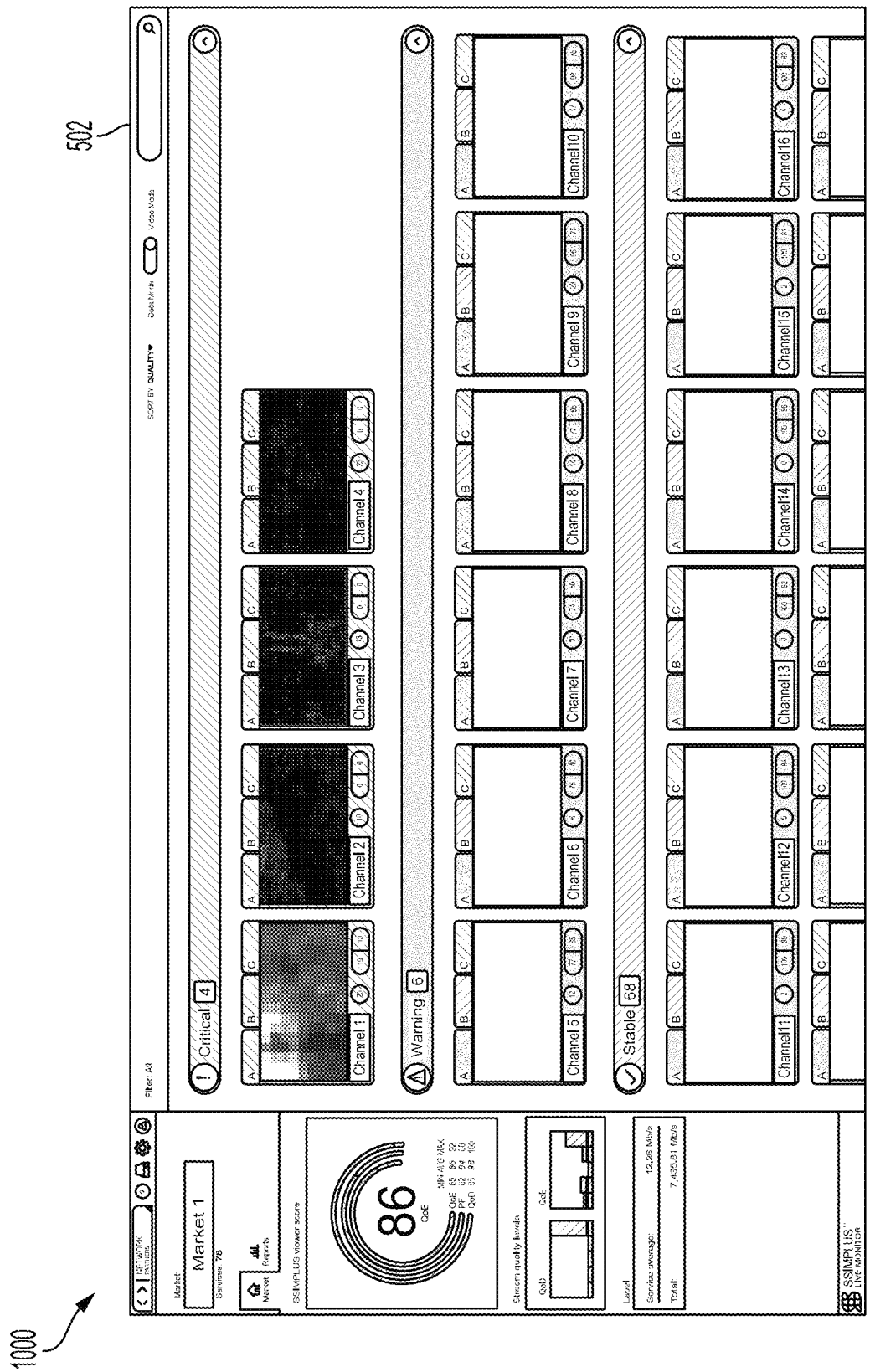
FIG. 10 illustrates a breakdown of services for a selected market in video mode as shown by the live monitor.

FIG. 10 illustrates a breakdown of services 1000 for a selected market in video mode as shown by the live monitor 502. As compared to what is shown in FIG. 7, each service is represented by a video feed rather than by data descriptive of the video. This allows for a quick visual inspection, such that the user can understand how the video feeds are being provided.

FIGS. 11-25 illustrate examples of a multiport live monitor 502 application. In general, the live monitor 502 application may utilize the QoE information captured from the monitors of the system 200 to accurately predict the end viewer's display-adaptive QoE. These prescriptive QoE metrics may result in cost savings (e.g., bandwidth reductions in cases where a lower-bitrate stream would still provide adequate QoE) and provide further data for use in making technology decisions (e.g., which encoders to use). Cross-content video quality measurements may also be performed, and correlated QoE may be used to make true measurements and recommendations. The high performance of the system 200 ensures scalability for lifetime value (LTV) workflows, and the system 200 is also adaptive for numerous workflows and monitoring points 108 across the system 200.

The live monitor 502 may further make use of additional diagnostic journey tools to further strengthen triaging and issue resolution. These tools may include a video freeze on first monitoring point that alerts a user to a component at which video may have frozen. The enhanced video freeze algorithm may more accurately detect video freezes via more accurate slate detection, monochrome detection. The live monitor 502 may also implement temporal alignment reasoning, and alert-driven tiles on a market page that provide information in a useful format. NOC/Ops workflows may be supported through dashboards, tiles, and alerts. The live monitor 502 may also include enhanced support for quality on delivery (QoD) only workflow (e.g., when QoE data is unavailable) to broaden the available implementation scenarios.

As another possible application of the system 200, a video-on-demand (VOD) monitor may be implemented. The VOD monitor may support AB testing for configuration and purchasing decision for on demand content, as tuning encoders 204 can drive down costs while maintaining video quality. The VOD monitor may also provide a sandbox environment for encoder 204 and transcoder 206 output troubleshooting. The VOD monitor may include both a UX workflow and a RESTful API to automate processes and quality controls. Using the QoE data from the QoE monitors throughout the system 200, the VOD monitor may accurately predict the end viewer's display-adaptive QoE.

As a specific optimization process to optimize the QoE or optimize the rate-distortion performance for the best QoE using the lowest bit rate, smart adaptive streaming decisions, or what we call stream smart, may be done in two approaches.

Figure 11:
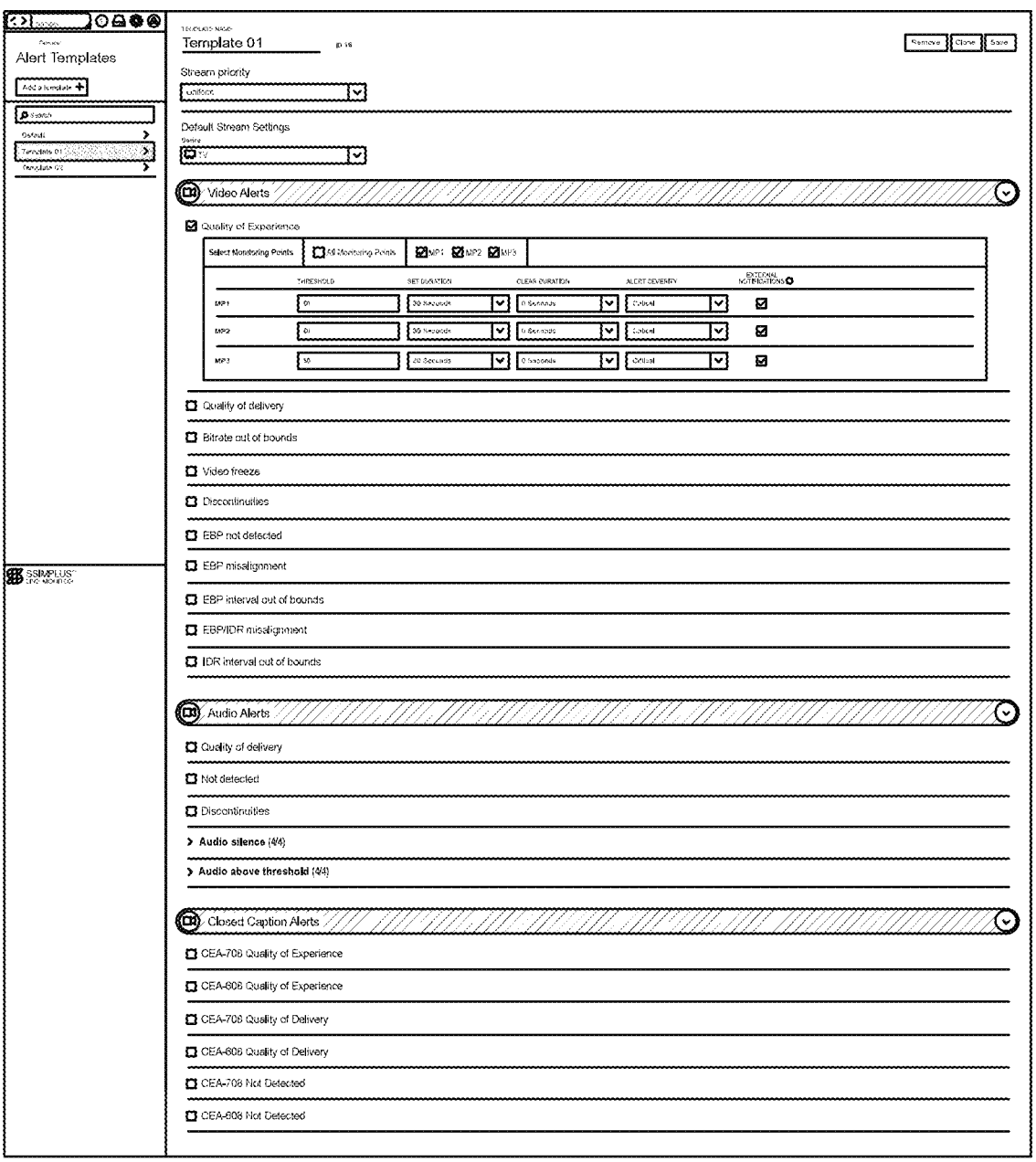
FIG. 11 illustrates an example of alert template setup in a multiport live monitor application.

FIG. 11 illustrates an example of alert template 1100 setup in a multiport live monitor 502 application. The alert template 1100 may include various criteria that may be selected to trigger the alert, e.g., criteria related to video, audio, and/or closed captioning of the streamed content.

Figure 12A:
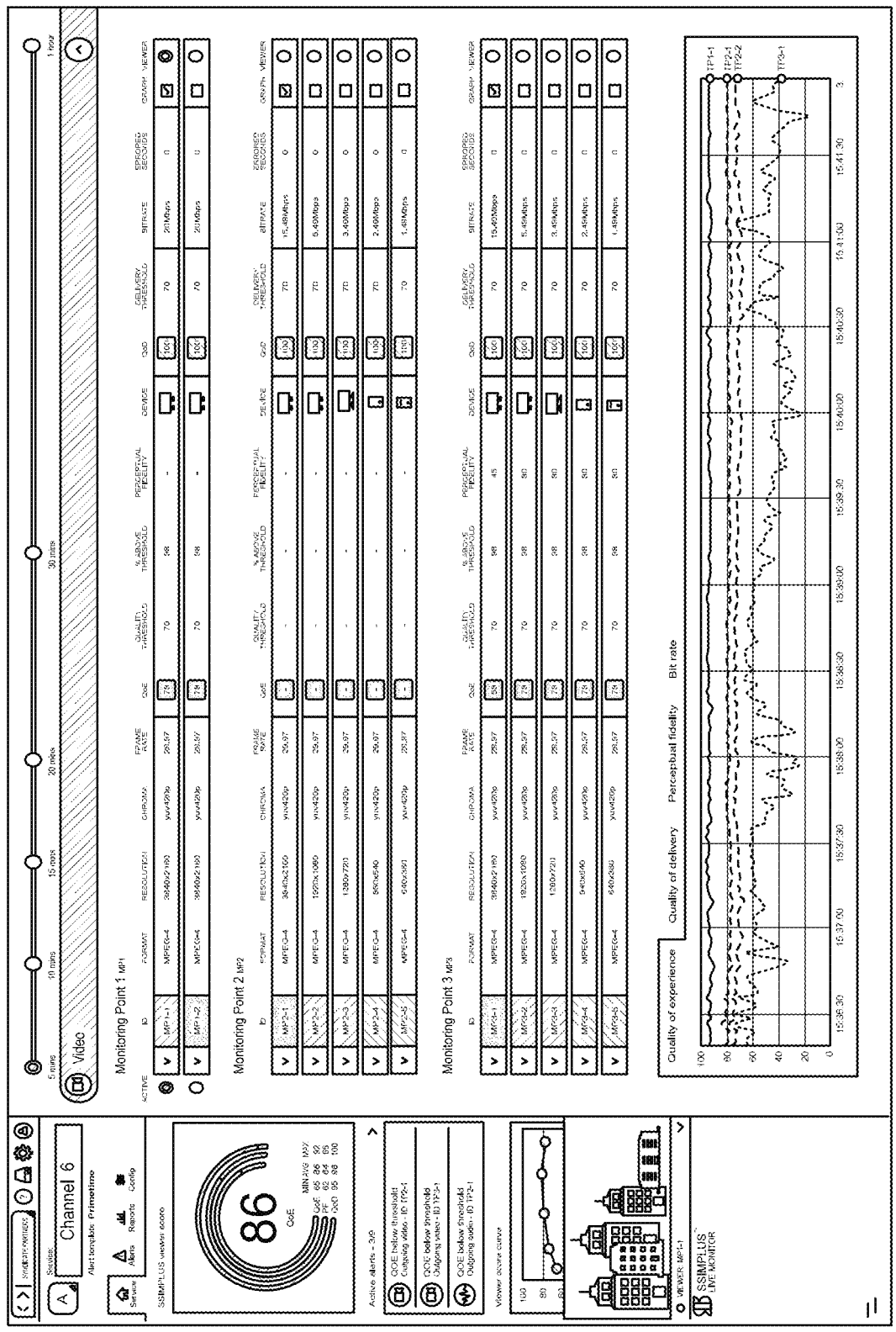
Figure 12B:
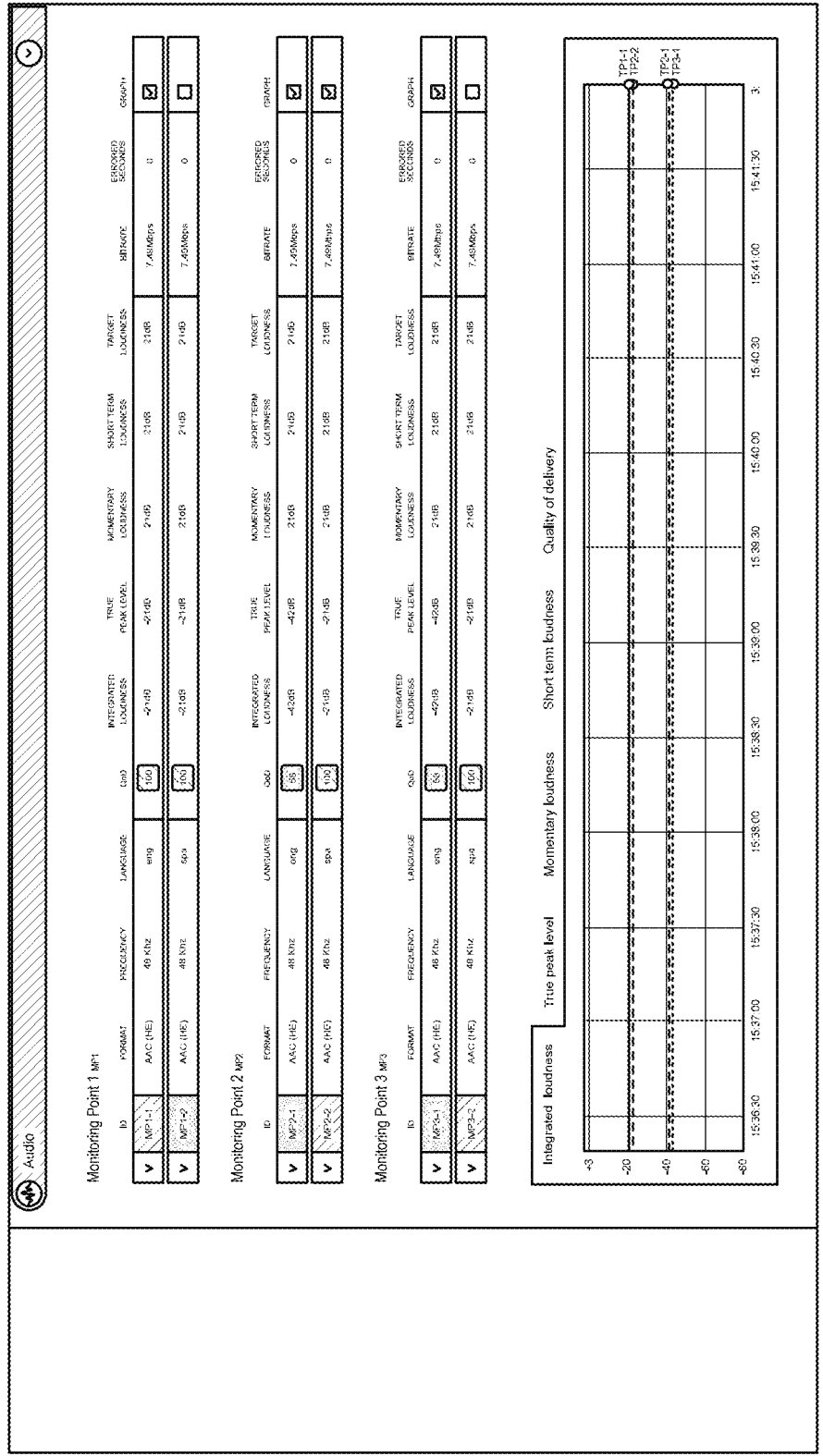
Figure 12C:
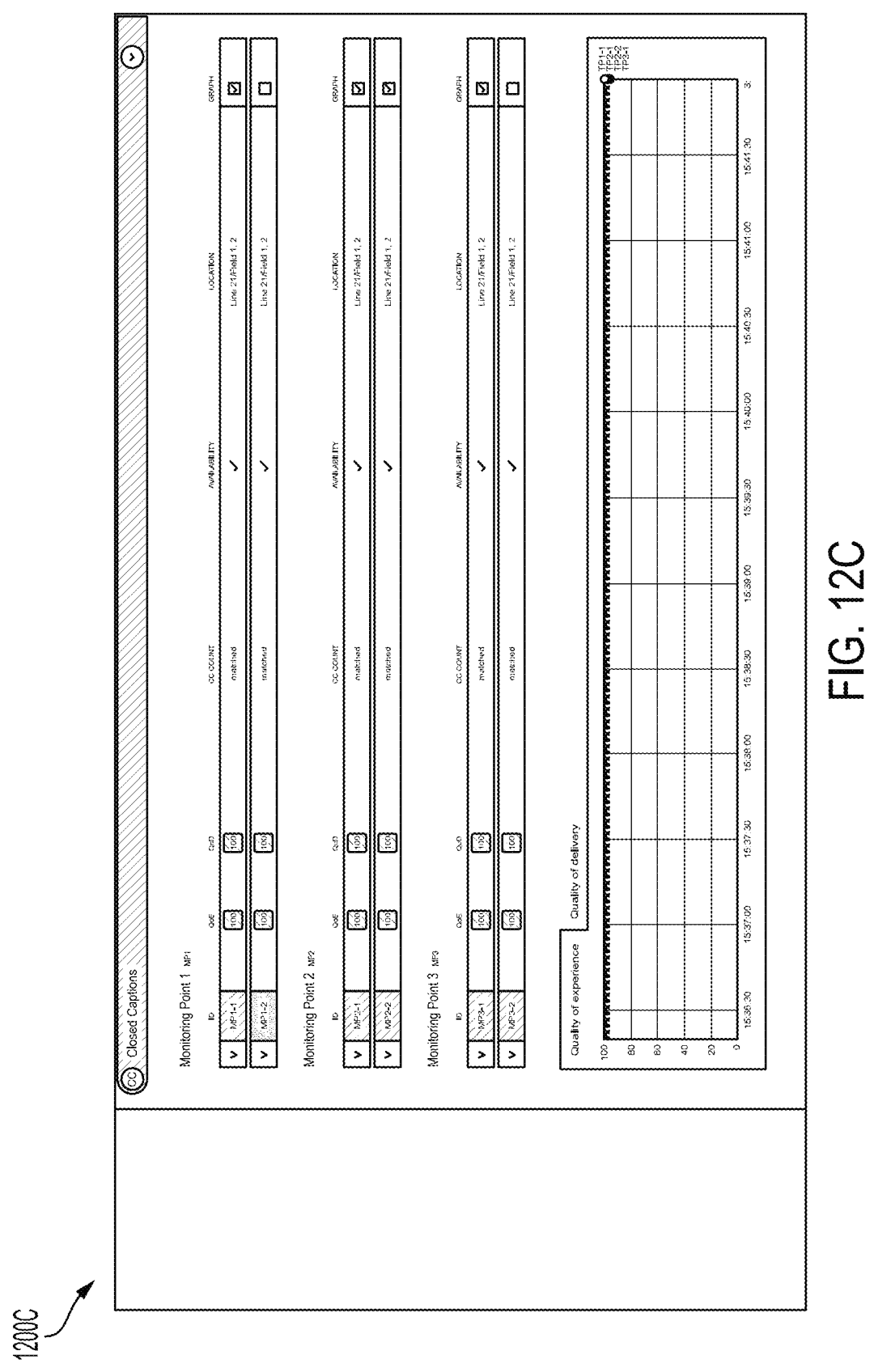

FIGS. 12A, 12B, and 12C illustrate an example 1200 of QoE assessment presentation, including both statistics and QoE curves, in a multiport live monitor application. As shown, various data from monitoring points 108 for a channel is displayed in the multiport live monitor application.

Figure 13:
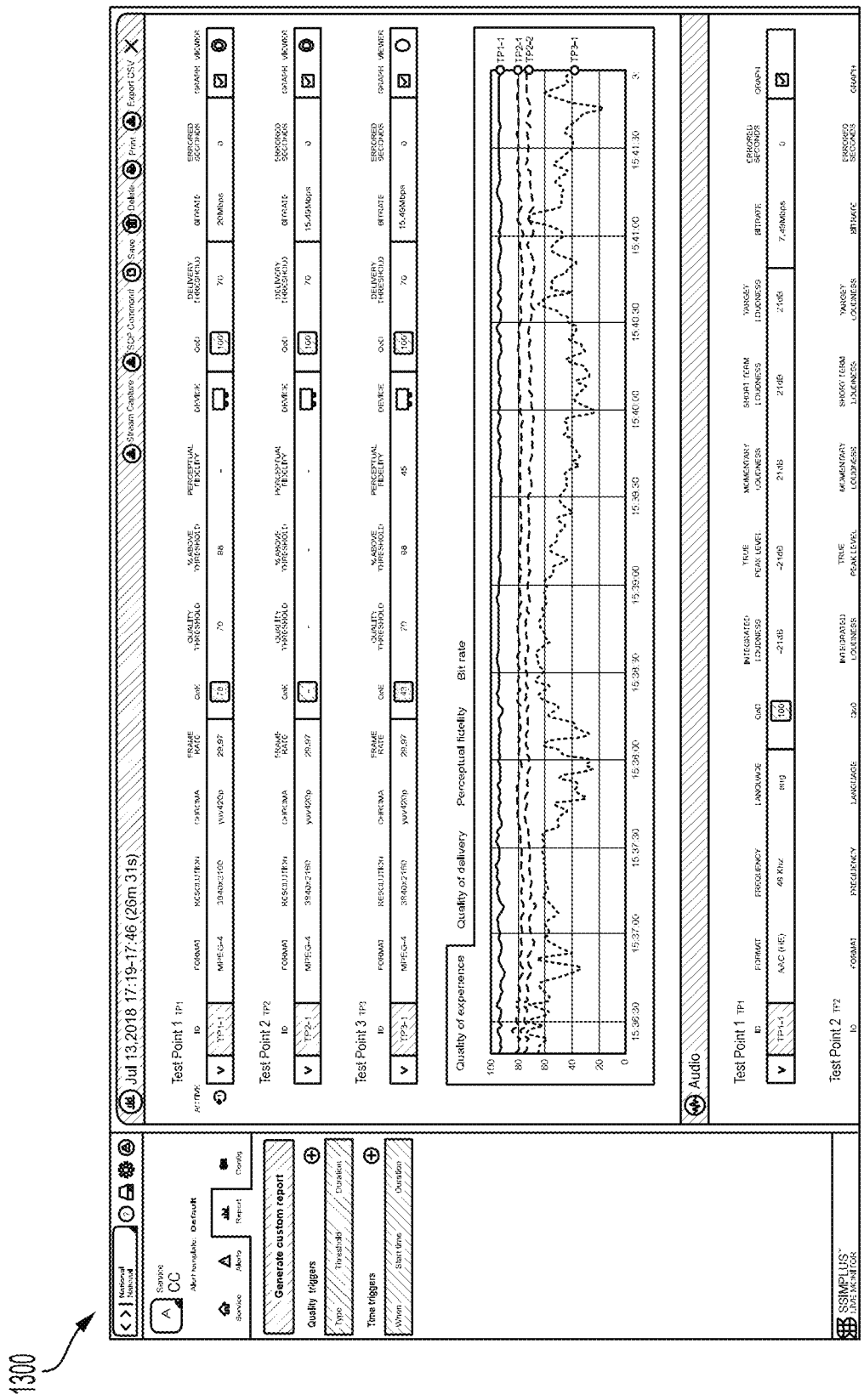
FIG. 13 illustrates an example of quality assessment reporting in a multiport live monitor application.

FIG. 13 illustrates an example 1300 of quality assessment reporting in a multiport live monitor 502 application. As shown, a QoE score for a stream is shown at several test points over time.

Figure 14:
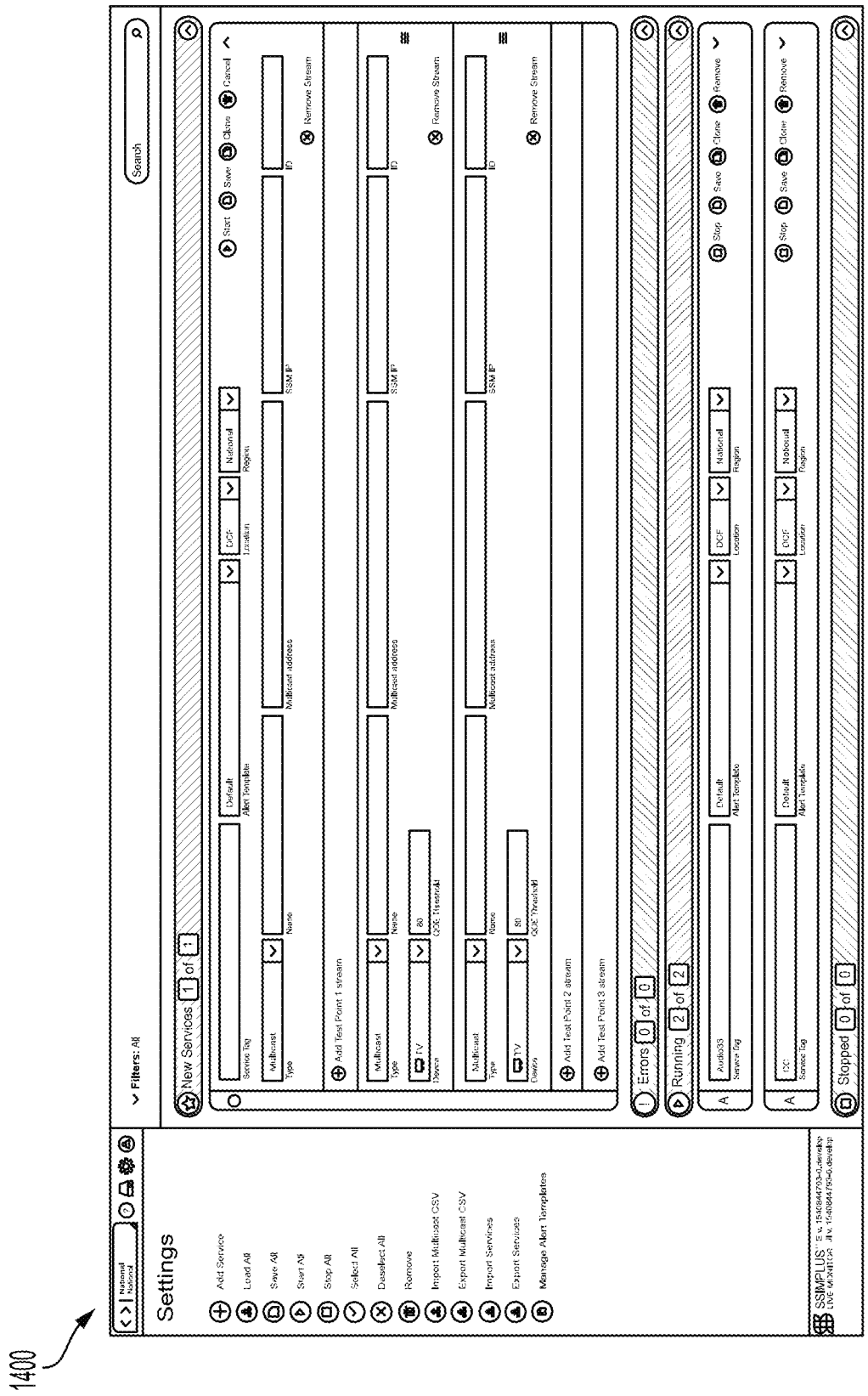
FIG. 14 illustrates an example of quality assessment reporting setup in a multiport live monitor application.

FIG. 14 illustrates an example 1400 of quality assessment reporting setup in a multiport live monitor 502 application. The setup may allow the user to provide information regarding services on which to be reported.

Figure 15:
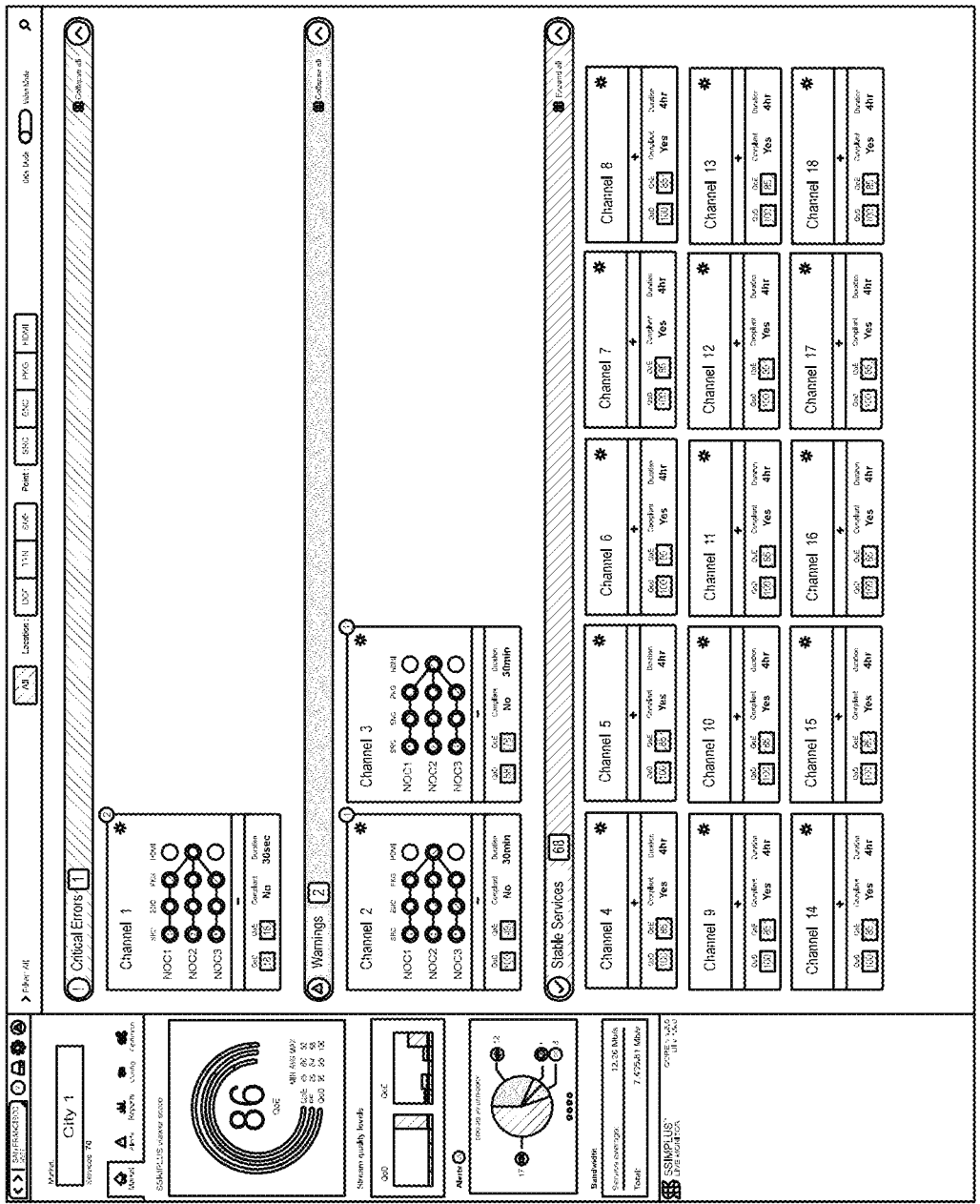
FIG. 15 illustrates an example of market region multiple services quality monitoring in a multimedia delivery network.

FIG. 15 illustrates an example 1500 of market region multiple services quality monitoring in a multimedia delivery network. As shown, the quality monitoring indicates scoring for a city of the network, as well as indications of which channels have alerts. For instance, channel 1 is indicated as having a critical error, while channels 2 and 3 are each indicates as having warnings. The remining channels are indicated as being stable.

Figure 16:
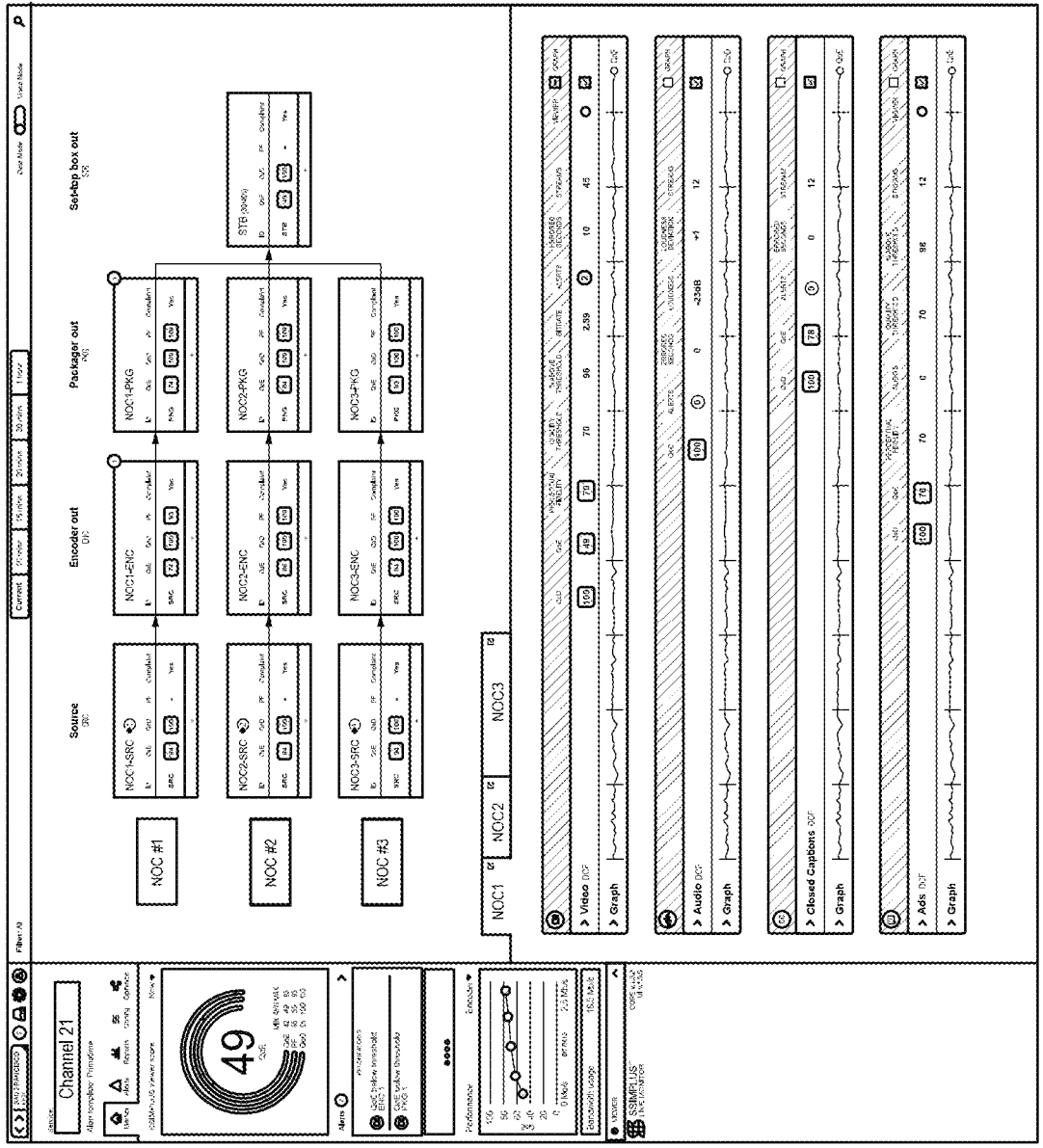
FIG. 16 illustrates an example of quality monitoring at multiple media service centers in a multimedia delivery network.
Figure 17:
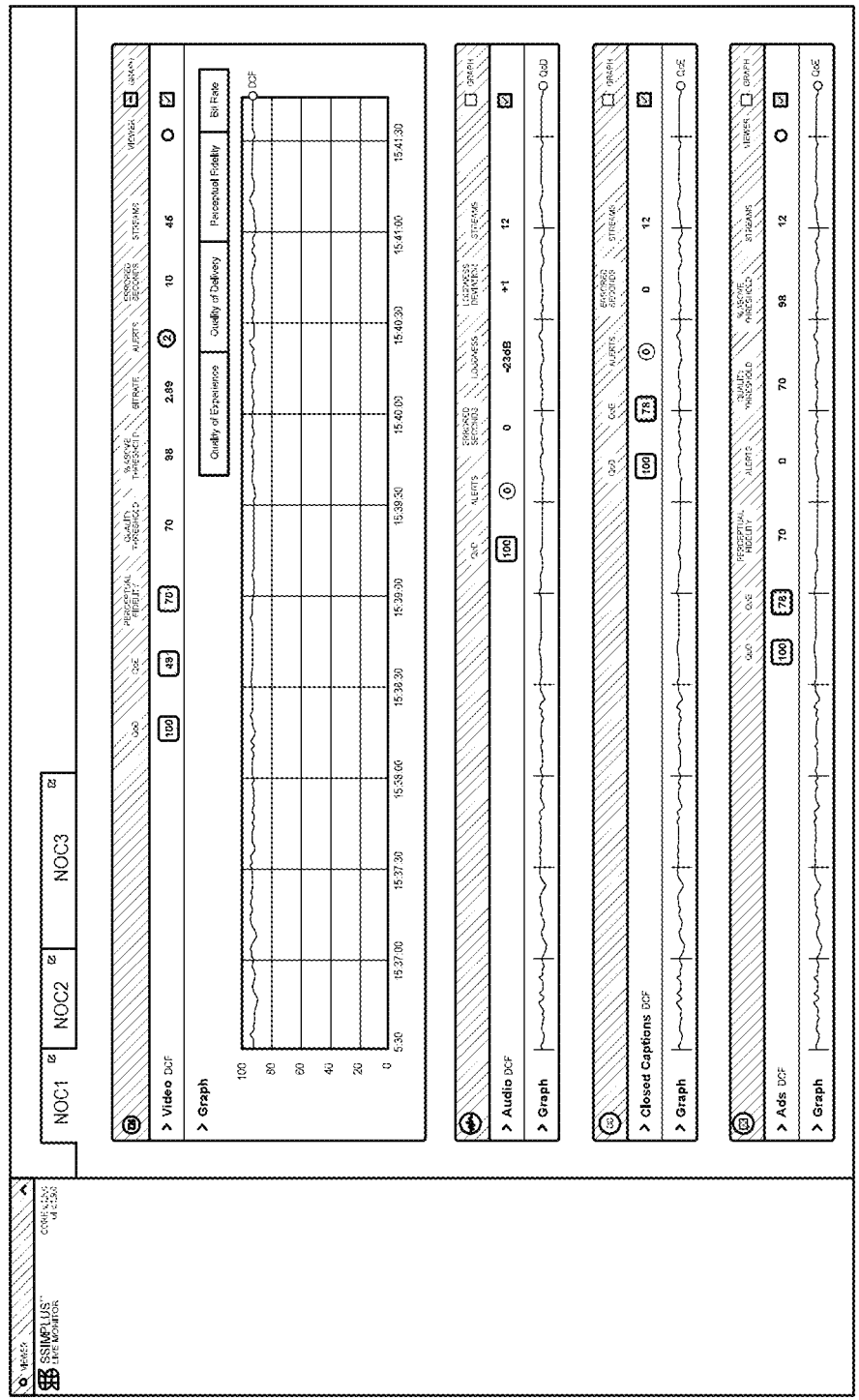
FIG. 17 illustrates an additional example of quality monitoring at multiple media service centers in a multiport live monitor application.

FIG. 16 illustrates an example 1600 of quality monitoring at multiple media service centers in a multimedia delivery network. For instance, quality monitoring of video, audio, closed captions, and ads is indicated for a particular channel. FIG. 17 illustrates an additional example 1700 of quality monitoring at multiple media service centers in a multiport live monitor 502 application. In the example 1700, quality of experience is illustrated in further detail for the video.

Figure 18:
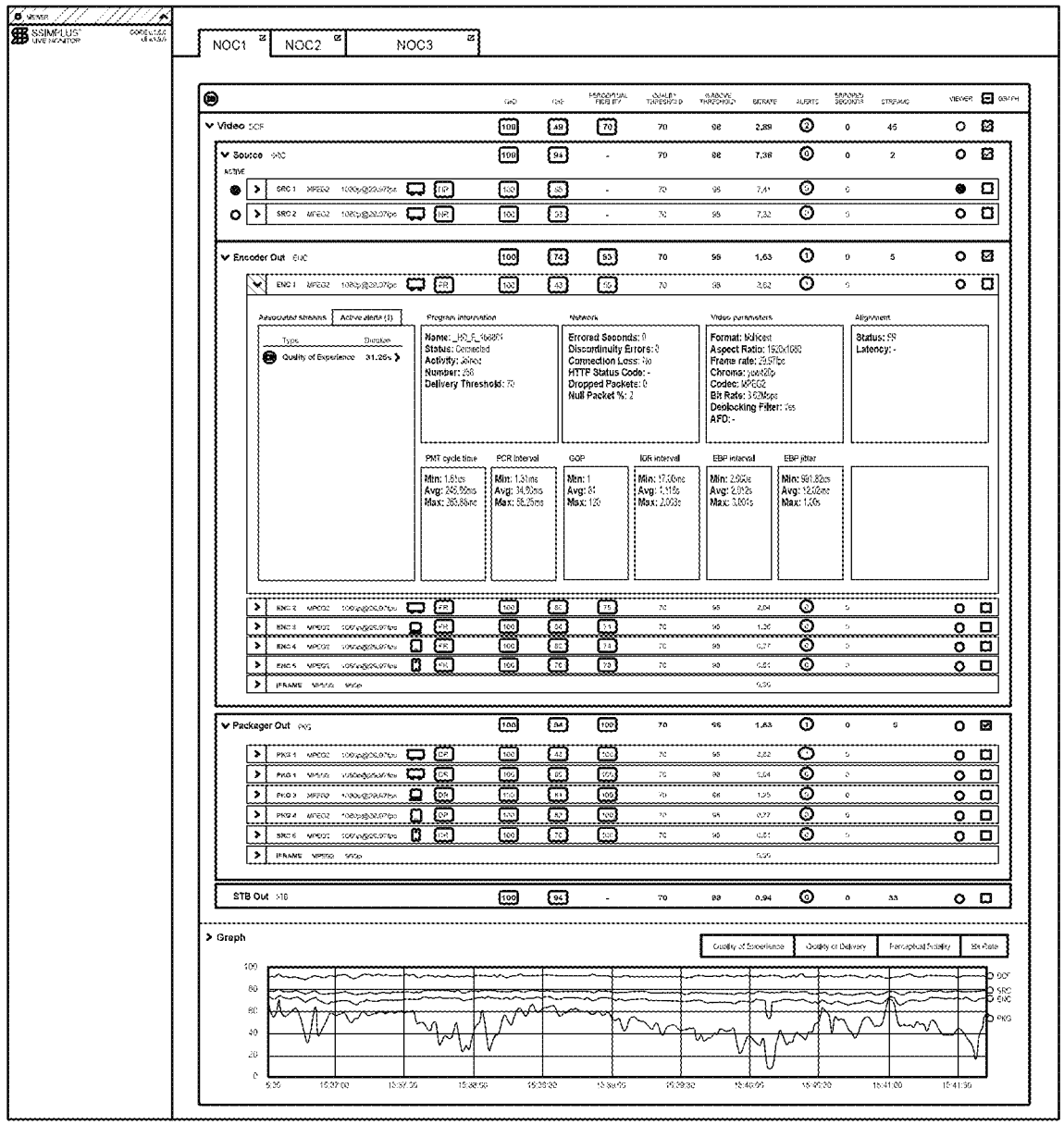
FIG. 18 illustrates an example of multiple encoder comparison in a multiport live monitor application.

FIG. 18 illustrates an example 1800 of multiple encoder comparison in a multiport live monitor 502 application. As shown, information with respect to multiple sources, encoder 204 outputs, and packager 208 outputs are shown.

Figure 19:
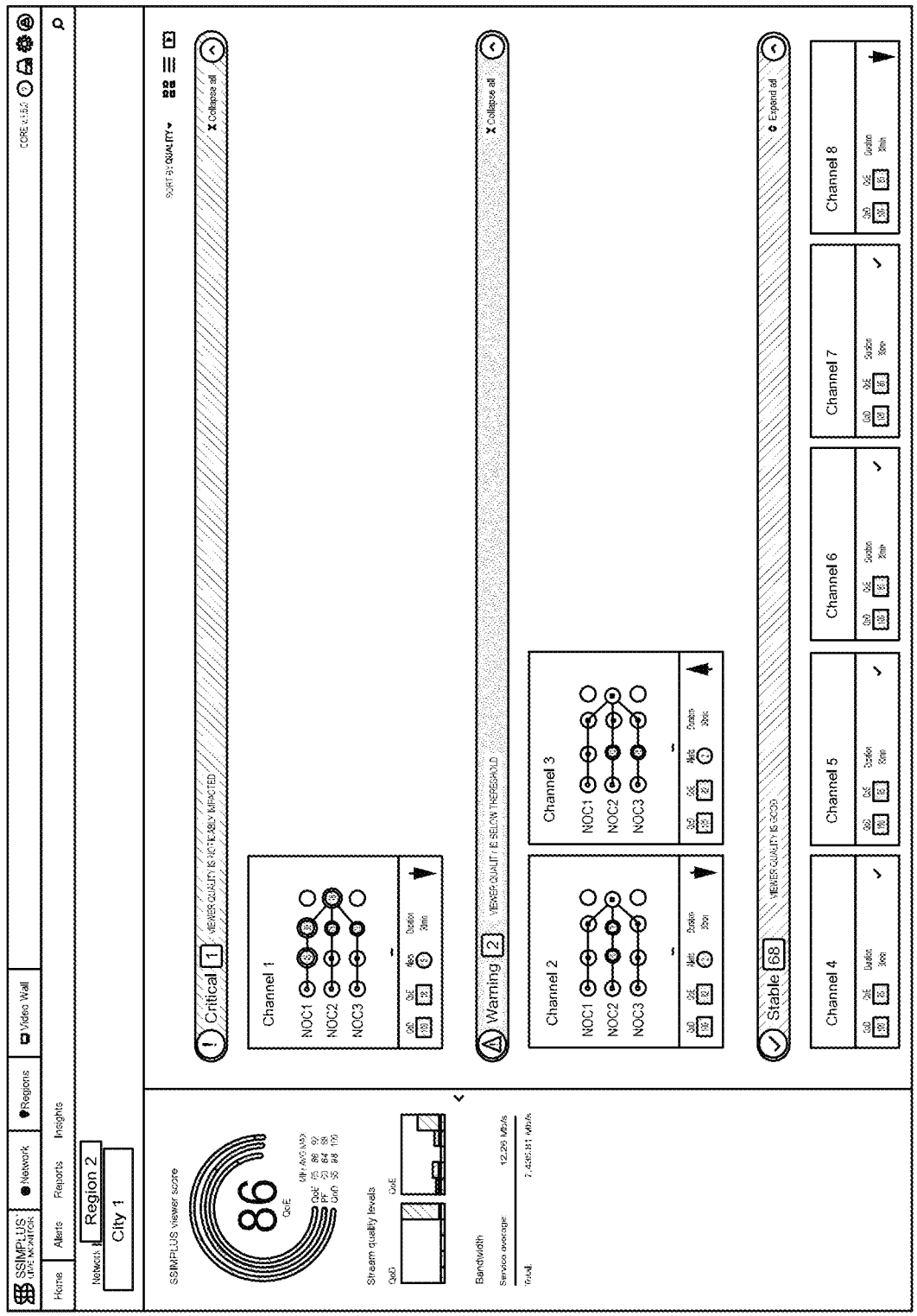
FIG. 19 illustrates an example of service performance classification (critical, warning, and stable) in a multimedia delivery network.
Figure 20:
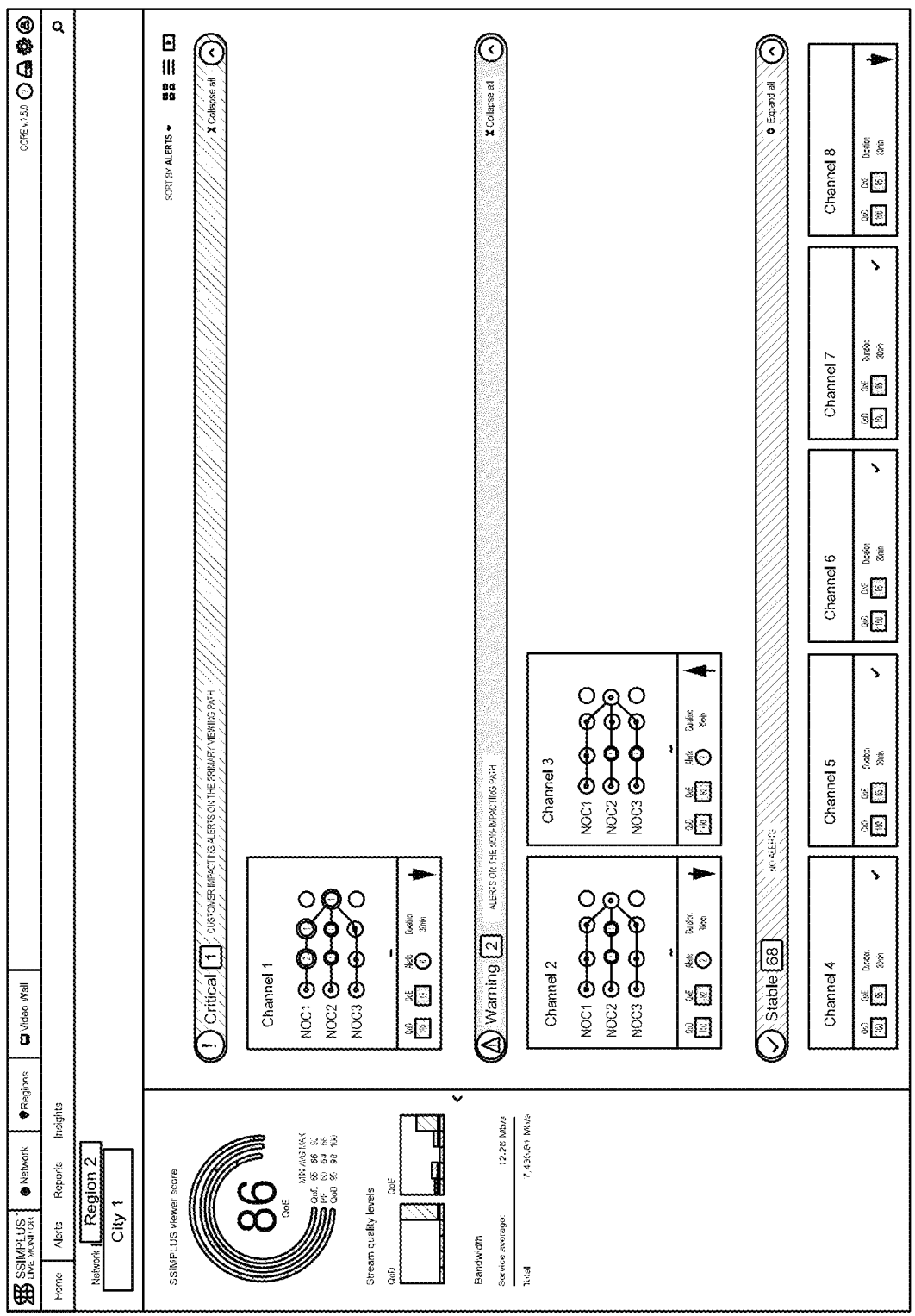
FIG. 20 illustrates another example of service performance classification (critical, warning, and stable) in a multimedia delivery network.

FIG. 19 illustrates an example 1900 of service performance classification (critical, warning, and stable) in a multimedia delivery network. The monitoring points 108 where alerts are generated are labeled as critical or warning, depending on the alert level. FIG. 20 illustrates another example 2000 of service performance classification (critical, warning, and stable) in a multimedia delivery network. The monitoring points 108 where alerts are generated are labeled as critical or warning, depending on the alert level.

Figure 21:
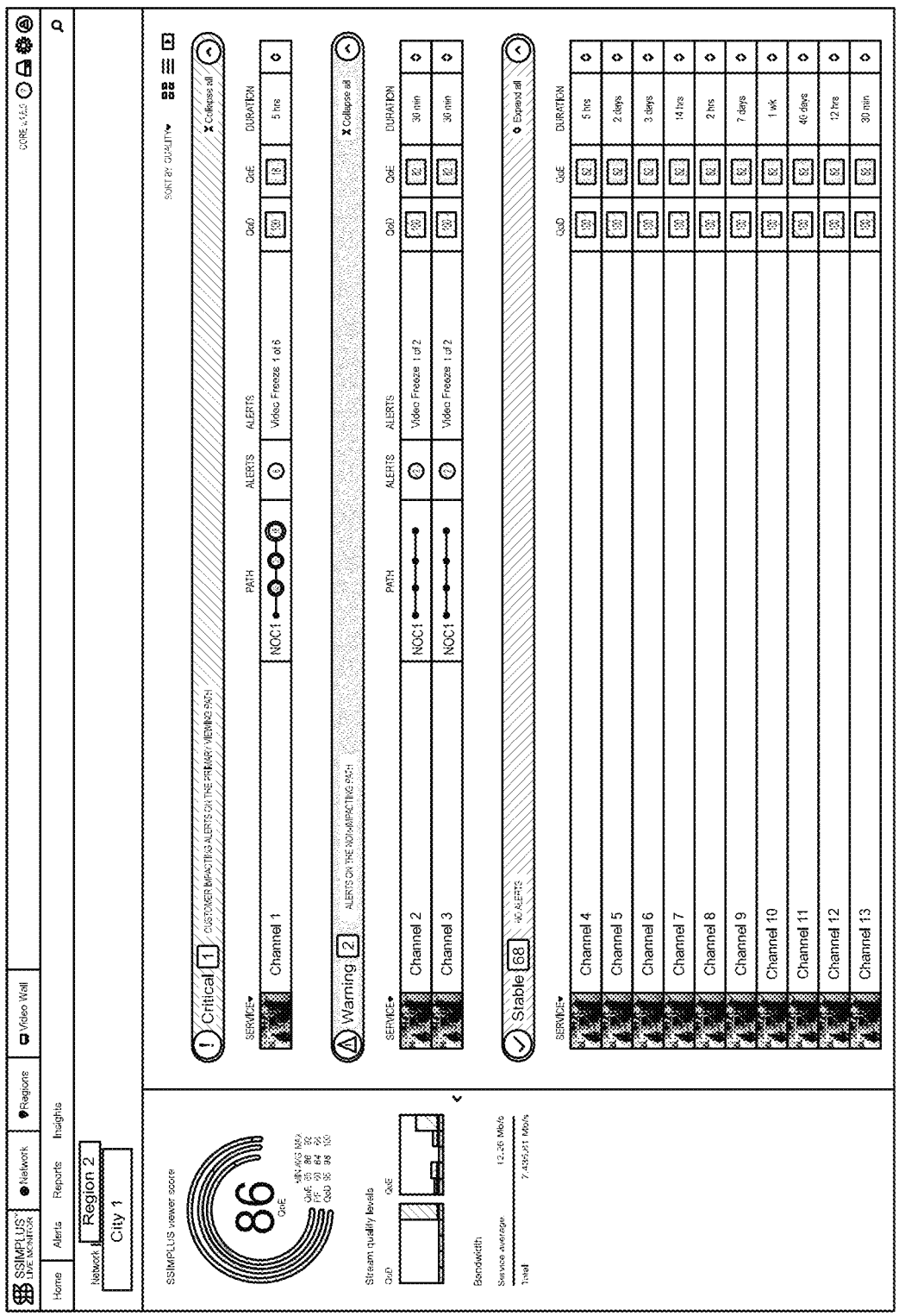
FIG. 21 illustrates an example of service performance classification with quality degradation reasoning in a multimedia delivery network.

FIG. 21 illustrates an example 2100 of service performance classification with quality degradation reasoning in a multimedia delivery network. Here also, the monitoring points 108 where alerts are generated are labeled as critical or warning, depending on the alert level.

Figure 22:
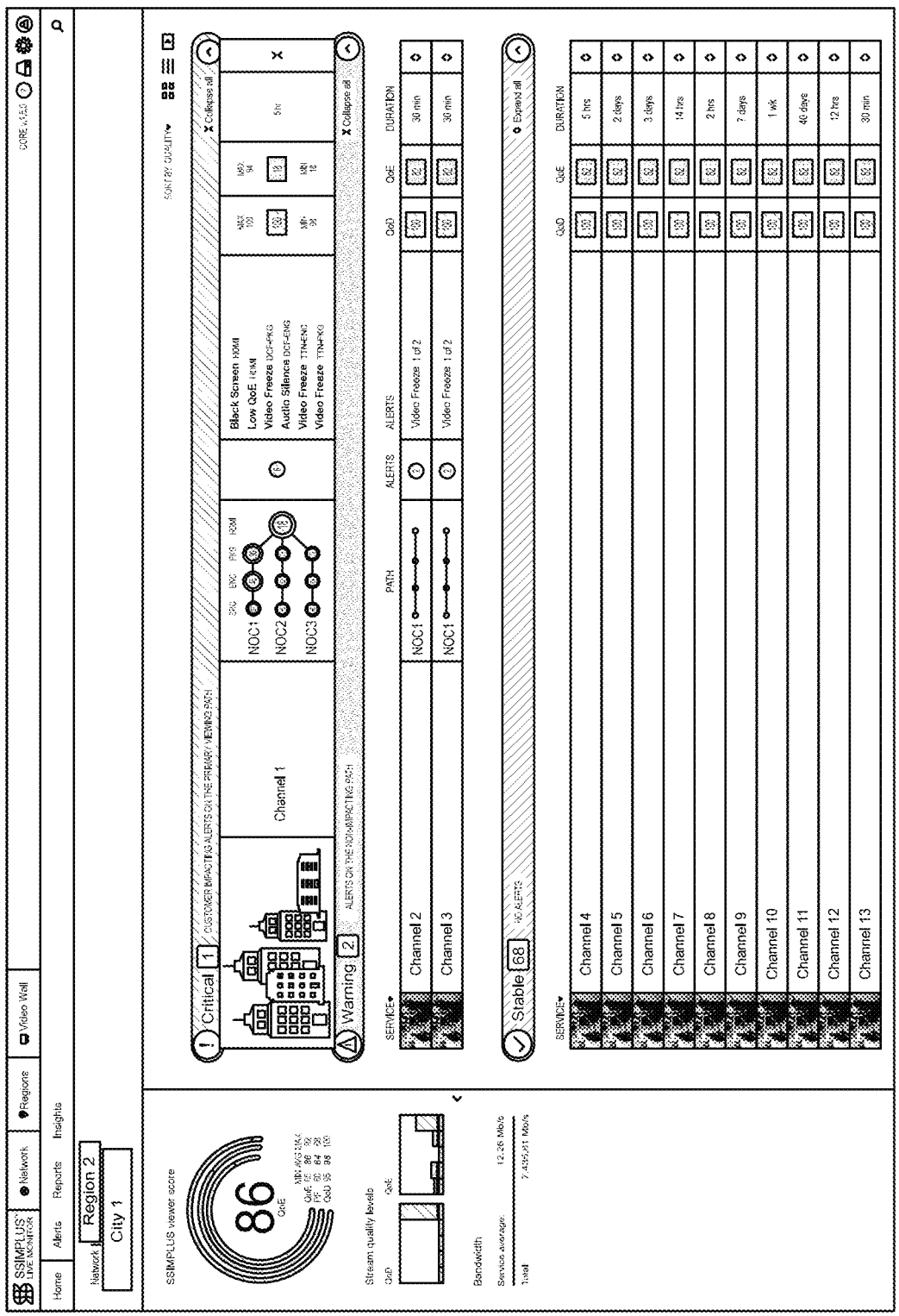
FIG. 22 illustrates another example of service performance classification with quality degradation reasoning in a multimedia delivery network.

FIG. 22 illustrates another example 2200 of service performance classification with quality degradation reasoning in a multimedia delivery network. The monitoring points 108 where alerts are generated are labeled as critical or warning, depending on the alert level. Moreover, the critical alert is expanded (e.g., responsive to input by an operator of the application), to show the video for the channel alerting as critical.

Figure 23:
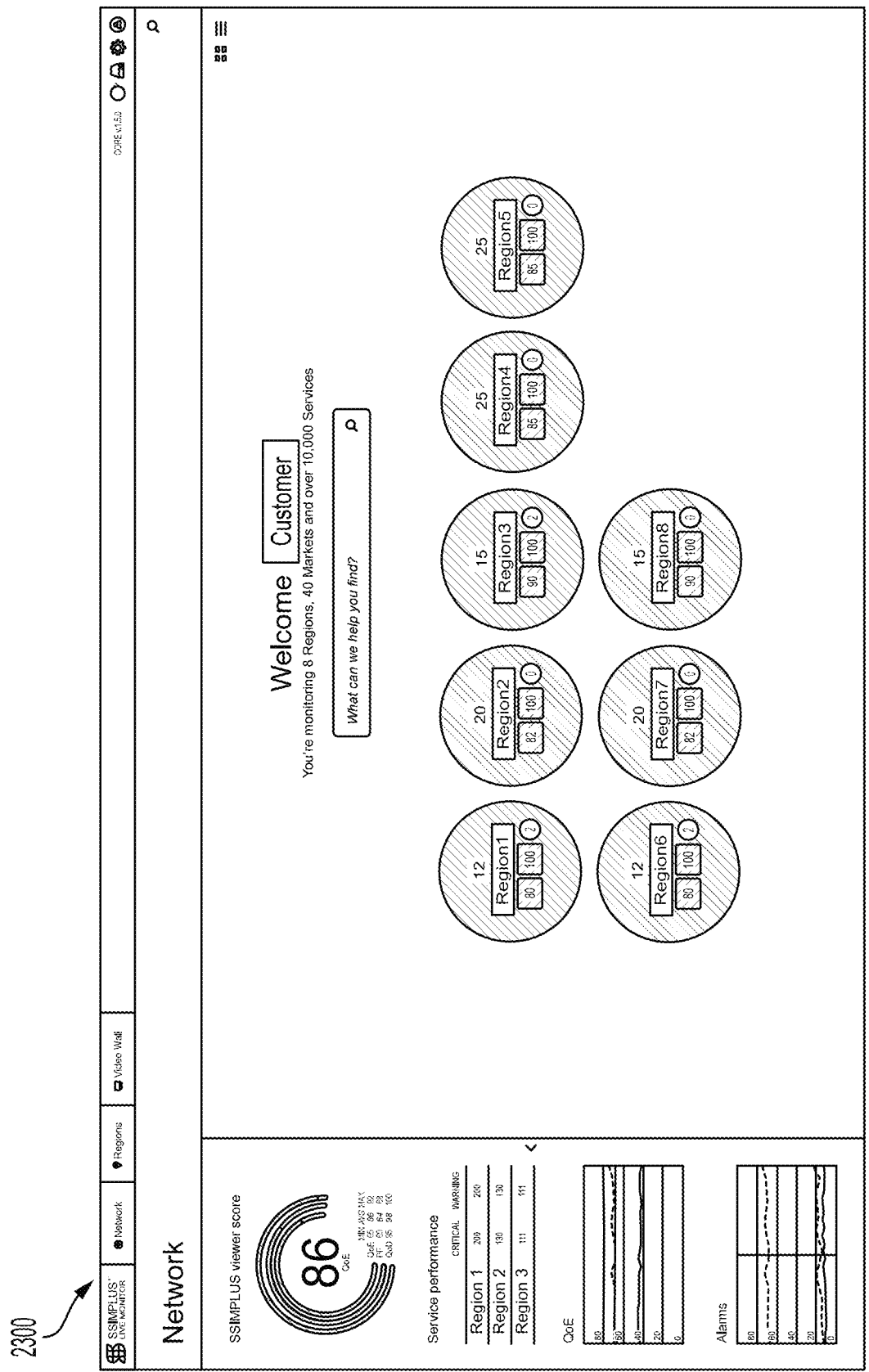
FIG. 23 illustrates an example of national and region level reporting in a multi-service multimedia delivery network.

FIG. 23 illustrates an example of national and region level reporting in a multi-service multimedia delivery network. As shown, a listing of the regions available for monitoring are presented. Responsive to selection of one of the regions, information with respect to that region is displayed.

Figure 24:
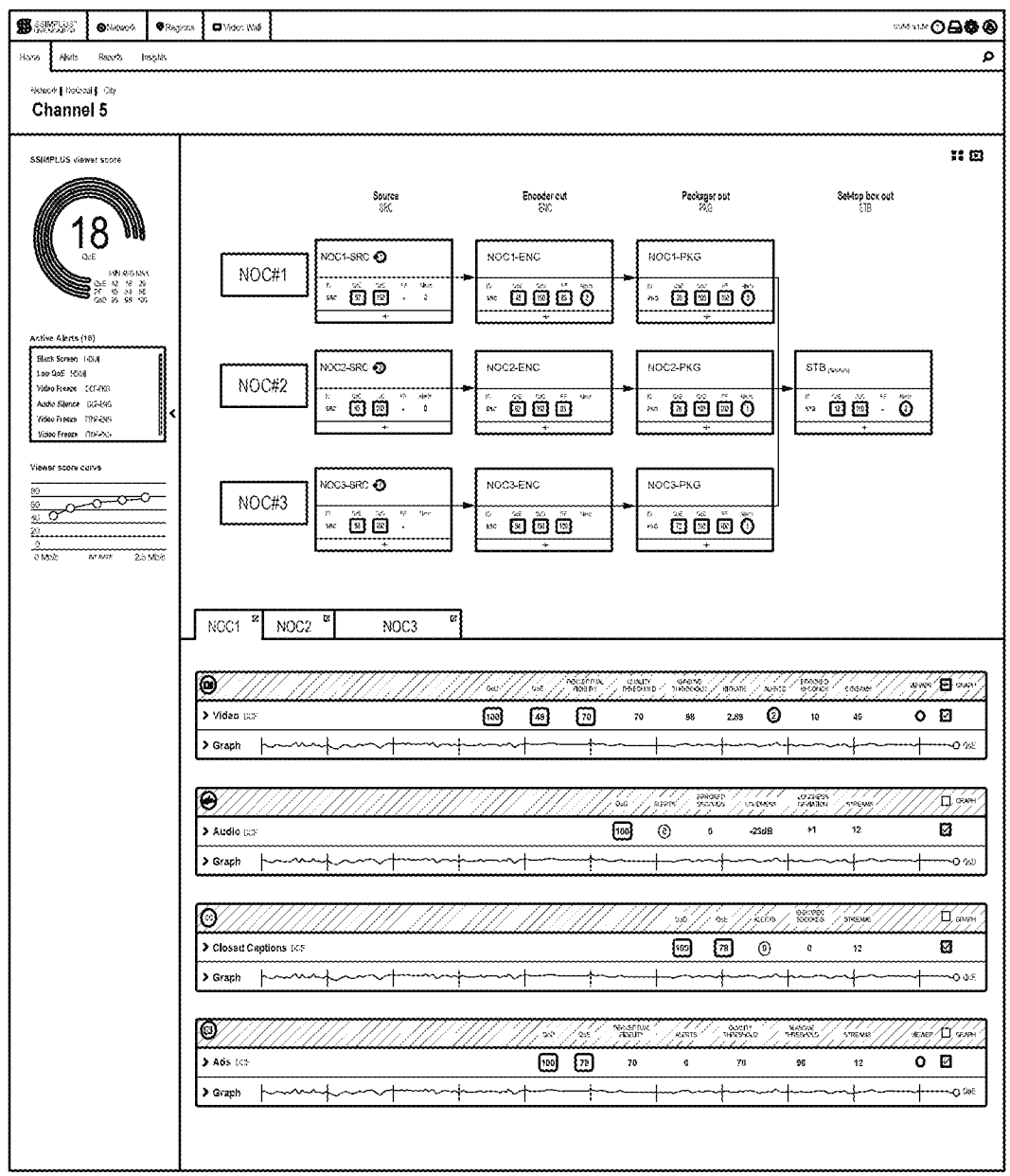
FIG. 24 illustrates an example of multiple media service center reporting in a multi-service multimedia delivery network.

FIG. 24 illustrates an example 2400 of multiple media service center reporting in a multi-service multimedia delivery network. As shown the reporting relates to a specified channel in a region, where historical information about the video, audio, closed captioning, and ads are provided.

Figure 25:
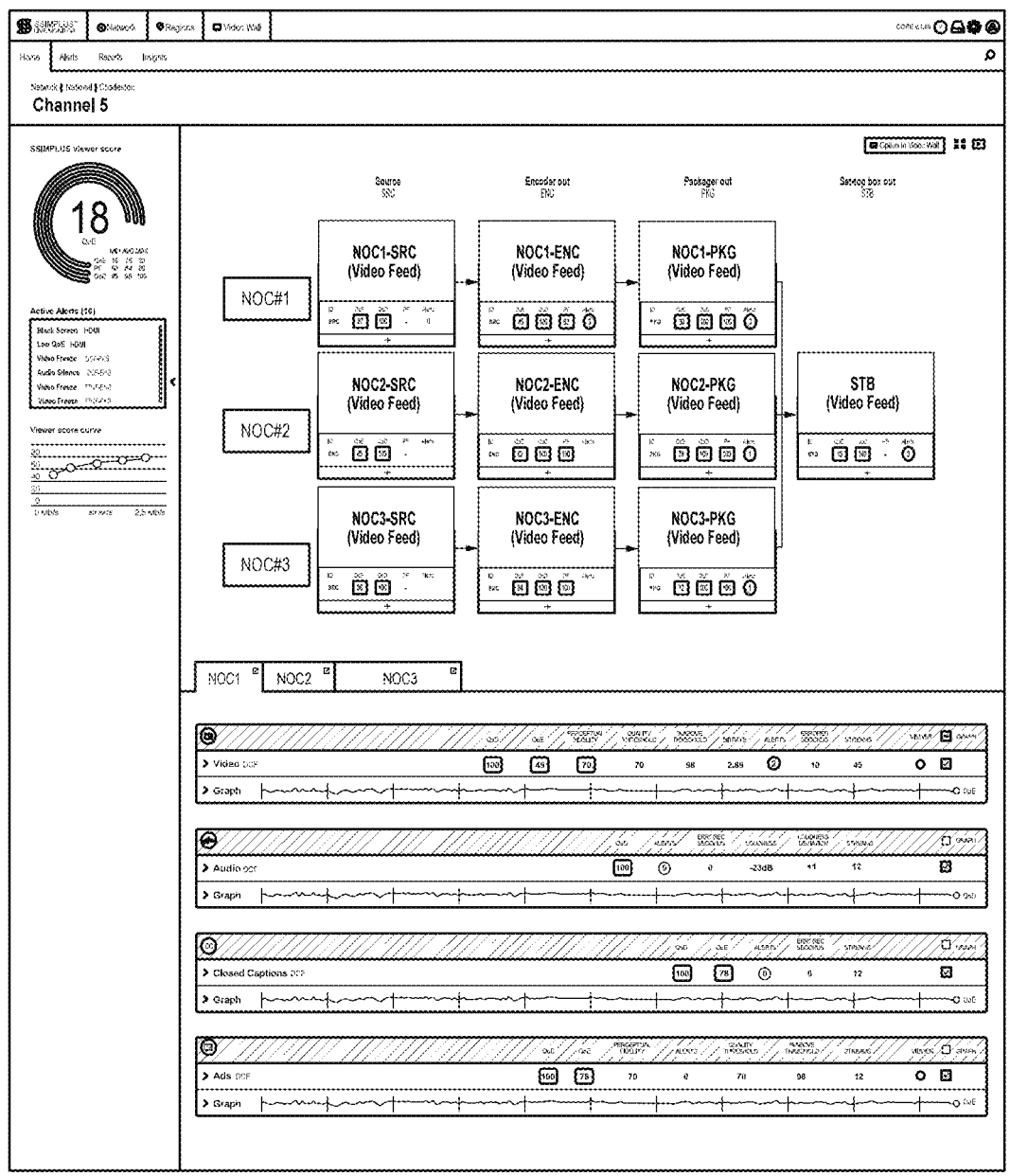
FIG. 25 illustrates another example of multiple media service center reporting in a multi-service multimedia delivery network.

FIG. 25 illustrates another example 2500 of multiple media service center reporting in a multi-service multimedia delivery network. As compared to the example 2400, in the example 2500 video output at the source, encoder 204 out, packager 208 out, and set-top box (e.g., end viewer 106) are shown to provide context for the indicated information.

Figure 26:
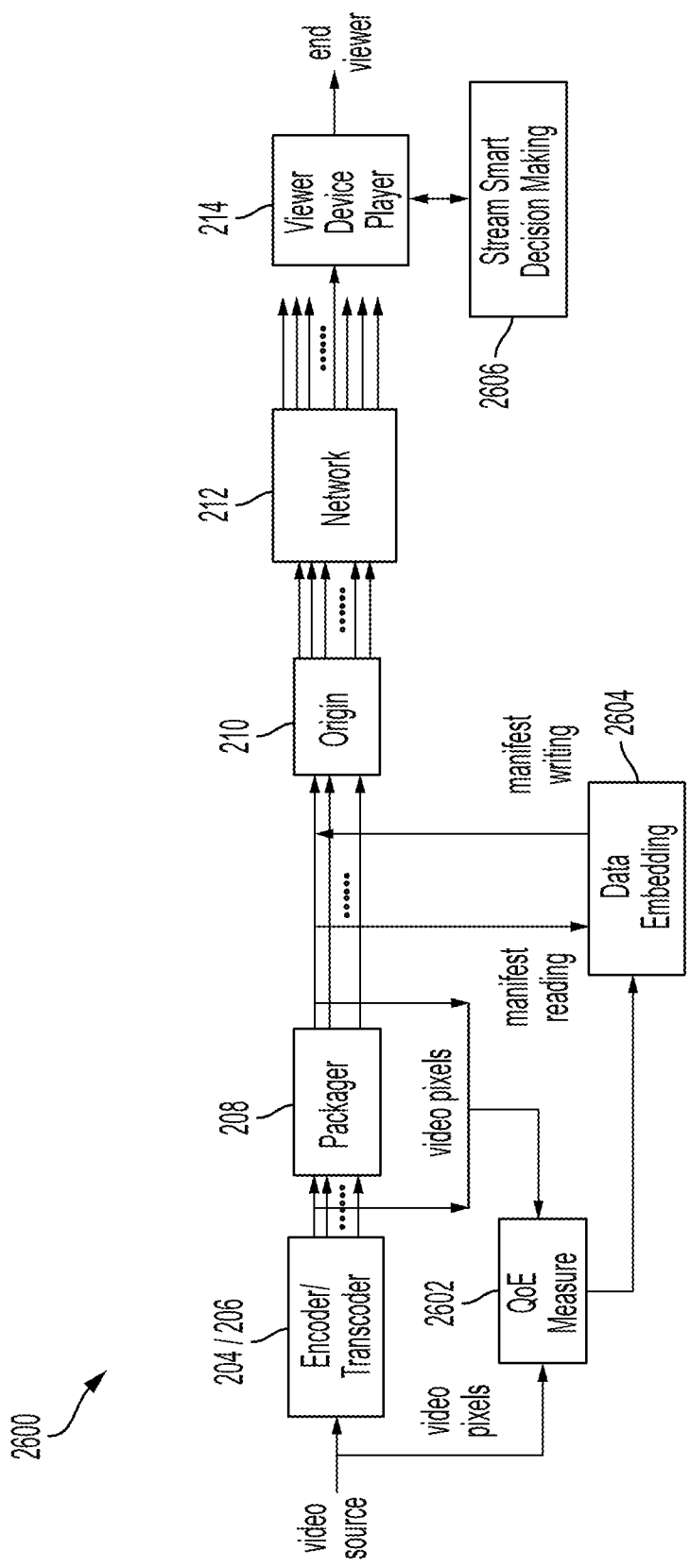
FIG. 26 illustrates an example method for performing stream smart operations.

FIG. 26 illustrates a first approach 2600 to performing smart adaptive streaming decisions. In this approach 2600, the post packager video QoE for each video profile (with different resolution and bit rates) is measured at 2602 by comparing the video source with the encoded/transcoded video derivatives. Such derivatives may be obtained by directly accessing post encoder 204/transcoder 206 streams, or at a point post the packager 208 by de-packaging the video and then decoding the video for each profile.

After the QoE measurement 2602, the QoE scores are aggregated into per segment/per profile scores by referencing to the post-packager manifest file. These scores are then embedded/attached to the manifest file as shown at 2604. This step can be done in different ways, either by following the video streaming standard format (e.g., MPEG-DASH), or by producing a separate file. The modified manifest file after per-segment per-profile QoE data embedding is then written back to the video packages and stored at the origin 210 or other storage location in the network 212. The length of the segment depends on the adaptive streaming method being used between the video server and the viewer device, and is typically in the order of second, e.g., 2 seconds, or 10 seconds.

At the viewer device player 214, the QoE measures embedded in the manifest file is decoded, and used to help make smart adaptive streaming decisions 2606 on a per-segment basis for the video player, which will then request to fetch the best profile for the next segment that will maximize the final QoE or will optimize the rate-distortion performance of the player. Such final QoE is not only impacted by the per-profile per-segment QoE measure after transcoding and packaging, but also by the video freezing and quality/profile switching events, and the interactions between them. The combined end-user QoE measure for each time moment may be stored to provide a historical recording of end user QoE on a per viewer, per viewing session basis.

Figure 27:
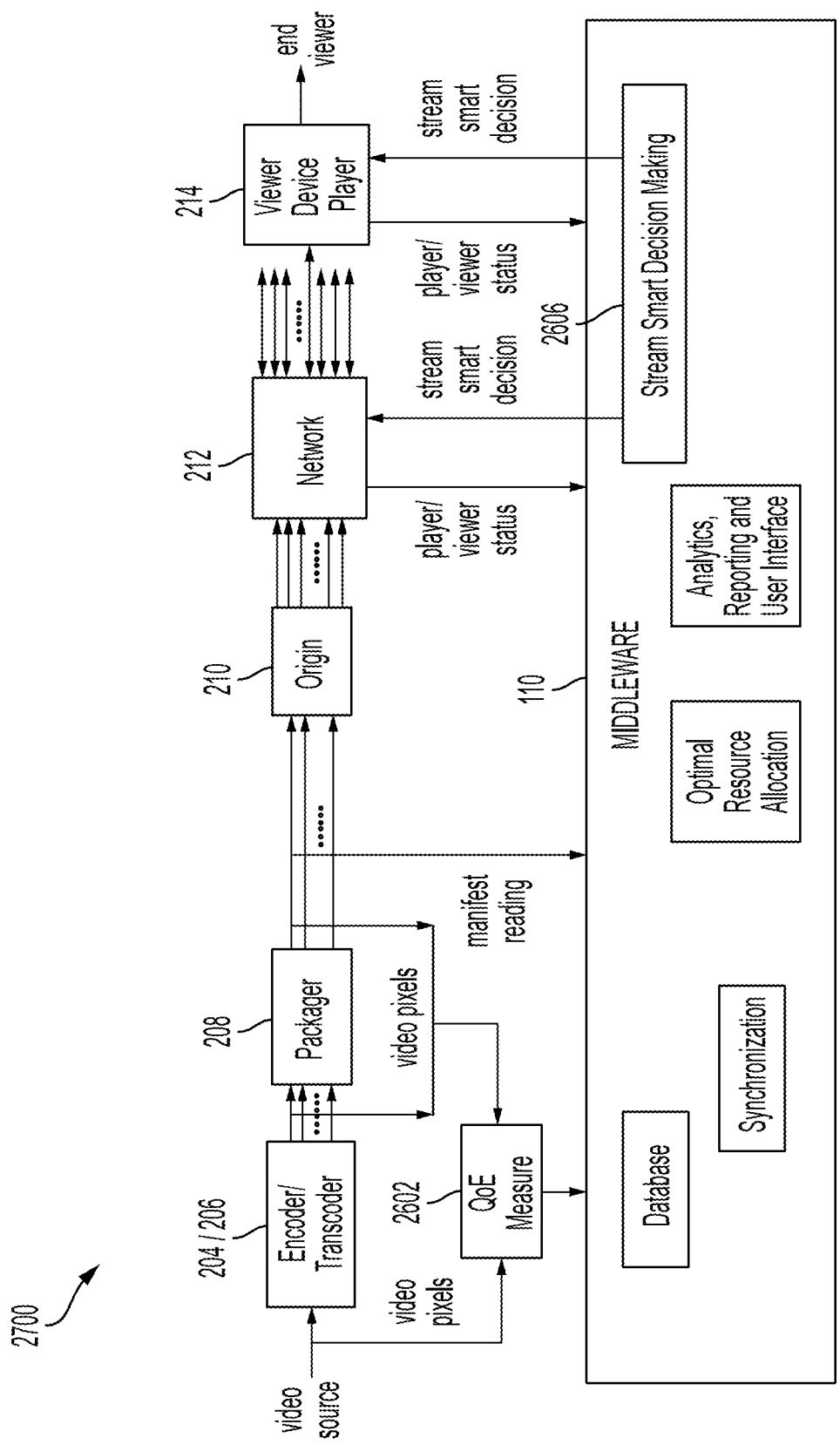
FIG. 27 illustrates an alternate example method for performing stream smart operations.

FIG. 27 illustrates a second approach 2700 to performing smart adaptive streaming decisions 2606. In the second approach, the post packager video QoE for each video profile (with different resolution and bit rates) is measured by comparing the video source with the encoded/transcoded video derivatives. Such derivatives may be obtained by directly accessing post encoder 204/transcoder 206 streams, or at the post-packager 208 point by de-packaging the video and then decoding the video for each profile.

Such QoE measurement results are transmitted to a common middleware 110, which may be in a public or private cloud or at a video server. The post-packager manifest file is also transmitted to the middleware 110. For each of the player on end viewers' devices 214, player/viewer status is transmitted to the middleware 110 on a per-segment basis. The status information may include the manifest file, the video stream ID, the segment ID, the network bandwidth estimation, the buffer condition, the viewing device display type, the device parameters of the viewing session (e.g., the size of the viewing window). Such player/viewer status may be transmitted directly to the middleware 110, or be transmitted to the network 212, and the network 212 will relay such information to the middleware 110.

In the middleware 110, the per-segment per-profile QoE scores are first synchronized with the player/viewer status information received for each viewing device 214 by comparing the stream and segment ID. Smart adaptive streaming decisions 2606 on a per-segment basis are then made for the video player 214. Such stream smart decisions 2606 either are transmitted directly back to the player 214 or are sent to the network 212, which relays the decision to the player 214. The player 214 will then request to fetch the best profile for the next segment that will maximize the final QoE or will optimize the rate-distortion performance of the player 214. Such final QoE is not only impacted by the per-profile per-segment QoE measure after transcoding and packaging, but also by the video freezing and quality/profile switching events, and the interactions between them. When multiple players 214 are using the middleware 110 to make stream smart decisions, optimal resource allocations may be made to adjust the stream smart decision making 2606 so that the overall average QoE of all viewers is achieved, or the QoE of the viewers are adjusted based on the levels of services the viewers subscribed to. The final QoE measures of all viewers are collected and stored in the database, from which reports are generated and may be visualized using a user interface. The reporting may be performed per time span (e.g., per second, per minutes, per hour, per day, per week, per month, per year, etc.) and may also be per geo-location, per media asset, per program, per asset type, etc.

Figure 28:
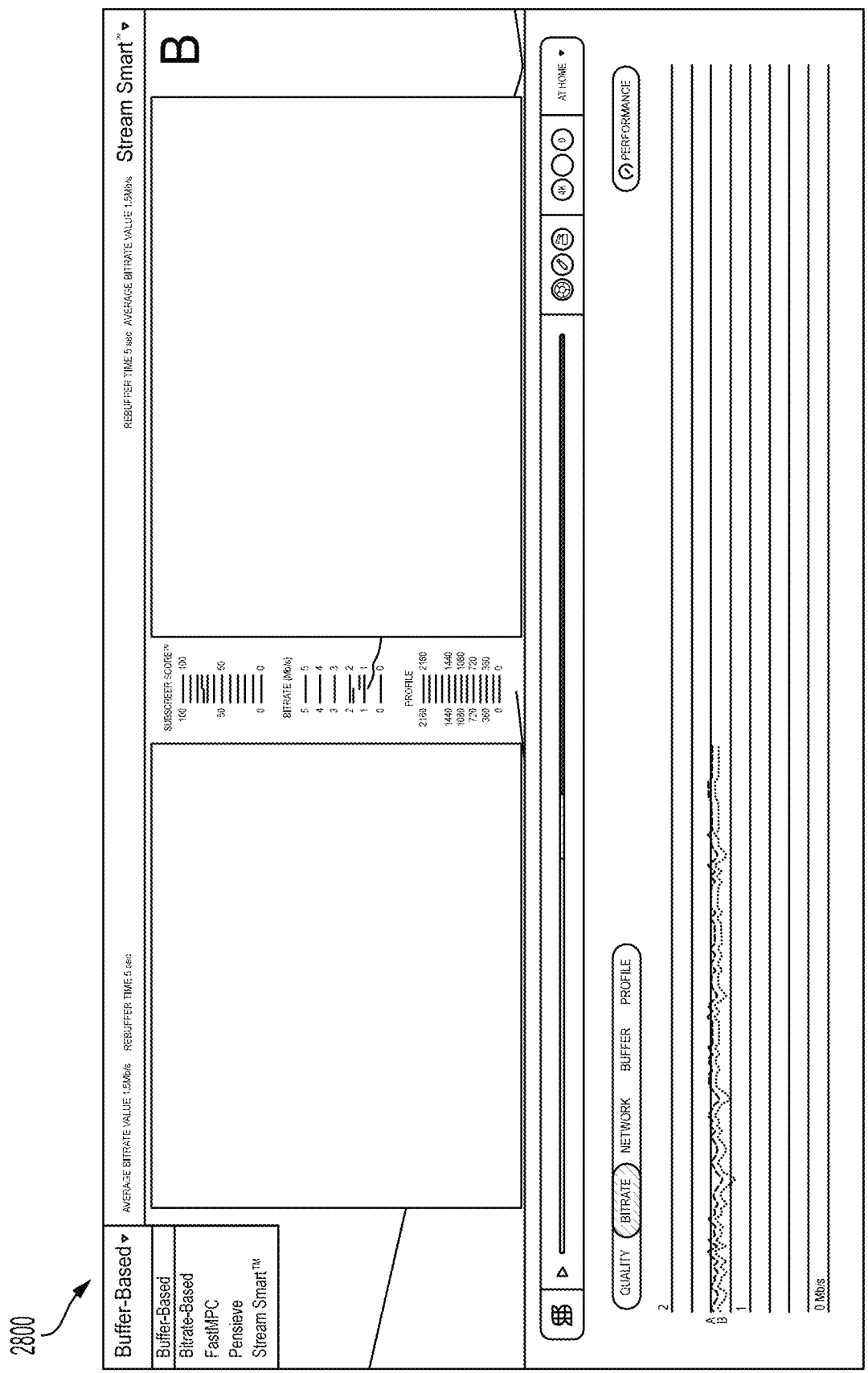
FIG. 28 illustrates an example stream smart user interface for unified QoE monitoring, optimization, and management of video content.

FIG. 28 illustrates an example user interface 2800 of a stream smart video player for unified QoE monitoring, optimization, and management of video content. The user interface 2800 may allow the user to view aspects of the delivery of video content to the consumer devices 214. For instance, the user interface 2800 may display multiple versions of an instance of media content for visual comparison by a user. As shown, video of a soccer match is shown at 4K resolution as compared to at 1440p.

The user interface 2800 may allow the user to view various metrics with respect to the display of the different versions of the video content. For instance, as shown bitrates for each of the video feeds are displayed in the lower portion of the user interface 2800. The user may also be able to select to display other metrics, such as quality (e.g., SSIM-PLUS score), network usage, buffer size, the selected profile per video segment, or other profile information with respect to the video content.

Additionally, the displayed metrics may be provided in terms of various different approaches. For instance, the metrics may be buffer-based, such that if buffer contains a healthy amount of video already downloaded then the video is being provided adequately. Or, the metrics may be bitrate-based, such that if the network 212 has high bandwidth then a higher bitrate encoding profile may be selected for the next time segment. Or, the metrics may also be provided in terms of a combination of these measures, or by another measure such as to optimize start time.

Using the video player, smart decisions may be able to be made regarding the playout. For instance, the video player may provide for optimization based on a desired QoE score, but also optimized to the lowest bitrate within the ladder. For instance, the video player may choose a lowest bitrate selection for an instance of video content that still meets a minimum QoE score but also that minimizes transmission, storage, and other network costs. As another example, decisions may be made using the data to adjust encoder 204 or transcoder 206 settings to improve end-user QoE. For instance, the stream smart application may use machine learning, brute force, or information with respect to the type of content being displayed (e.g., sports event, cartoon, etc.) to suggest alternate settings for encoding of the ladder that may provide for better QoE.

As some additional capabilities, the stream smart application may allow for the offline computation of quality gains and/or bandwidth savings. Moreover, a lab tool version of the stream smart application may allow for the simulation of network 212 parameters and user experiences to allow for the evaluation of QoE in various experimental network 212 conditions. As another possibility, the stream smart application may incorporate an AB testing feature to allow a user to observe differences in settings.

As yet another possibility, the functionality of the stream smart application may be implemented in existing players, such as the video player executed by the consumer devices 214. Additionally, a pixel-level QoE measurement may be made at the player executed by the consumer devices 214. As mentioned above, some QoE measures, such as SSIM and SSIMPLUS, are pixel based and measure perceptual difference between images at the pixel level. This functionality may be implemented at the player level to allow a user of the player 214 to directly observe which areas of the video content are deemed to show degradation.

Figure 29:
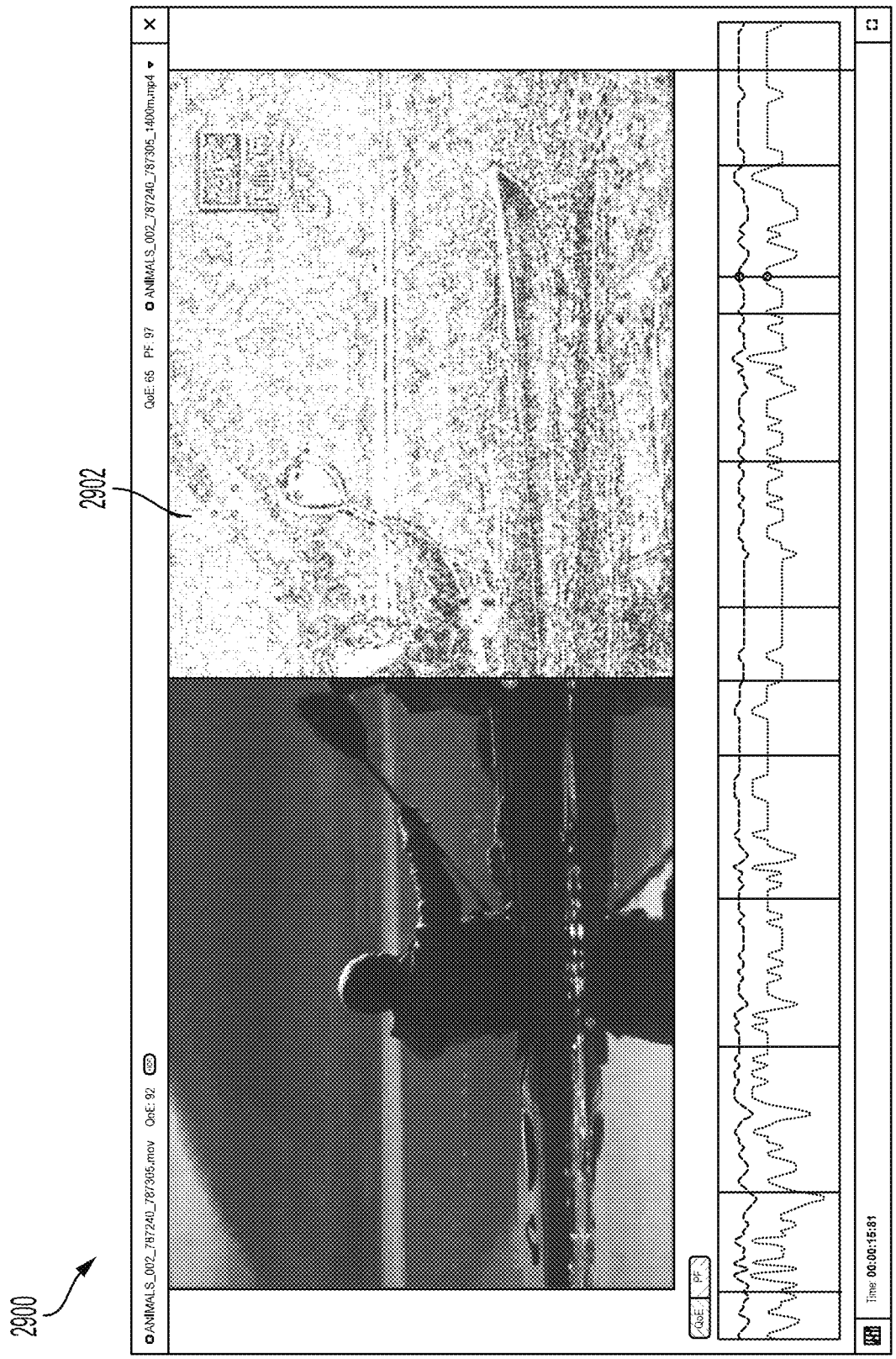
FIG. 29 illustrates an example video-on-demand monitor.

FIG. 29 illustrates an example VOD monitor 2900. As shown, the VOD monitor 2900 may further provide additional capabilities, such as grayscale quality maps 2902 to provide pixel level graphic visualization of content impairments, expanded format support including HLS and MPEG-DASH, and an enterprise solution variant establishing a cloud solution to address production volumes and pass/fail use cases. In an example, the data of the grayscale quality maps 2902 may be used as a factor in the QoE score.

As yet another possible application of the system 200, an advertisement monitor may be implemented to perform a high-volume ad capture to assess QoE of ads, as well as to provide for instant visual validation of ads delivered by a video wall add-on displaying a wall of the captured ads.

Figure 30:
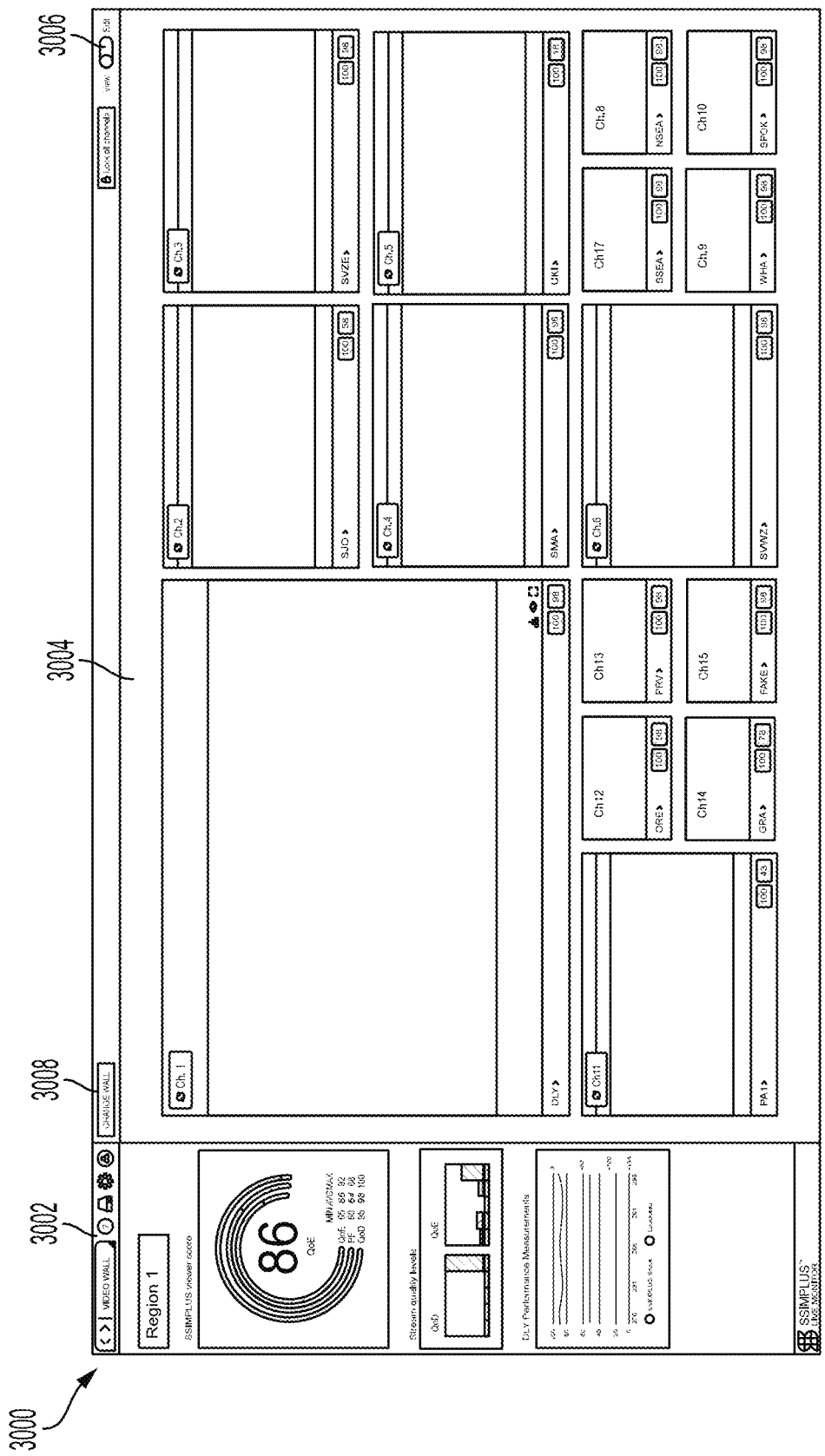
FIG. 30 illustrates an example of the video wall in a view mode.
Figure 31:
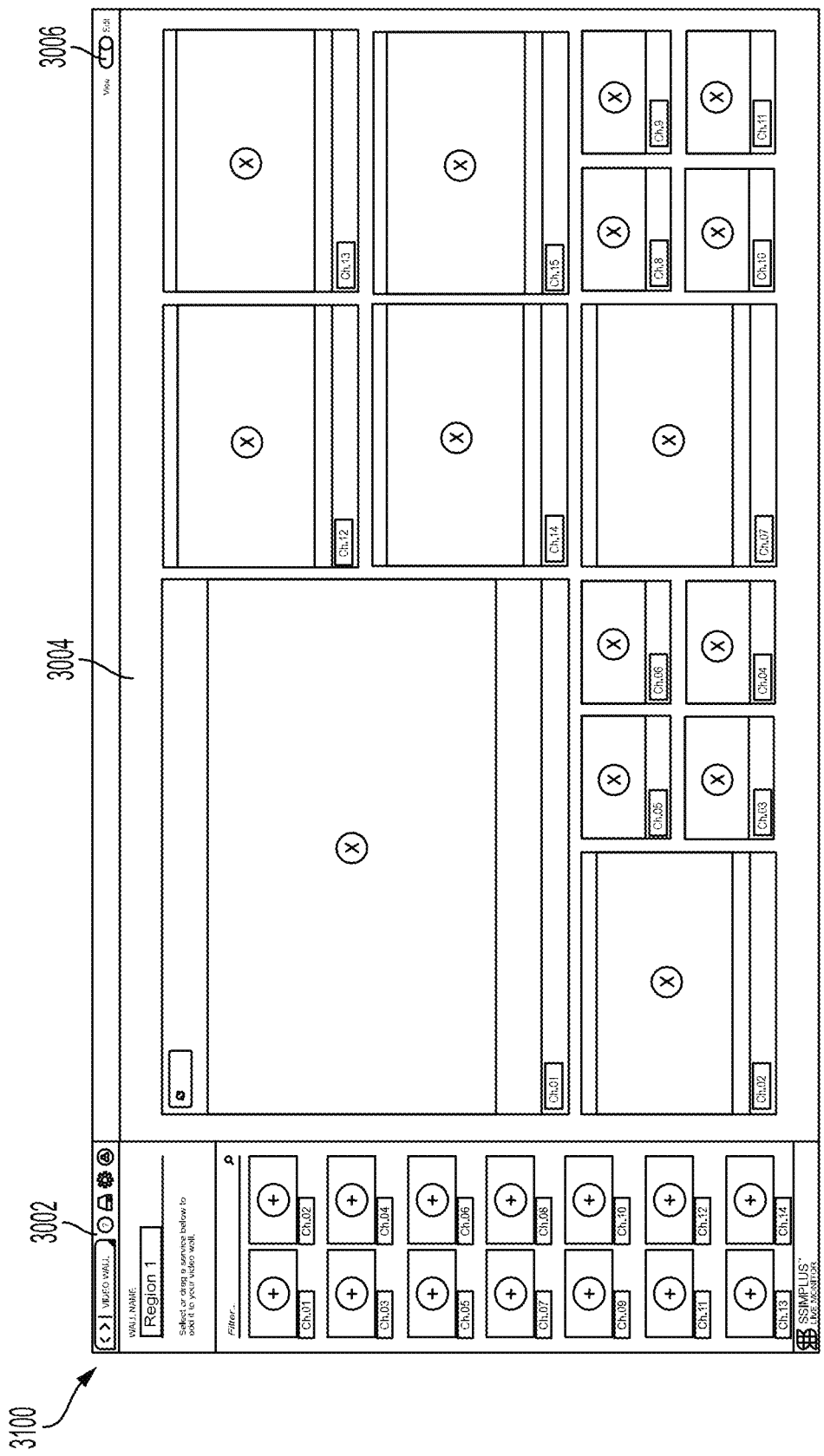
FIG. 31 illustrates an example of the video wall in an edit mode.

FIGS. 30-36 illustrate examples of the video wall 3004. FIG. 30 illustrates an example 3000 of the video wall 3004 in a view mode. In the view mode, some general information regarding steaming is provided on a pane view 3002. The video wall 3004 is provided with a listing of chosen screens that may be monitored for quality. The example 3000 also illustrates a view/edit control 3006, which may be used to toggle between the view shown in the example 3000 and the editable view as shown in FIG. 31. The example 3000 also includes a change wall control 3008 that, when selected allows the user to switch between stored video walls 3004 that are saved to the system, as well as to create a new video wall 3004.

FIG. 31 illustrates an example 3100 of the video wall 3004 in an edit mode. The edit mode may be displayed responsive to toggling of the view/edit control 3006. As shown, the pane view 3002 now allows the user to change which streams are displayed on the video wall 3004.

Figure 32:
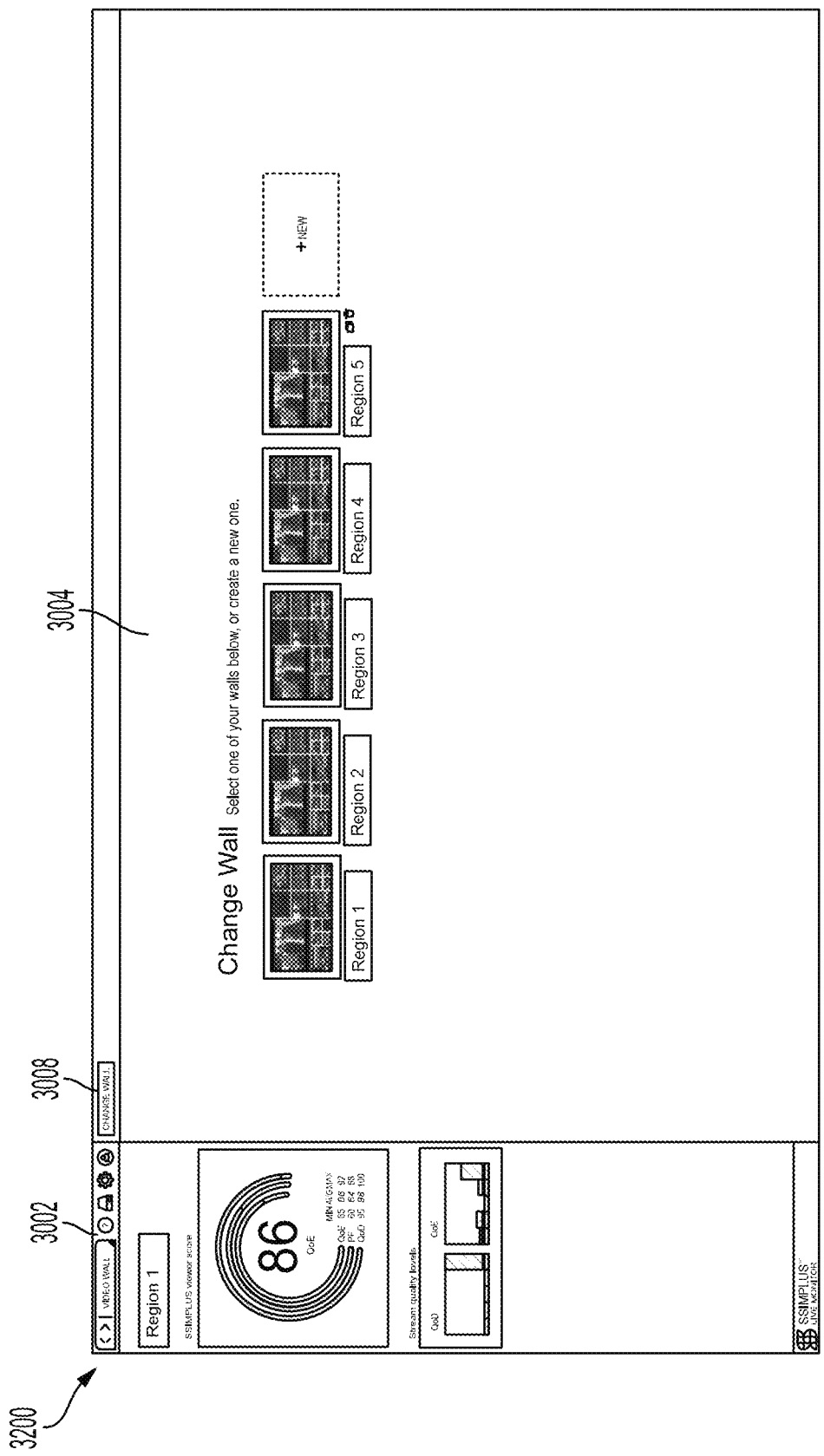
FIG. 32 illustrates an example of the video wall in the change wall mode.

FIG. 32 illustrates an example 3200 of the video wall 3004 in the change wall mode. The change wall mode may be entered responsive to selection of the change wall control 3008. As shown, a selection of various video walls 3004 is available, such as a national wall, a south region wall, an east region wall, a west region wall, and a central region wall. A selection is also available to create a new wall.

Figure 33:
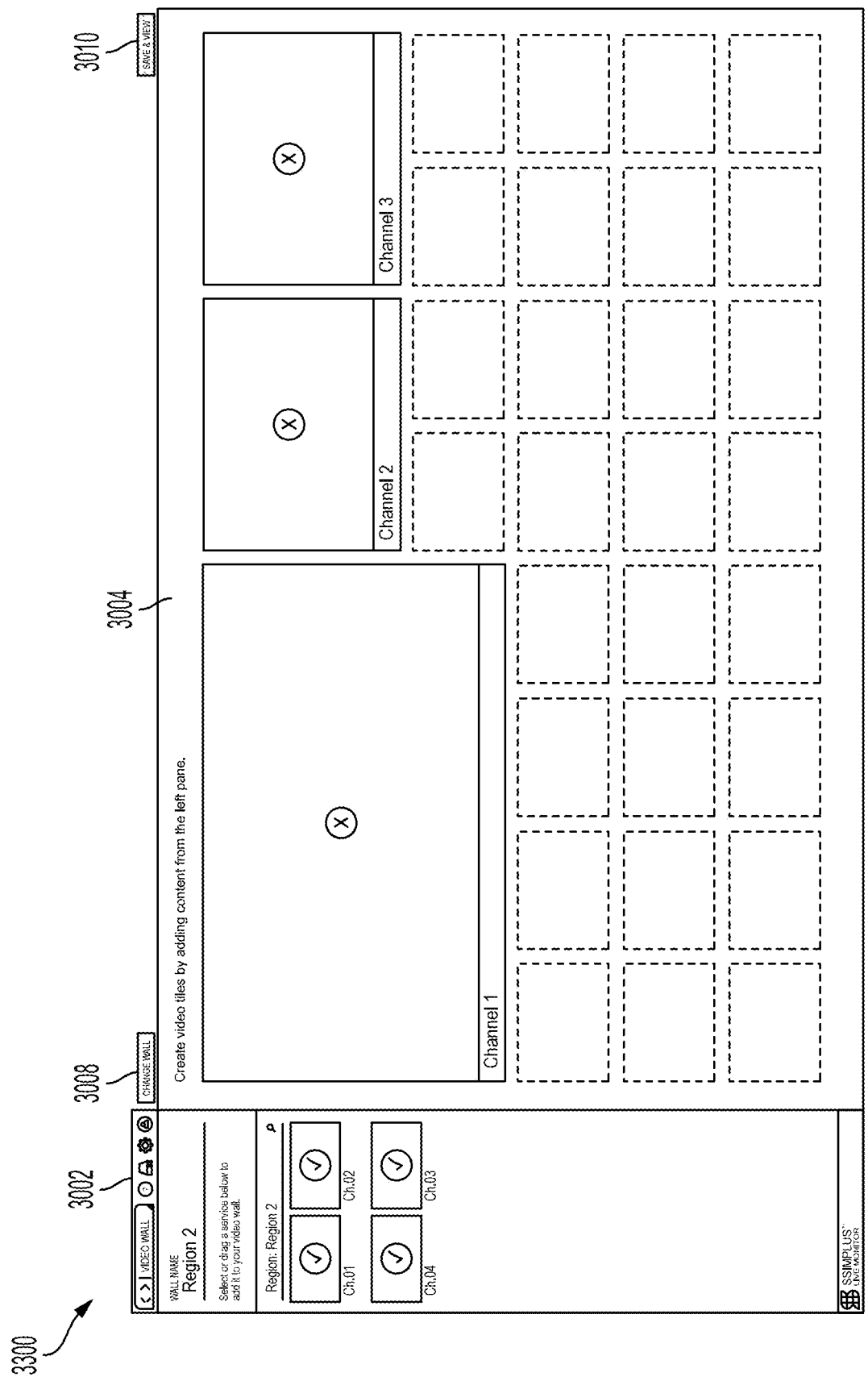
FIG. 33 illustrates an example of editing the video wall.

FIG. 33 illustrates an example 3300 of editing the video wall 3004. As shown, the user interface in the example 3300 allows the user to select or drag services from the pane view 3002, which may be added as video tiles in the video wall 3004. Once the user has completed customizing the video wall 3004, the user may select the save & view control 3010 to save the video wall 2004 and revert to the view mode.

Figure 34:
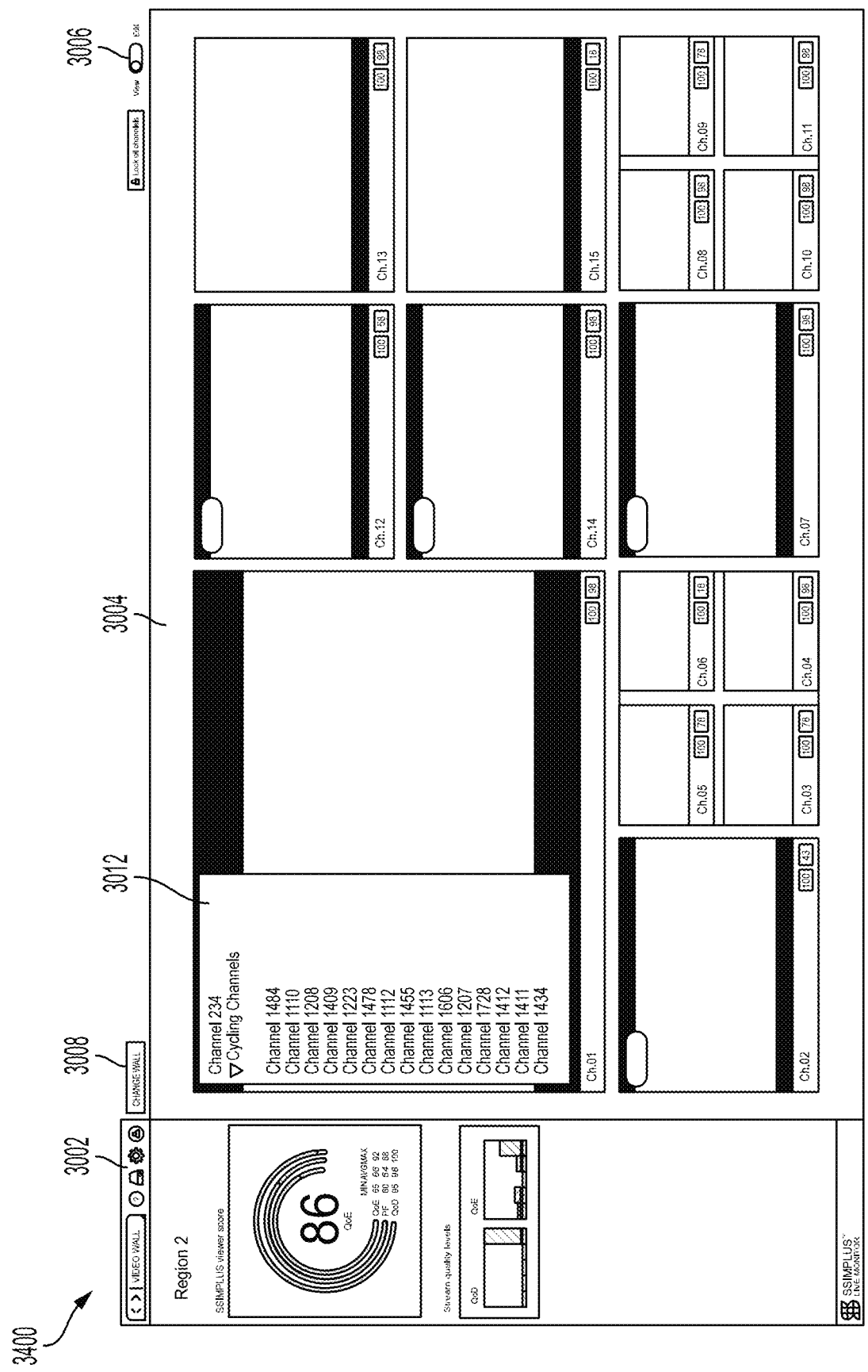
FIG. 34 illustrates an example of the video wall showing a selector for cycling channels.

FIG. 34 illustrates an example 3400 of the video wall 2004 showing a selector 3012 for cycling channels. For instance, using the selector 3012, the user may set a channel view on the video wall 3004 to loop among a set of channels, rather than using screen real-estate for each channel.

The advertisement monitor may further provide additional capabilities, such as an enhanced ad asset acquisition and identification approach; an API and IR; support for locking, cycling and scheduling of ad capture and monitoring; unique settings for global, ad zone, alerts, and configuration pages; updated market, service, alerts, and report pages to support unique ad monitoring requirements; support for video walls; a real-time dashboard; and security and privacy support to ensure the safety of customer information.

Moreover, additional reporting insights may be incorporated as an additional application of the system 200. For instance, a reporting insights platform may include additional aspects incorporated into the live monitor application. For instance, the reporting insights may provide support for a diagnostic journey through forensics analysis and deeper diving into audio, video, alerts, and closed captioning data; a reporting foundation for compliance reporting; and a foundation to support service level agreement (SLA)/service level operator (SLO) level analyses. For instance, issues with malfunctioning components may be identified, alerted on, and reported by time, where the reporting may relate to impacted services, service-level alerts, or stream-level alerts. An example may be an issue may be identified as being pre-encoder 204 and therefore an issue with the source, while another issue may be determined to be the encoder 204 according to monitoring of the encoder out vs the source out to the encoder 204.

As yet a further application of the system 200, a viewer QoE aware, content adaptive, per-title or per-asset encoding optimization, or "encoding smart" application may be utilized to allow system operators to provide for optimization for a specific title (or for a genre or type of content with similar characteristics). The application may include an engine that (for each title or asset) combines target quality, viewing conditions, and business rules to: (i) recommend a full encoding ladder; (ii) recommend an optimized bitrate for each ABR profile; (iii) suggest modifying the number of profiles; (iv) run in "Bitrate Saving" and "Quality Improvement" modes. The per-title optimization or encoding smart application may generate testing reports after analysis of the title to show the savings and improvements against given video set for the given optimization mode. The application may also provide a recommended ladder for the tested title/asset. To accomplish these aspects, the per-title optimization or encoding smart application may learn encoder 204 behavior for various settings and content types to improve the recommendation accuracy. Optimizations may be content aware as well.

Figure 35:
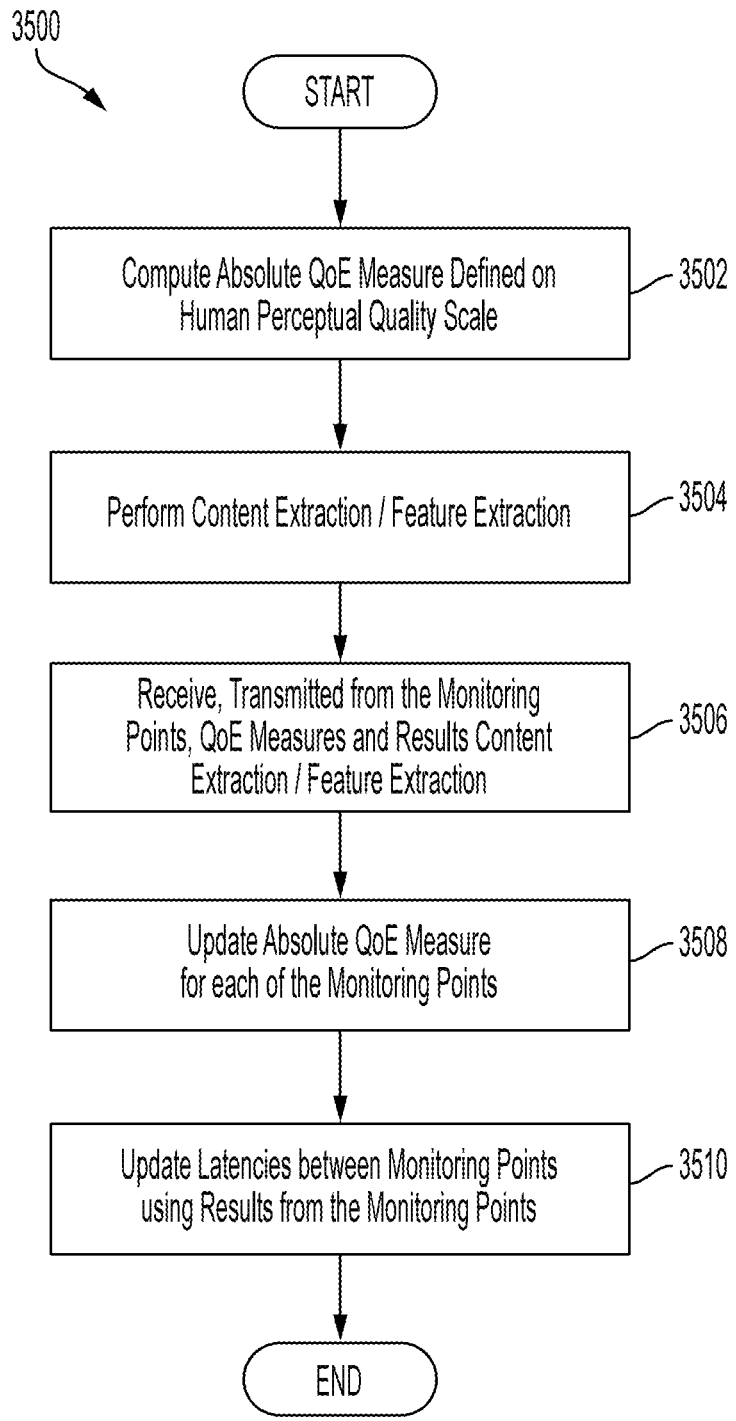
FIG. 35 illustrates an example process for generating correlated QoE and latency measures at a plurality of monitoring points along a multimedia delivery chain including multiple video operations.

FIG. 35 illustrates an example process 3500 for generating correlated quality-of-experience (QoE) and latency measures at a plurality of monitoring points 108 along a multimedia delivery chain including multiple video operations. In an example, the process 3500 may be performed by the unified end-to-end quality and latency monitoring, optimization and management system as described in detail herein.

At operation 3502, each of the plurality of monitoring points 108 computes an absolute QoE measure defined on a human perceptual quality scale for media content. For instance, the absolute QoE score should relate to an average score given by human subjects when expressing their visual QoE when watching the playback of the media content.

At operation 3504, each of the plurality of monitoring points 108 performs one or more of content extraction or feature extraction on the media content. Examples of the features to be extracted may include statistical quantities such as the mean and standard deviation of the signal intensity and spatial and temporal information content measures from the media stream on a per moment basis.

At operation 3506, each of the plurality of monitoring points 108 transmits, to the middleware 110, the respective QoE measure and results of the one or more of content extraction or feature extraction. Accordingly, the middleware 110 aggregates the QoE and other extracted results.

At operation 3508, the middleware 110 computes and updates an absolute QoE measure for each of the plurality of monitoring points. At the middleware 110, the QoD and QoE scores collected from multiple monitoring points 108 are synchronized, compared, and refined to create correlated and consistent scores. Correlated scoring means that all the QoD or QoE scores throughout the delivery chain 100 should use the same scale for scoring, and all scores collected should be aligned and refined when necessary to be mapped to the same scale, such that all QoD or QoE scores are comparable throughout the video delivery chain 100 and distribution network.

At operation 3510, the middleware 110 computes and updates latencies between multiple monitoring points 108 using the results from each of the plurality of monitoring points 108. Thus, the features extracted together with the QoD and QoE measures collected from multiple monitoring points 108, may be used to perform latency assessment for each point along the media delivery chain 100. In one example, the latency may be computed by decoding the media content into frames at both the source input point and the test output point; aligning the media content at the source input point and the media content at the test output point along a temporal direction at a frame level; identifying a temporal offset in frames between the media content at the source input point and the media content at the test output point; and accounting for a frame rate of the media content to compute the latency. In another example, the latency may be computed by applying one or more feature extractions of reduced-reference (RR) features to the media content at the source input point and to the media content at the test output; aligning the RR features to identify an alignment offset between the media content at the source input point and to the media content at the test output; and determining the latency according to the alignment offset.

By comparing the correlated QoD, QoE, and latency scores, problems in the media delivery process are identified and localized. When the problems are significant, alerts are generated. By combining the QoD, QoE measures, the extracted features, and the alerts generated, optimization methods may be applied that generate suggestions on each of the operation points 108 in the delivery chain 100 for actions that may be performed to improve the delivery process. After operation 3510, the process 3500 ends.

Figure 36:
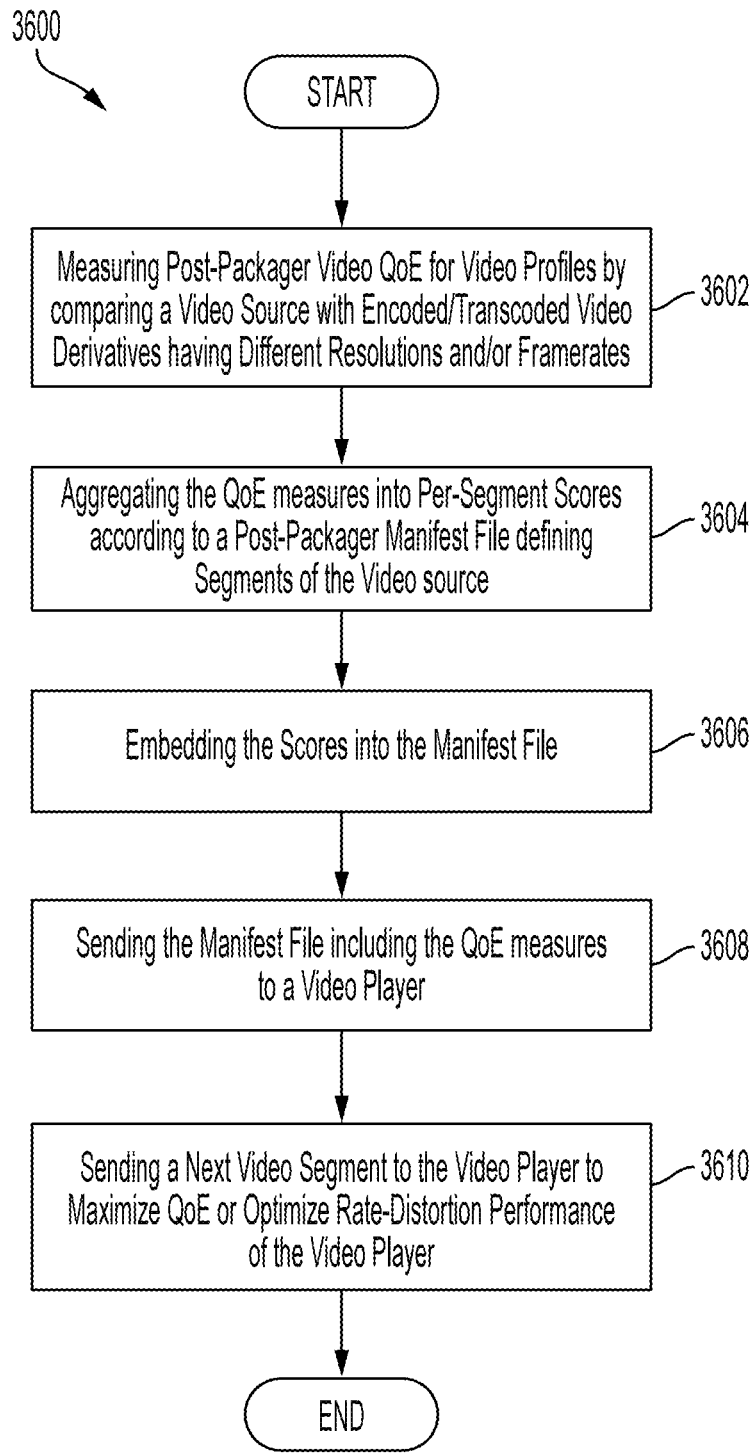
FIG. 36 illustrates an example process for optimizing streaming over a multimedia delivery chain for use by a video player.

FIG. 36 illustrates an example process 3600 for optimizing streaming over a multimedia delivery chain 100 for use by a video player 214. In an example, as with the process 3500, the process 3600 may be performed by the unified end-to-end quality and latency monitoring, optimization and management system as described in detail herein.

At operation 3602, the multimedia delivery chain 100 measures post-packager video QoE measures for a plurality of video profiles by comparing a video source with a plurality of encoded/transcoded video derivatives of the video source, each derivative having a different resolution and/or framerate. In one or more examples, the plurality of encoded/transcoded video derivatives of the video source may be obtained by accessing post encoder/transcoder streams of the video source. In one or more examples, the plurality of encoded/transcoded video derivatives of the video source may be obtained at a post-packager point by de-packaging and decoding video for each of the plurality of video profiles.

At operation 3604, the multimedia delivery chain 100 aggregates the QoE measures into per segment scores according to a post-packager manifest file defining segments of the video source. At operation 3606, the multimedia delivery chain 100 embeds the scores into the manifest file. At operation 3608, the multimedia delivery chain 100 sends the manifest file including the QoE measures to a video player. In one or more examples, the manifest file is a Moving Picture Experts Group-Dynamic Adaptive Streaming over Hypertext Transfer Protocol (MPEG-DASH) media presentation description. In one or more examples, the segments are of a length on the order of seconds.

At operation 3610, the multimedia delivery chain 100 sends a next video segment to the video player, responsive to a request from the video player for one of the plurality of video profiles chosen to one or more of maximize QoE at the video player or optimize rate-distortion performance of the video player. In one or more examples, QoE measures from the video player are collected; and a report is displayed of the QoE measures of the video player as collected, the report indicating the QoE measures according to one or more of time span, geo-location, media asset, program, or asset type. After operation 3610, the process 3600 ends.

Figure 37:
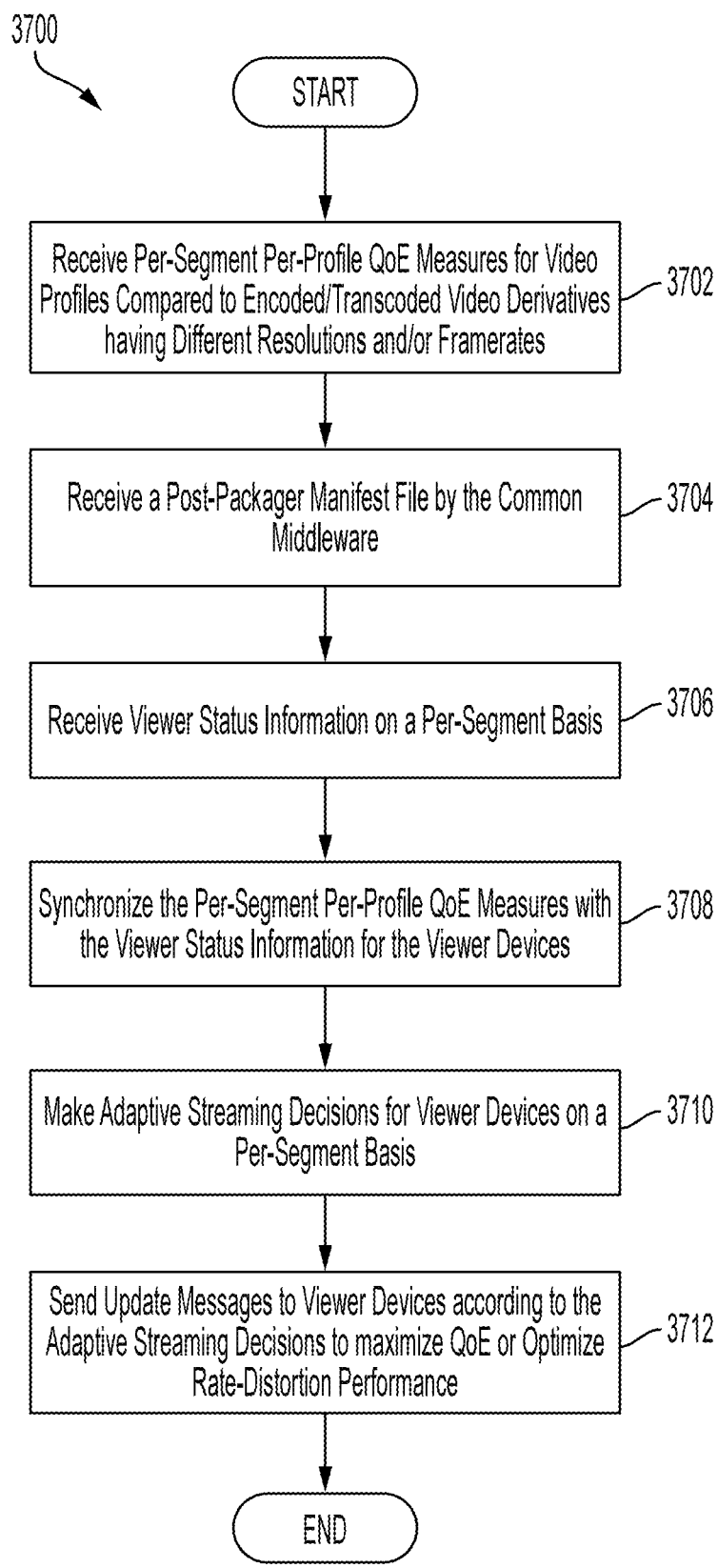
FIG. 37 illustrates an example process for optimizing streaming over the multimedia delivery chain for use by the common middleware.

FIG. 37 illustrates an example process 3700 for optimizing streaming over the multimedia delivery chain 100 for use by the common middleware 110. In an example, as with the processes 3500 and 3600, the process 3700 may be performed by the unified end-to-end quality and latency monitoring, optimization and management system as described in detail herein.

At operation 3702, the common middleware 110 receives per-segment per-profile QoE measures. The common middleware 110 receives the information being in communication with a plurality of viewer devices 214. The QoE measures are measured for a plurality of video profiles by comparing a video source with a plurality of encoded/transcoded video derivatives of the video source, wherein each derivative has a different resolution and/or framerate.

At operation 3704, the common middleware 110 receives a post-packager manifest file. At operation 3706, the common middleware 110 receives from the plurality of viewer devices 214, viewer status information on a per-segment basis. In one or more examples, the viewer status information includes one or more of: a manifest file, a video stream ID, a segment ID, a network bandwidth estimation, a buffer condition, a viewing device display type, or physical device parameters of the viewer device.

At operation 3708, the common middleware 110 synchronizes the per-segment per-profile QoE measures with the viewer status information for each of the plurality of viewer devices 214. At operation 3710, the common middleware 110 makes one or more adaptive streaming decisions for the plurality of viewer devices 214 on a per-segment basis.

At operation 3712, the common middleware 110 sends streaming update messages to one or more of the plurality of viewer devices 214 according to the adaptive streaming decisions, to cause one or more of the plurality of viewer devices 214 to fetch a best profile for a next segment to maximize QoE at the respective viewer devices 214 or to optimize rate-distortion performance of the respective viewer devices 214. In one or more examples, the common middleware 110 optimizes resource allocation across the plurality of viewer devices to improve overall average QoE of the plurality of viewer devices. In one or more examples, the common middleware 110 optimizes resource allocation across the plurality of viewer devices based on levels of services to which the plurality of viewer devices are subscribed. In one or more examples, QoE measures from the video player are collected; and a report is displayed of the QoE measures of the video player as collected, the report indicating the QoE measures according to one or more of time span, geo-location, media asset, program, or asset type. After operation 3712, the process 3700 ends.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, to the extent any embodiments are described as less desirable than other embodiments or prior art implementations with respect to one or more characteristics, these embodiments are not outside the scope of the disclosure and can be desirable for particular applications.

What is claimed is:

1. A method for optimizing streaming over a multimedia delivery chain, comprising:
   receiving per-segment per-profile Quality-of-Experience (QoE) measures by a common middleware, the common middleware being in communication with a plurality of viewer devices, the QoE measures being measured for a plurality of video profiles, the QoE measures being predictive of human perception of the quality of the media content if experienced at the respective viewer device, each profile having a different resolution and/or framerate;
   receiving, from the plurality of viewer devices, viewer status information on a per-segment basis;
   synchronizing the per-segment per-profile QoE measures with the viewer status information for each of the plurality of viewer devices; and
   making adaptive streaming decisions on profile selections for one or more of the plurality of viewer devices by the common middleware on a per-segment basis.

2. The method of claim 1, further comprising sending streaming update messages to one or more of the plurality of viewer devices according to the adaptive streaming decisions, to cause one or more of the plurality of viewer devices to fetch a best profile for a next segment to maximize QoE at the respective viewer devices or to optimize rate-distortion performance of the respective viewer devices.

3. The method of claim 1, wherein the per-segment per-profile QoE measures received by the common middleware are aggregated in a manifest file.

4. The method of claim 1, wherein viewer status includes one or more of: a manifest file, a video stream ID, a segment ID, a network bandwidth estimation, a buffer condition, a viewing device display type, or physical device parameters of a respective one of the plurality of viewer devices.

5. The method of claim 1, further comprising optimizing resource allocation across the plurality of viewer devices to improve overall average QoE of the plurality of viewer devices.

6. The method of claim 1, further comprising optimizing resource allocation across the plurality of viewer devices based on levels of services to which the plurality of viewer devices are subscribed.

7. The method of claim 1, further comprising displaying a report of the QoE measures of the plurality of viewer devices as collected, the report indicating the QoE measures according to one or more of time span, geo-location, media asset, program, or asset type.

8. The method of claim 3, wherein the manifest file is a Moving Picture Experts Group-Dynamic Adaptive Streaming over Hypertext Transfer Protocol (MPEG-DASH) media presentation description.

9. A system for optimizing streaming over a multimedia delivery chain, comprising:
   a common middleware, in communication with a plurality of viewer devices, configured to
      receive per-segment per-profile QoE measures, the QoE measures being measured for a plurality of video profiles, the QoE measures being predictive of human perception of the quality of the media content if experienced at the respective viewer device, each profile having a different resolution and/or framerate;
      receive, from the plurality of viewer devices, viewer status information on a per-segment basis;
      synchronize the per-segment per-profile QoE measures with the viewer status information for each of the plurality of viewer devices; and
      make adaptive streaming decisions on profile selections for one or more of the plurality of viewer devices by the common middleware on a per-segment basis.

10. The system of claim 9, wherein the common middleware is further configured to send streaming update messages to one or more of the plurality of viewer devices according to the adaptive streaming decisions, to cause one or more of the plurality of viewer devices to fetch a best profile for a next segment to maximize QoE at the respective viewer devices or to optimize rate-distortion performance of the respective viewer devices.

11. The system of claim 9, wherein the per-segment per-profile QoE measures received by the common middleware are aggregated in a manifest file.

12. The system of claim 9, wherein viewer status includes one or more of: a manifest file, a video stream ID, a segment ID, a network bandwidth estimation, a buffer condition, a viewing device display type, or physical device parameters of a respective one of the plurality of viewer devices.

13. The system of claim 9, wherein the common middleware is further configured to optimize resource allocation across the plurality of viewer devices to improve overall average QoE of the plurality of viewer devices.

14. The system of claim 9, wherein the common middleware is further configured to optimize resource allocation across the plurality of viewer devices based on levels of services to which the plurality of viewer devices are subscribed.

15. The system of claim 9, wherein the common middleware is further configured to display a report of the QoE measures of the plurality of viewer devices as collected, the report indicating the QoE measures according to one or more of time span, geo-location, media asset, program, or asset type.

16. The system of claim 11, wherein the manifest file is a Moving Picture Experts Group-Dynamic Adaptive Streaming over Hypertext Transfer Protocol (MPEG-DASH) media presentation description.

17. A non-transitory medium comprising instructions for optimizing streaming over a multimedia delivery chain that, when executed by a common middleware, in communication with a plurality of viewer devices, cause the common middleware to perform operations including to:
   receive per-segment per-profile QoE measures, the QoE measures being measured for a plurality of video profiles, the QoE measures being predictive of human perception of the quality of the media content if experienced at the respective viewer device, each profile having a different resolution and/or framerate;
   receive, from the plurality of viewer devices, viewer status information on a per-segment basis;
   synchronize the per-segment per-profile QoE measures with the viewer status information for each of the plurality of viewer devices; and
   make adaptive streaming decisions on profile selections for one or more of the plurality of viewer devices by the common middleware on a per-segment basis.

18. The medium of claim 17, wherein the common middleware is further configured to send streaming update messages to one or more of the plurality of viewer devices according to the adaptive streaming decisions, to cause one or more of the plurality of viewer devices to fetch a best profile for a next segment to maximize QoE at the respective viewer devices or to optimize rate-distortion performance of the respective viewer devices.

19. The medium of claim 17, wherein the per-segment per-profile QoE measures received by the common middleware are aggregated in a manifest file.

20. The medium of claim 17, wherein viewer status includes one or more of: a manifest file, a video stream ID, a segment ID, a network bandwidth estimation, a buffer condition, a viewing device display type, or physical device parameters of a respective one of the plurality of viewer devices.

21. The medium of claim 17, wherein the common middleware is further configured to optimize resource allocation across the plurality of viewer devices to improve overall average QoE of the plurality of viewer devices.

22. The medium of claim 17, wherein the common middleware is further configured to optimize resource allocation across the plurality of viewer devices based on levels of services to which the plurality of viewer devices are subscribed.

23. The medium of claim 17, wherein the common middleware is further configured to display a report of the QoE measures of the plurality of viewer devices as collected, the report indicating the QoE measures according to one or more of time span, geo-location, media asset, program, or asset type.

24. The medium of claim 19, wherein the manifest file is a Moving Picture Experts Group-Dynamic Adaptive Streaming over Hypertext Transfer Protocol (MPEG-DASH) media presentation description.

* * * * *